US012686338B1

(12) United States Patent
Streib

(10) Patent No.: US 12,686,338 B1
(45) Date of Patent: Jul. 21, 2026

(54) METHOD FOR PROVIDING A CUSTOMIZABLE VEHICLE CARGO PLATFORM

(71) Applicant: 63 Industries, LLC, Hailey, ID (US)

(72) Inventor: Tasche Streib, Hailey, ID (US)

(73) Assignee: 63 Industries, LLC, Hailey, ID (US)

( * ) Notice: Subject to any disclaimer, the term of this patent is extended or adjusted under 35 U.S.C. 154(b) by 105 days.

(21) Appl. No.: 18/666,423

(22) Filed: May 16, 2024

(51) Int. Cl.
B60R 7/02 (2006.01)
A47B 47/00 (2006.01)
B60R 5/04 (2006.01)

(52) U.S. Cl.
CPC ............ B60R 7/02 (2013.01); A47B 47/0091 (2013.01); B60R 5/045 (2013.01)

(58) Field of Classification Search
CPC ........... B60R 7/02; B60R 5/044; B60R 5/045; A47B 47/0091
USPC ......... 224/542; D12/424, 425; 211/182, 186, 211/189; 108/44
See application file for complete search history.

(56) References Cited

U.S. PATENT DOCUMENTS

| | | | | |
|---|---|---|---|---|
| 2,165,496 | A | | 7/1939 | McCall |
| 2,380,379 | A | * | 7/1945 | Attwood .............. A47B 13/003 |
| | | | | 411/959 |
| 3,104,626 | A | * | 9/1963 | Brunette ................... A47F 5/13 |
| | | | | 108/106 |

| | | | | |
|---|---|---|---|---|
| 3,110,429 | A | * | 11/1963 | Philips ................... B60R 5/044 |
| | | | | 211/186 |
| 3,695,649 | A | | 10/1972 | Laverone |
| 4,045,104 | A | * | 8/1977 | Peterson ................ A47B 47/03 |
| | | | | 312/263 |
| 4,678,359 | A | * | 7/1987 | Keen, Egbert ..... A47B 47/0008 |
| | | | | 403/403 |
| 4,809,146 | A | | 2/1989 | Johnson |
| 4,909,159 | A | * | 3/1990 | Gonsoulin ............. B60N 3/002 |
| | | | | 108/143 |
| 4,941,717 | A | | 7/1990 | Beaulieu |
| D355,798 | S | * | 2/1995 | Goetz ......................... D6/675.1 |
| 5,580,181 | A | | 12/1996 | Nomura |
| 5,664,757 | A | * | 9/1997 | Simonis ................... F16M 5/00 |
| | | | | 248/676 |
| 5,722,544 | A | * | 3/1998 | Williams ............. A47B 87/008 |
| | | | | 211/186 |
| 5,730,066 | A | * | 3/1998 | Auten .................... B60N 3/001 |
| | | | | 108/44 |

(Continued)

FOREIGN PATENT DOCUMENTS

KR 2008057962 6/2008

*Primary Examiner* — Justin M Larson
(74) *Attorney, Agent, or Firm* — Hawley Troxell; Philip McKay

(57) ABSTRACT

A method for providing a universal vehicle cargo system that can be customized by the user for use with any vehicle, can carry numerous types of specialty cargo/equipment, and provides the ability to secure equipment using different types of securing systems. The universal vehicle cargo system is assembled from interchangeable rigid frame sections that can be cut to a desired length; multifunction frame body sections that can also be cut to a desired length; multifunction frame corner units; and one or more frame support legs that can be cut to a desired length and/or one or more vehicle connection devices. Thus the universal vehicle cargo system is designed to be customizable in length, width, and height according to the needs of the user.

18 Claims, 42 Drawing Sheets

(56)                References Cited

U.S. PATENT DOCUMENTS

| | | | | |
|---|---|---|---|---|
| 5,947,037 | A | 9/1999 | Homberger | |
| 6,015,053 | A * | 1/2000 | Sheng | A47B 88/407 |
| | | | | 211/186 |
| D420,970 | S * | 2/2000 | Sacco | D12/415 |
| 6,027,000 | A * | 2/2000 | Sterzel | B60R 7/02 |
| | | | | 224/42.33 |
| 6,044,990 | A | 4/2000 | Palmeri | |
| 6,055,911 | A * | 5/2000 | Krenzer | B60N 3/004 |
| | | | | 108/44 |
| 6,062,146 | A * | 5/2000 | Conners | B60R 7/02 |
| | | | | 296/37.16 |
| D439,769 | S * | 4/2001 | Prince | D6/677.1 |
| 6,315,132 | B1 * | 11/2001 | Hartel | H02B 1/301 |
| | | | | 361/829 |
| 6,386,657 | B1 * | 5/2002 | Frifeldt | A47B 55/02 |
| | | | | 211/186 |
| 6,629,726 | B2 * | 10/2003 | Johnston | B60N 3/102 |
| | | | | 297/188.06 |
| 6,634,512 | B2 * | 10/2003 | Knab | H02B 1/01 |
| | | | | 211/189 |
| 6,902,068 | B1 * | 6/2005 | Fontana | H02B 1/01 |
| | | | | 312/257.1 |
| 6,942,269 | B2 * | 9/2005 | Mains | B60N 3/001 |
| | | | | 296/37.16 |
| 6,968,962 | B2 * | 11/2005 | Toma | F16B 12/50 |
| | | | | 211/189 |
| D553,555 | S * | 10/2007 | Panasewicz | D12/425 |
| 7,398,737 | B1 * | 7/2008 | Martellaro | A47B 23/001 |
| | | | | 108/143 |
| 8,316,781 | B1 | 11/2012 | Majors | |
| 8,707,653 | B2 * | 4/2014 | Calleja | E04C 3/08 |
| | | | | 29/897.3 |
| 8,979,158 | B2 * | 3/2015 | Nakajima | B60R 5/04 |
| | | | | 296/37.1 |
| 9,261,122 | B2 * | 2/2016 | Choy | F16B 12/40 |
| 10,092,099 | B1 * | 10/2018 | Linari | A47B 61/04 |
| 10,093,241 | B2 * | 10/2018 | Hughes | B60R 7/08 |
| 10,421,407 | B2 * | 9/2019 | Hughes | B60R 5/04 |
| D1,014,414 | S * | 2/2024 | Roumeliotis | D12/424 |
| 2003/0178383 | A1 * | 9/2003 | Craft | A63B 71/0045 |
| | | | | 211/85.7 |
| 2004/0056059 | A1 * | 3/2004 | Delgado | B60R 5/045 |
| | | | | 224/539 |
| 2004/0155562 | A1 | 8/2004 | Saravis | |
| 2004/0226249 | A1 * | 11/2004 | Wang | A47B 47/005 |
| | | | | 52/633 |
| 2007/0063112 | A1 | 3/2007 | Patterson | |
| 2008/0006596 | A1 | 1/2008 | Palmeri | |
| 2012/0000874 | A1 * | 1/2012 | Calleja | E04B 1/24 |
| | | | | 211/182 |
| 2020/0085192 | A1 | 3/2020 | Wartchow | |

* cited by examiner

101A

309

309

310

101A

312

309

309

310

314

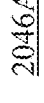
FIG.4A

410

103A
103A

499

405

403

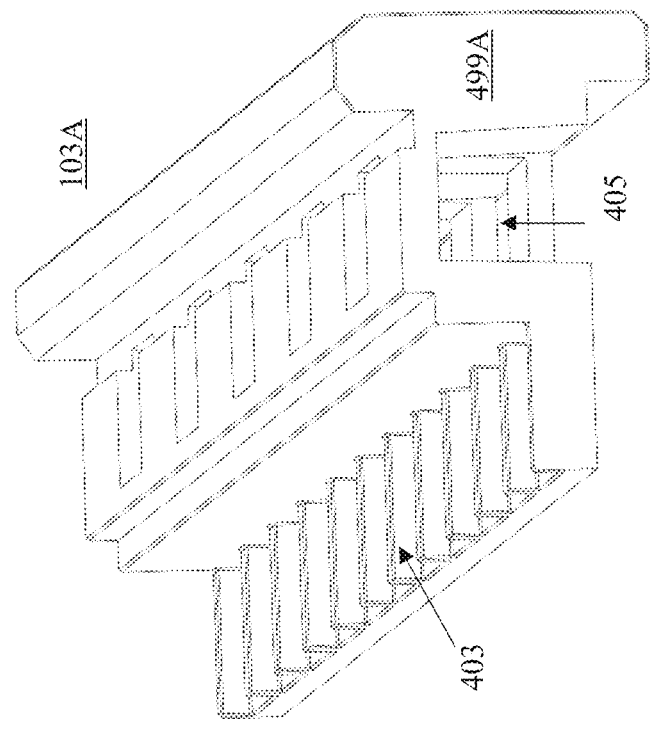
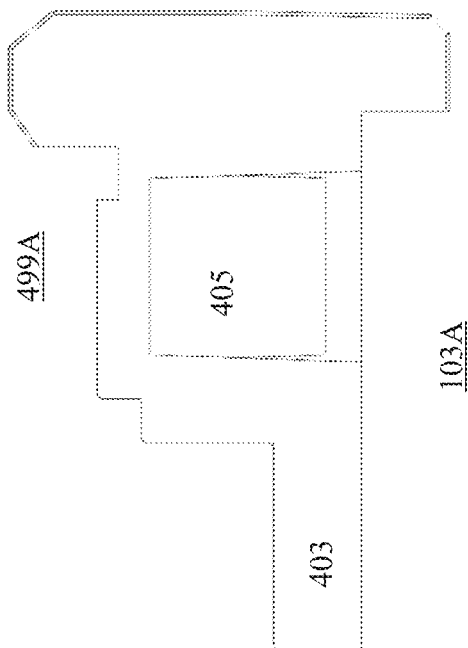
FIG.4C

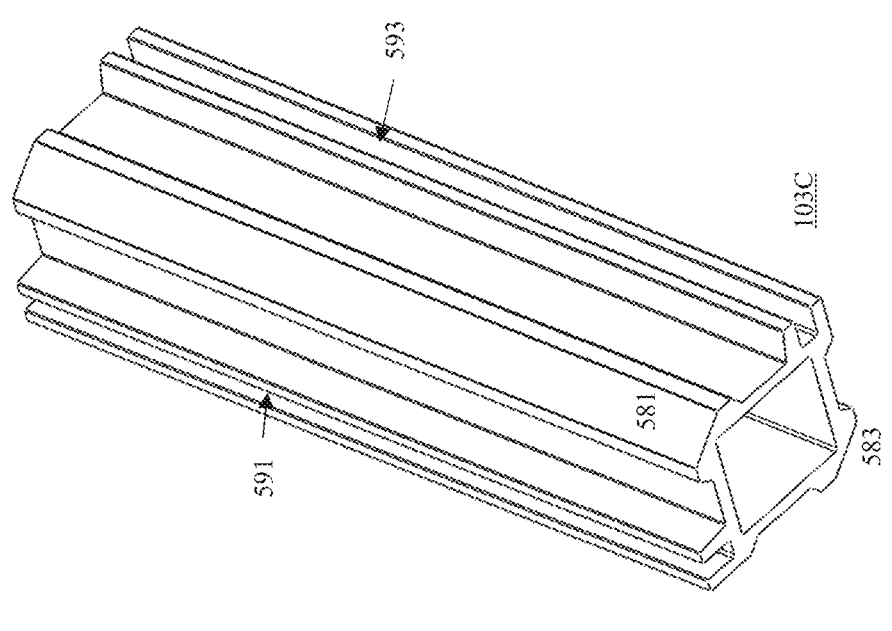
FIG.51
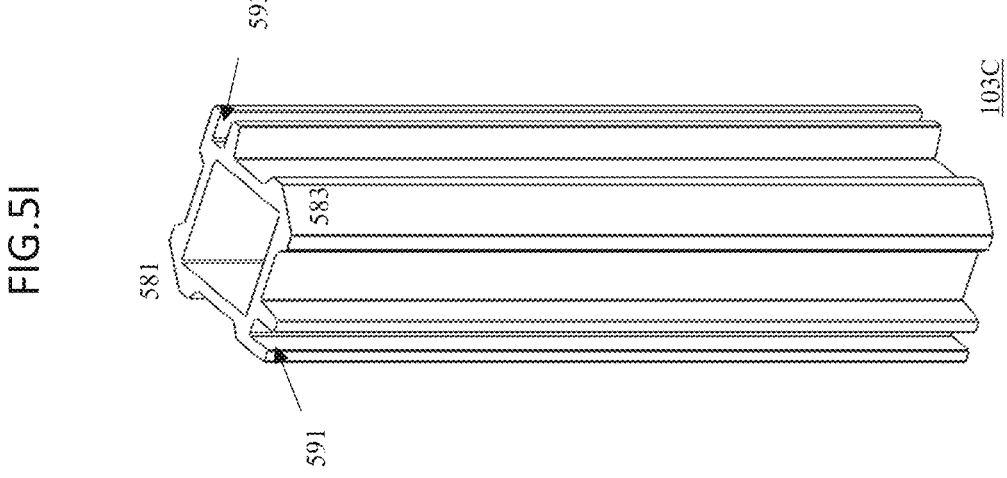
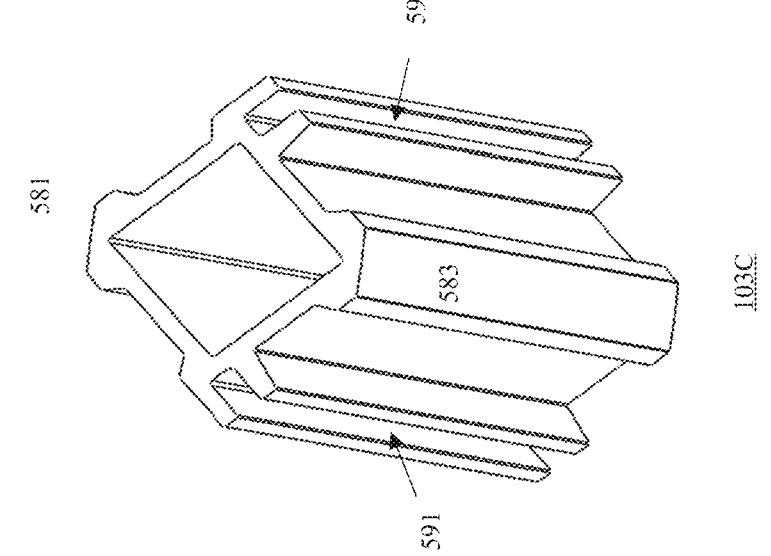

Figure 13:
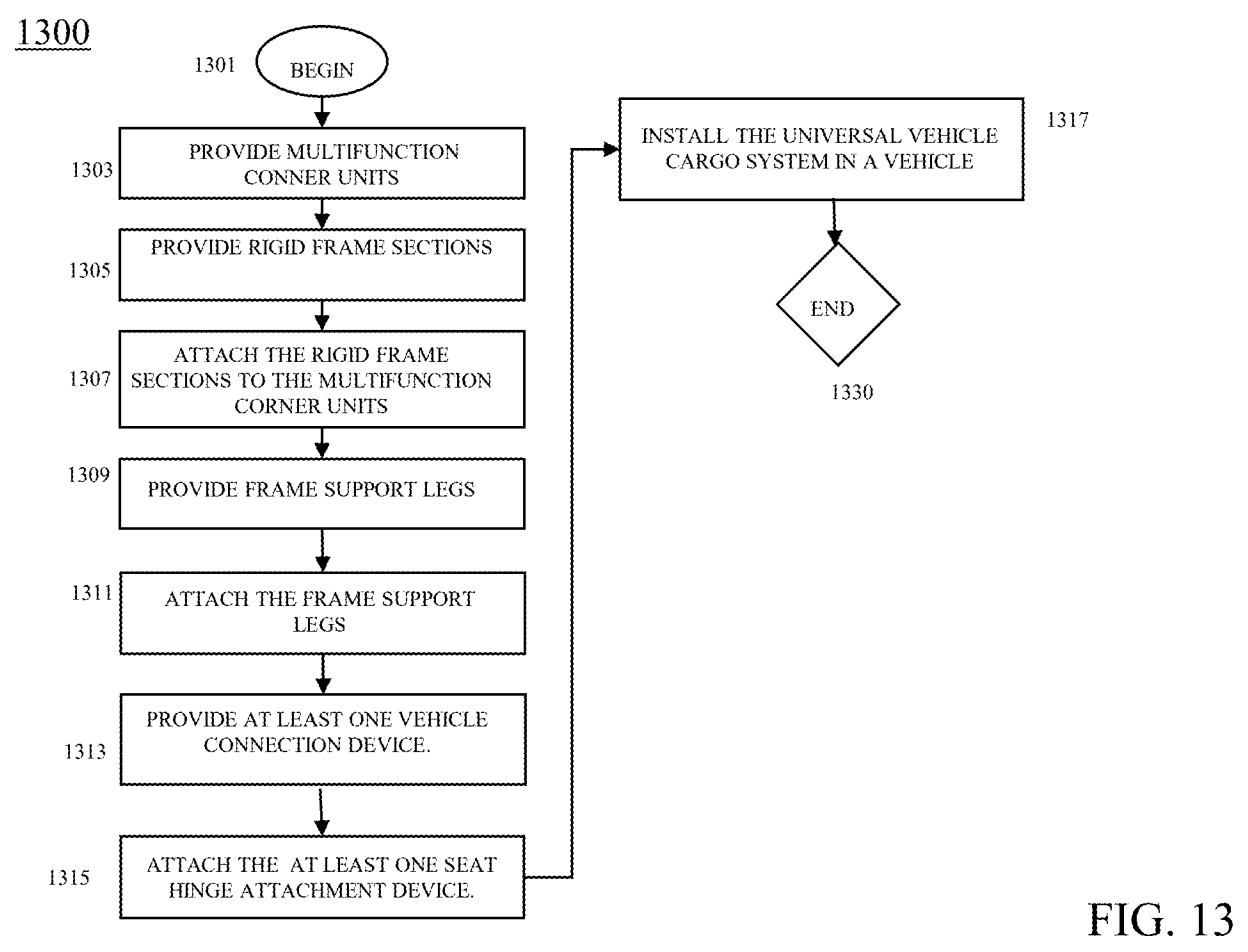

BEGIN — 1301

PROVIDE MULTIFUNCTION CONNER UNITS — 1303

PROVIDE RIGID FRAME SECTIONS — 1305

ATTACH THE RIGID FRAME SECTIONS TO THE MULTIFUNCTION CORNER UNITS — 1307

PROVIDE FRAME SUPPORT LEGS — 1309

ATTACH THE FRAME SUPPORT LEGS — 1311

PROVIDE AT LEAST ONE VEHICLE CONNECTION DEVICE. — 1313

ATTACH THE AT LEAST ONE SEAT HINGE ATTACHMENT DEVICE. — 1315

INSTALL THE UNIVERSAL VEHICLE CARGO SYSTEM IN A VEHICLE — 1317

END — 1330

METHOD FOR PROVIDING A CUSTOMIZABLE VEHICLE CARGO PLATFORM

BACKGROUND

Most types of personally owned vehicles are designed primarily with passenger transportation in mind. As a result, most of these vehicles include features centered around passenger comfort and convenience. In addition, even vehicles that are commonly used for work and recreation, such as pickup trucks, still typically include cab features that are directed to maximizing passenger comfort and convenience as opposed to cargo carrying utility and versatility.

As a specific example, many vehicles such as pickup trucks, SUVs, minivans, vans etc., include rear seating designed to carry passengers but fail to provide cargo storage versatility and safety features. It could be argued that this makes sense since many vehicle owners are primarily concerned with passenger capacity and, if needed, they believe the back of a pickup, SUV, van, or minivan, can be used to carry cargo. However, the cargo areas provided in these vehicles are typically just open space with little or no thought given to securing cargo and equipment in an effective, efficient, and safe manner. This is because, as noted, passenger space is typically the primary concern and cargo/equipment storage space is more or less an afterthought. As a result, there is typically little or no dedicated secure and safe storage space, much less sub-compartments and versatile tie down systems for holding cargo securely and safely. Consequently, when any cargo, and particularly work or recreational equipment, is put in these spaces, the cargo is typically not well secured and can therefore shift position and slide around in the cargo space unrestrained.

This lack of ability to secure cargo is clearly problematic when it comes to protecting the cargo and the vehicle. However, it is also a potential safety issue for the public, e.g., the driver and passengers of both the vehicle itself and other vehicles on the road. This is because improperly secured cargo can shift, bounce, and/or otherwise move around the vehicle. This shifting can then represent a serious source of driver distraction and is therefore a very real danger to the vehicle driver and passengers as well as other drivers, passengers, and vehicles sharing the road with the shifting cargo vehicle.

In addition, in the specific case of pick-up trucks, the rear cargo area, i.e., the truck bed, is often open. Consequently, anything left in the truck bed is vulnerable to theft and is exposed to the elements including, rain, snow, hail, wind, and heat. Consequently, anything of value cannot be safely left in the truck bed. In addition, improperly secured loads in the bed of a pickup can blow, bounce, or otherwise fall out of the truck bed while driving down the highway. Obviously, this is again a hazard to the vehicle driver and passengers as well as for other drivers, passengers, and vehicles that happen to be on the road.

In some cases, mesh and/or netting can be used to at least partially secure the contents of a truck bed or cargo area. However, while netting and mesh systems may secure the cargo, at least to some degree, they do not provide any protection from the elements, nor do they provide any real theft protection.

In other cases, fabric or light plastic covers, such as light tonneau covers can be used to conceal the contents of truck beds. These "soft" covers can provide protection from the elements and even provide some theft protection, at least to the extent that they keep the truck bed contents out of sight.

However, these soft covers are typically not sturdy, can easily be torn, cut, or removed by either thieves or the environment, and can be expensive items that need to be maintained and/or replaced regularly over the life of the vehicle.

In some cases, custom made hard covers such as truck toppers and hard tonneau convers can be purchased that are made of harder shell-like materials, such as fiberglass. These hard covers are typically designed to fit specific models, makes, and years of vehicles. However, even these hard covers are not as secure as the cab space/interior of the vehicle and are often very heavy and difficult to lift and/or store. In addition, when attached, hard tonneau convers significantly limit access to the cargo area even when they are open, have rubber seals that wear out and leak, and are often prohibitively expensive.

In addition, when hard tonneau covers are mounted over the truck bed, the ability of the cargo area to accommodate items having a height dimension deeper than the truck bed is lost, i.e., the forward cargo area typically can't be loaded any higher that the height of the truck bed walls. This significantly limits the utility of the truck as a hauling vehicle. In addition, this often results with trucks being on the road with open covers. Again, this allows improperly secured loads in the bed of a pickup to blow, bounce, or otherwise fall out of the truck bed while driving down the highway.

By far the most secure area of any vehicle for storing cargo, at least in terms of providing theft and protection from the elements, is the cab/interior area. However, as noted, currently the cab/interior area of most vehicles is not designed to carry equipment but is rather dedicated to carrying passengers. This is unfortunate because for many vehicle owners extra seating is far less desirable than secure cargo storage areas.

To address some of these issues, vehicle owners have historically tried to make their vehicles more versatile using various homemade or "Do It Yourself" (DIY) approaches. Many of these homemade "solutions" involve placing plywood, or some other item having a flat surface, in the vehicle directly on the seats. In other cases, an equipment storage area/platform is created by simply removing the seats and then placing plywood or some other flat surface on the floor of the vehicle to create a theoretically flat platform for storage. In some instances, these make-shift platforms are secured to the vehicle floor using make-shift methods. In other cases, they simply sit on the vehicle rear floor.

These makeshift solutions are problematic for several reasons. First, while these solutions may, or may not, provide a relatively flat surface, they are often haphazardly secured to the vehicle seat or floor, or in many cases are not secured at all. They are therefore relatively free to shift positions. In addition seats, and rear seating floors, are typically not level and include contours and curves that do not provide full support for the makeshift platforms. Consequently, the platforms can tilt and shift under normal driving conditions.

In addition, once installed, these platforms typically only provide, at best, a flat surface without a dedicated provision for securing the equipment placed on the platform. As a result, these platforms can often create more load shifting problems than they solve and do not address the very real hazards associated with shifting loads and driver distraction discussed above.

In addition, many vehicle owners would gladly welcome the flexibility to use their vehicles as equipment platforms at some times, such as during the work week or at specific times of the year, and then as passenger vehicles other times, such as weekends or another time of the year. However, homemade platforms that actually are secured to the vehicle floor are often difficult to install and remove. Therefore, these homemade platforms often become de-facto permanent features thereby decreasing the flexibility and utility of the vehicle.

In some cases, cargo platforms can be obtained that are specifically designed for a given vehicle make, model, and year. In these cases, the cargo platforms are custom made to conform to the specification and contours of the specific vehicle they are designed to accommodate. However, these vehicle specific cargo platforms are typically very expensive and are only available for an extremely limited set of vehicles. Indeed these vehicle specific cargo platforms are often only sold by the vehicle maker. Consequently, vehicle specific cargo platforms are not interchangeable or adaptable to more than one vehicle make, model, and year, and therefore have utility limited to the specific vehicle make model and year for which there were designed.

In addition, these vehicle specific cargo platforms are often designed to be installed by professionals, such as vehicle maker employees, and are not readily removed by non-professionals. Consequently, once again, this type of prior art cargo platform often becomes a de-facto permanent feature thereby again decreasing the flexibility and utility of the vehicle.

In addition, these vehicle specific cargo platforms often fail to provide for cargo securing mechanisms, such as hard attachment points or anchors, much less mechanisms of various types and functionality for securing different types of cargo/equipment.

In summary, currently, vehicle owners have relatively few options for providing in-vehicle/in-cab equipment storage. In addition, the few options that are available typically do not provide effective and efficient mechanisms for securing either the storage platform itself to the vehicle or for securing equipment of various types, in various ways, to the storage platform. In addition, the few options that are available are typically expensive and of limited utility, are difficult to remove/replace, and therefore can reduce the versatility and utility of the parent vehicle by becoming de-facto permanent fixtures.

As a result of the situation discussed above, many vehicles lack the versatility and utility their owners desire. In addition, the few cargo "solutions" currently available typically do not address the need for providing versatile, efficient, and effective methods and systems that reduce shifting load hazards and make our highways safer. Indeed, as discussed above, some currently employed cargo "solutions" increase the opportunity for shifting loads and therefore actually make our highways more dangerous.

What is needed is a technical solution to the long standing technical problem of providing an in vehicle/in-cab cargo storage platform that is versatile, efficient, effective, and relatively inexpensive, while at the same time providing mechanisms to truly secure various types of cargo in various ways; thereby minimizing the road hazards associated with load shifting.

SUMMARY

Disclosed herein are various embodiments of a method and system that provide a technical solution to the long-standing technical problem of providing a vehicle storage platform that is versatile, efficient, effective, and relatively inexpensive, while at the same time providing mechanisms to truly secure various types of cargo in various ways to minimize load shifting.

In one embodiment, the disclosed method and system includes a universal vehicle cargo system that can be modified by the vehicle user as needed, when needed, wherever needed, and as many times as needed.

To this end, the disclosed universal vehicle cargo system is designed to be adaptable for use with any vehicle, is designed to carry numerous types of specialty cargo/equipment, provides the ability to secure that equipment using different types of securing systems that are best suited for the cargo/equipment and the needs of the user, and to provide these features in a highly effective and efficient manner.

In one embodiment, the disclosed universal vehicle cargo system is designed to be customizable in length, width, and height according to the needs of the user. In one embodiment, this is accomplished by building the disclosed universal vehicle cargo systems from universal vehicle cargo system components including, but not limited to: customizable, and interchangeable, rigid frame sections that can be cut to a desired length; multifunction frame body sections that can also be cut to a desired length; multifunction frame corner units; one or more frame support legs that can be cut to a desired length; and/or one or more vehicle connection devices.

In various embodiments, the universal vehicle cargo system components are designed to be capable of customization, and/or modification, by the end user. In some embodiments, the universal vehicle cargo system components are sold as a kit so that the disclosed universal vehicle cargo systems can be assembled by the end user and therefore be customized by the end user to meet the specific needs of the end user.

In some embodiments, the universal vehicle cargo system components are stored as a kit and then assembled in whole, or in part, by a manufacturer and/or supplier based on the indicated needs of the vehicle owner. This not only makes the disclosed universal vehicle cargo systems highly customizable, but it also provides for efficient storage and warehousing of the universal vehicle cargo systems, either at the manufacturers facility, at an intermediate storage location such as a merchants store, or by the vehicle owner/end user.

As noted, in one embodiment, the rigid frame sections are designed to be interchangeable and customizable. To this end, in one embodiment, the rigid frame sections are made of materials that can be cut to a desired length using tools generally available to the average end user/vehicle owner. Consequently, using the disclosed embodiments, not only can the rigid frame sections be cut to an initial desired length, but additional rigid frame sections can be obtained and then cut to other lengths to provide interchangeable length and width dimensions to meet the needs of the user/vehicle owner as these needs arise or change, such as a new use, a new vehicle purchase, changing vehicles, etc. Thus, the disclosed universal vehicle cargo systems can be significantly modified without the need to re-tool or obtain a completely new universal vehicle cargo system.

In some embodiments, the rigid frame sections are made of aluminum, steel, or any metal or alloy. In some embodiments, the rigid frame sections are made of high density polymers, fiber glass, or carbon fiber material. In other embodiments, the rigid frame sections can be made of any material capable of providing rigid frame support and capable of being cut using common tools such as various types of saws, as discussed herein, and/or as known/available in the art at the time of filing, and/or as become known/available after the time of filing.

In some embodiments, the rigid frame sections are tubular, or hollow and/or have any cross section desired such as, but not limited to, a circular cross section, a square cross section, a rectangular cross section, a hexagonal cross section, or any cross section as discussed herein, and/or as known/available in the art at the time of filing, and/or as becomes known/available after the time of filing.

In some embodiments, the rigid frame sections are themselves used as frame sides of the disclosed universal vehicle cargo systems. However, in some embodiments, the rigid frame sections are designed to be at least partially enclosed in separate multifunction frame body sections.

In one embodiment the multifunction frame body sections, when used, include slots or channels through which at least part of the rigid frame sections pass and which provide additional support for the rigid frame sections. In some embodiments, end portions of the rigid frame sections then extend out of the channels of the multifunction frame body sections. As discussed below, these extending end portions of the rigid frame sections are then inserted into multifunction corner units and removably secured in the multifunction corner units to create the four sides of horizontal frames of the disclosed universal vehicle cargo systems.

In one embodiment, the multifunction frame body sections have various multifunctional features formed in, on, or attached to, the multifunction frame body sections. These can include, but are not limited to, anchoring positions and mechanisms of various types, side support and mounting mechanisms, various attachment points and mechanisms, D-Ring/carabiner attachment positions, equipment hooks and/or hangers, and/or any other multifunctional features desired and/or as discussed herein, and/or as known/available in the art at the time of filing, and/or as become known/available after the time of filing.

As noted, in one embodiment, the multifunction frame body sections are designed to be customizable and interchangeable. To this end, the multifunction frame body sections are made of materials that can be cut to a desired length using tools generally available to the average end user/vehicle owner. Consequently, using the disclosed embodiments, not only can the multifunction frame body sections be cut to an initial desired length, but additional multifunction frame body sections can be obtained and then cut to other lengths to provide different length and width dimensions to meet the needs of the user/vehicle owner as those needs change. Thus, the disclosed universal vehicle cargo systems can be significantly modified without the need to re-tool or obtain a completely new universal vehicle cargo system.

In addition, sets of, or individual, multifunction frame body sections can be obtained having specific multifunctional features, such as different anchor types, positions, orientations etc. Then, individual multifunction frame body sections having different multifunctional features, can be mixed, matched, or used as mixed sets in accordance with the needs of the user/vehicle owner.

In some embodiments, the multifunction frame body sections can be made of various polymers, fiberglass, injection molded plastic, ceramics, composites, and/or carbon fiber material. In some embodiments, the multifunction frame body sections can be made of aluminum, steel, or any metal or alloy. In some embodiments, the frame body can be a metal or other material at least partially enclosed in plastic. In some embodiments, the multifunction frame body sections are made of any material capable of providing the desired features discussed herein and capable of being cut using common tools such as various types of saws, as discussed herein, and/or as known/available in the art at the time of filing, and/or as become known/available after the time of filing.

In one embodiment, the multifunction corner units are used at each intersection of rigid frame sections and/or multifunction frame body sections, i.e., at each corner of the disclosed universal vehicle cargo systems.

In one embodiment, the multifunction corner units are designed so that end portions of the rigid frame sections can be inserted into respective channels or openings in the multifunction corner units. In one embodiment, each multifunction corner unit has at least two channels or openings having longitudinal axes at approximately ninety degree angles to each other.

In this way, when an end of a first rigid frame section is inserted into a first channel of the two multifunction corner unit channels of a first multifunction corner unit and an end of a second rigid frame section is inserted into the second channel of the two multifunction corner unit channels of the first multifunction corner unit, the longitudinal axis of the first rigid frame section is at approximately ninety degrees with respect to the longitudinal axis of the second rigid frame section. In this way the first and second rigid frame sections and first multifunction corner unit form a first corner with first and second sides.

Similarly, in one embodiment, when an end of a third rigid frame section is inserted into a first channel of the two multifunction corner unit channels of a second multifunction corner unit and an end of a fourth rigid frame section is inserted into the second channel of the two multifunction corner unit channels of the second multifunction corner unit, the longitudinal axis of the third rigid frame section is at approximately ninety degrees with respect to the longitudinal axis of the fourth rigid frame section. In this way the third and fourth rigid frame sections and second multifunction corner unit form a second corner with third and fourth sides.

Then, in one embodiment, the second end of the first rigid frame section is inserted into a first channel of the two multifunction corner unit channels of a third multifunction corner unit and the second end of the fourth rigid frame section is inserted into a second channel of the two multifunction corner unit channels of the third multifunction corner unit.

Then, in one embodiment, the second end of the second rigid frame section is inserted into a first channel of the two multifunction corner unit channels of a fourth multifunction corner unit and the second end of the third rigid frame section is inserted into a second channel of the two multifunction corner unit channels of the fourth multifunction corner unit.

In this way, or in any alternative order of assembly, all four sides of a horizontal frame of the disclosed universal vehicle cargo systems are connected to form a four sided horizontal frame with each side at approximately ninety degrees with respect to the side adjacent to it.

As noted above, in one embodiment the multifunction frame body sections include slots or channels through which at least part of the rigid frame sections pass and which provide additional support for the rigid frame sections. In these embodiments, the multifunction frame body sections can be slid onto their respective rigid frame sections before the sides of the disclosed universal vehicle cargo systems are assembled as discussed above. Then, end portions of the rigid frame sections that, as discussed above, extend out of the channels of the multifunction frame body sections can be used to assemble the sides of the disclosed universal vehicle cargo systems as discussed above.

In various embodiments, the multifunction frame body sections have various multifunctional features formed in the multifunction frame body sections. These can include, but are not limited to, anchoring positions and mechanisms of various types, side support and mounting mechanisms, cable lock anchoring mechanisms, quick release anchoring positions, D-ring attachment points, strap down attachment and pass through threading positions, equipment hooks, equipment hangers, various other attachment points and mechanisms, and/or any other multifunctional features desired and/or as discussed herein, and/or as known/available in the art at the time of filing, and/or as become known/available after the time of filing.

Similarly, in various embodiments, the multifunction corner units can have various multifunctional features formed in the multifunction corner units. These can include, but are not limited to, anchoring positions and mechanisms of various types, side support and mounting mechanisms, cable lock anchoring mechanisms, quick release anchoring positions, D-ring attachment points, strap down attachment and pass through threading positions, equipment hooks, equipment hangers, various other attachment points and mechanisms, leg attachment mechanisms, vehicle attachment devices such as seat hinge and/or seat frame and/or child seat connection device attachment mechanisms, and/or any other multifunctional features desired and/or as discussed herein, and/or as known/available in the art at the time of filing, and/or as become known/available after the time of filing.

As is true with the multifunction frame body sections, in various embodiments, the multifunction corner units can be formed to include various, and different, multifunctional features. Then sets or individual multifunction corner units can be obtained having specific multifunctional features, such as different anchor types, positions, orientations etc. Then, multifunction corner units having different multifunctional features, can be mixed, matched, or used as mixed sets in accordance with the changing needs of the user/vehicle owner.

In various embodiments, the multifunction corner units can be made of polymers, fiber glass, injection molded plastic, ceramics, composites, and/or carbon fiber material. In some embodiments, the multifunction corner units can be made of aluminum, steel, or any metal or alloy. In some embodiments, the multifunction corner units are made of any material capable of supporting the framework discussed above and providing the desired features as discussed herein, and/or as known/available in the art at the time of filing, and/or as become known/available after the time of filing.

In various embodiments, one or more frame support legs are included in the disclosed universal vehicle cargo systems. In one embodiment, the one or more frame support legs have various multifunctional features formed in the one or more frame support legs. These can include, but are not limited to, anchoring positions and mechanisms of various types, clamping mechanisms, various attachment points and mechanisms, hooks, D-ring/carabiner attachments points, and/or any other multifunctional features desired and/or as discussed herein, and/or as known/available in the art at the time of filing, and/or as become known/available after the time of filing.

As noted, in one embodiment, the one or more frame support legs are designed to be customizable and interchangeable. To this end, the one or more frame support legs are made of materials that can be cut to a desired length using tools generally available to the average end user/vehicle owner. Consequently, using the disclosed embodiments, not only can the one or more frame support legs be cut to an initial desired length, but additional frame support legs can be obtained and then cut to other lengths to provide different length legs if the needs of the user/vehicle owner change, such as a new use, new vehicle, different cargo/equipment, etc.

In addition, sets and/or individual frame support legs can be obtained having specific multifunctional features, such as different anchor types, positions, orientations etc. and of different lengths. Then, individual frame support legs having different multifunctional features and sizes, can be mixed, matched, or used as mixed sets in accordance with the needs of the user/vehicle owner.

In some embodiments, the one or more frame support legs can be made of various polymers, fiber glass, molded plastic, ceramics, composites, and/or carbon fiber material. In some embodiments, the one or more frame support legs can be made of aluminum, steel, or any metal or alloy. In some embodiments, the one or more frame support legs are made of any material capable of providing the desired support and features discussed herein and that are capable of being cut using common tools such as various types of saws, as discussed herein, and/or as known/available in the art at the time of filing, and/or as become known/available after the time of filing.

In various embodiments, the one or more frame support legs can be removably attached to the multifunction corner units. In one embodiment, two frame support legs are attached to a first and second multifunction corner units that form a first side of the resulting frame of the universal vehicle cargo system.

In some embodiments, other third and fourth multifunction corner units that form a second side of the universal vehicle cargo system, that is opposite and parallel to first side, have vehicle connection devices such as seat hinge and/or seat frame and/or child seat anchor connection devices attached. In these embodiments, all or a portion of the vehicle rear seat is accessed, removed, or folded back. Then, the vehicle connection devices such as seat hinge and/or seat frame and/or child seat anchor connection devices are used to secure the second side of the universal vehicle cargo system directly to vehicle anchoring portions such as seat frames, child seat anchors, and/or seat hinges.

In one embodiment, the first side of the universal vehicle cargo system is then supported by the two frame support legs so that a level platform is provided a desired height above the vehicle floor, regardless of the level, or lack of level, and other features/contours of the actual vehicle floor.

In various embodiments, different vehicle connection devices, such as seat hinge and/or seat frame and or child seat anchor connection devices may be required for different vehicles. However, in one embodiment, the vehicle connection devices are removably attached to the third and fourth multifunction corner units. This allows the different vehicle connection devices to be removed and/or attached as needed to adapt to different vehicles. This is in direct contrast to the prior art vehicle specific systems, and most homemade systems, discussed above.

In various other embodiments, four frame support legs are attached to each of the four multifunction corner units. In one embodiment, first and second frame support legs of a first length are attached to the first and second multifunction corner units that form a first side of the resulting frame of the universal vehicle cargo system. In one embodiment, third and fourth frame support legs of a second length are attached to third and fourth multifunction corner units that form a second side of the universal vehicle cargo system that is opposite and parallel to the first side.

In these embodiments, the first side of the universal vehicle cargo system is then supported by the first and second frame support legs at a first height and the second side of the universal vehicle cargo system is supported by the third and fourth frame support legs at a second height. In this way, a level platform can be provided at a desired height above the vehicle floor, regardless of the level, or lack of level, and or features and contours of the actual vehicle floor.

In various other embodiments, identical height frame support legs are attached to each of the four multifunction corner units. In these embodiments, all four sides of the universal vehicle cargo system are then supported by the four identical frame support legs at a first height. In this way, a level platform can be provided a desired height above the vehicle floor, or on any level surface.

In one embodiment, once the universal vehicle cargo system frame is formed as discussed above, the frame can support various items in accordance with the needs of the user.

For instance, in one embodiment, a deck can be attached to the universal vehicle cargo system frame to provide a level and flat surface. Then the various multifunction features of the multifunction frame body sections and/or corner units, and/or frame support legs can be used to safely secure cargo/equipment to the universal vehicle cargo system deck. In various embodiments, the deck can include different surfaces and/or mats to keep cargo from sliding on the system deck. In various embodiments, the deck can include a cross bar for added cargo support.

In other embodiments, the universal vehicle cargo system frame can be used to support a removable rack and/or interchangeable racks. In one embodiment, each rack and/or universal vehicle cargo system can be formed such that the racks simply drop into position within the universal vehicle cargo system frame.

In some embodiments, the universal vehicle cargo system frame can be used to support pre-prepared specialty racks of equipment. As an example, a user might have several specialty racks preloaded with equipment/cargo for different activities, jobs, times of year etc. In this way, activity racks can be stored with the respective equipment/cargo attached. Then when a particular activity is anticipated, the appropriate rack can be placed in the universal vehicle cargo system frame.

In other embodiments, racks are provided that include integral sub-compartments to secure cargo/equipment of various types and sizes.

In various embodiments, the disclosed universal vehicle cargo systems can include multiple levels. In these embodiments, once a first level is assembled and installed as discussed above, a second level frame is built using the methods and components discussed above. Each additional level(s) is/are then attached to the level below it using four or more frame support legs attached to respective ones of the additional multifunction corner units. In most cases the four frame support legs would be of the same height.

In addition, in some embodiments, side panels can be used to create closed or partially closed (fraction of height) compartments. As noted above, in one embodiment, the multifunction frame body sections have various multifunctional features formed in the multifunction frame body sections including, in one embodiment, side support and mounting mechanisms. In various embodiments, these side support and mounting mechanisms can be used to hold panels on one or more sides of one or more of the levels of the disclosed universal vehicle cargo systems. This feature not only provides additional support and containment for the cargo/equipment, but it also allows further compartmentalization of gear and keeps the cargo/equipment out of sight.

In various embodiments, all of the major components of the disclosed universal vehicle cargo systems are specifically designed to be removably attached to each other. Consequently, the disclosed universal vehicle cargo systems can be easily installed, and uninstalled, as the user desires.

As discussed above, and in more detail below, the disclosed universal vehicle cargo systems can be modified by the vehicle user as needed, when needed, and wherever needed.

In addition, as discussed above, and in more detail below, the disclosed universal vehicle cargo systems are designed to be customizable for use with any vehicle, to carry numerous types of specialty cargo/equipment, and provide the ability to secure that equipment using different types of securing systems that are best suited for the cargo/equipment and the needs of the user in a highly effective and efficient manner.

In addition, as discussed above, and in more detail below, the disclosed universal vehicle cargo systems are designed to be customizable in length, width, and height according to the needs of the user.

As discussed above, and in more detail below, in one embodiment, this is accomplished by building the disclosed universal vehicle cargo systems from universal vehicle cargo system components including, but not limited to, customizable, and interchangeable, rigid frame sections that can be cut to a desired length; multifunction frame body sections that can also be cut to a desired length; multifunction frame corner units; and one or more frame support legs that can be cut to a desired length and/or one or more vehicle connection devices, such as seat hinge and/or seat frame and/or child seat anchor connection devices.

In addition, as discussed above, and in more detail below, in various embodiments, the universal vehicle cargo system components are designed to be capable of customization, and/or modification, by the end user and can be sold as a kit so that the disclosed universal vehicle cargo systems can be assembled by the end user and therefore customized by the end user to meet the specific needs of the end user.

In addition, as discussed above, and in more detail below, the universal vehicle cargo system components are stored as a kit and then assembled in whole, or in part, based on the indicated needs of the vehicle owner. This not only makes the disclosed universal vehicle cargo systems highly customizable, but it also provides for efficient storage and warehousing of the universal vehicle cargo systems either at the manufacturers facility, an intermediate storage location such as a merchants store, or by the vehicle owner/end user so that the disclosed universal vehicle cargo systems can be modified as needed by the end user.

In addition, as discussed above, and in more detail below, in various embodiments, all of the components of the disclosed universal vehicle cargo systems are specifically designed to be removably attached to each other. Consequently, the disclosed universal vehicle cargo systems can be easily installed, and uninstalled, as the user desires.

As a result, and in direct contrast to prior art methods and systems, the disclosed universal vehicle cargo systems provide vehicle owners numerous options for providing in-vehicle/in-cab equipment storage.

Also in direct contrast to prior art methods and systems, the disclosed universal vehicle cargo systems provide versatile, effective, and efficient mechanisms for securing both the storage platform itself to the vehicle and for securing equipment of various types, in various ways, to the storage platform.

In addition, and in direct contrast to prior art methods and systems, the disclosed universal vehicle cargo systems are relatively inexpensive and are designed to be relatively easy to install and uninstall; thereby increasing the versatility and utility of the parent vehicle.

Therefore, in contrast to prior art methods and systems, the disclosed methods and systems provide vehicles the versatility and utility their owners desire. In addition, the disclosed methods and systems provide versatile, efficient, and effective solutions to the shifting load hazards discussed above and thereby make our highways safer. This again is in direct contrast to many of the prior art methods and systems discussed above.

Consequently, the disclosed universal vehicle cargo systems provide a technical solution to the long-standing technical problem of providing a vehicle cargo storage platform that is versatile, efficient, effective, and relatively inexpensive, while at the same time providing mechanisms to truly secure various types of cargo in various ways; thereby minimizing the hazards associated with load shifting.

BRIEF DESCRIPTION OF THE DRAWINGS

FIG. 4A shows perspective view of a rigid frame section in accordance with one embodiment.

FIG. 4C shows side view and side perspective view of a cross section of a multifunction frame body section in accordance with one embodiment.

FIG. 5I shows three perspective views of a frame support leg in accordance with one embodiment.

FIG. 13 is a flow chart of a process for providing a universal vehicle cargo system in accordance with one embodiment.

Figure 1A:
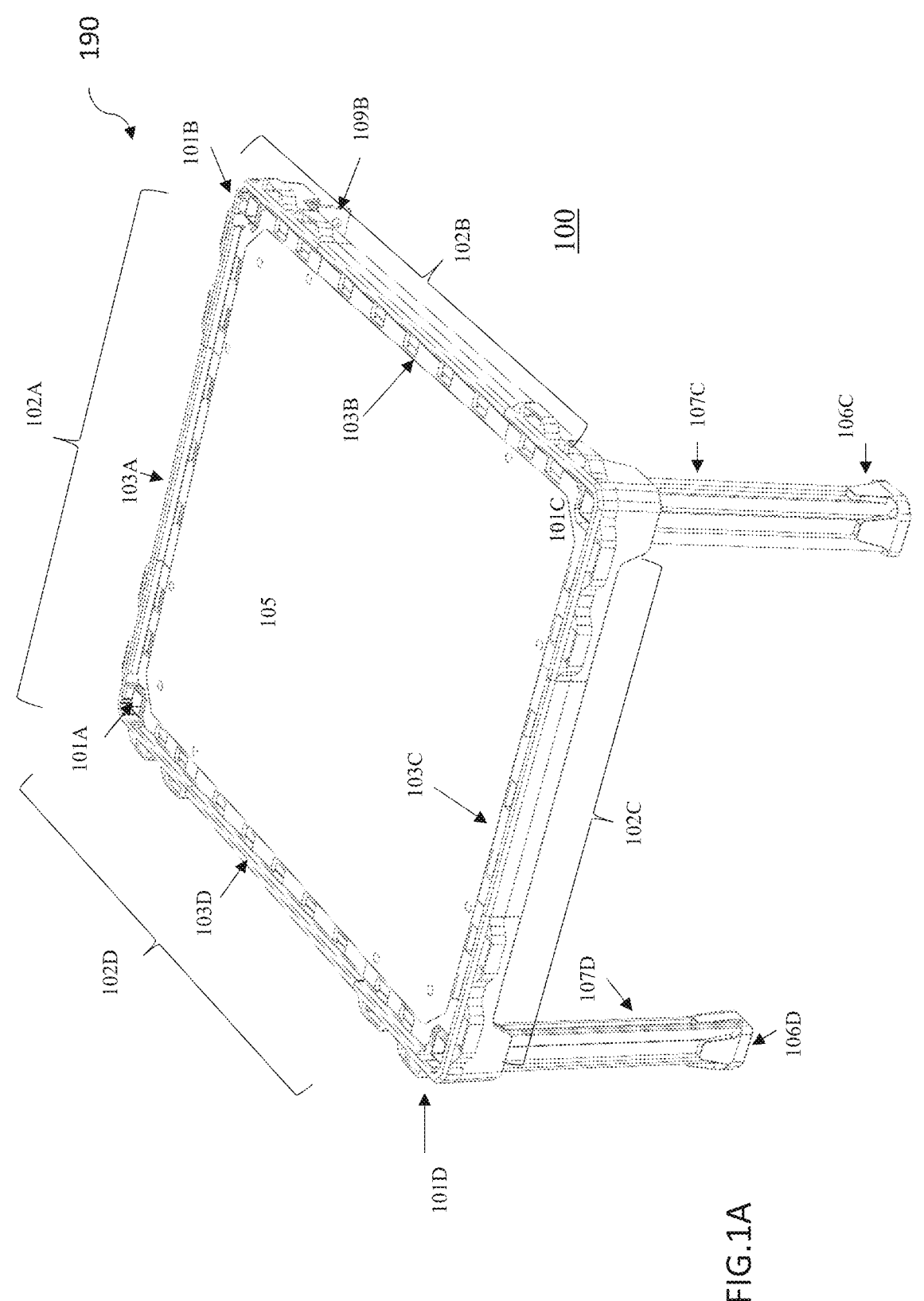
FIG. 1A is a line drawing top perspective of one embodiment of universal vehicle cargo system that is a single layer universal vehicle cargo system with vehicle connection devices, in this example seat hinge attachment devices, in accordance with one embodiment.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures (FIGs.), which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

Disclosed herein are various embodiments of a method and system that represent a technical solution to the long-standing technical problem of providing a cargo storage platform that is versatile, efficient, effective, and relatively inexpensive, while at the same time providing mechanisms to safely secure various types of cargo in various ways to minimize load shifting.

In one embodiment, the disclosed universal vehicle cargo system is designed to be customizable and adaptable in length, width, and height according to the needs of the user. In one embodiment, this is accomplished by building the disclosed universal vehicle cargo systems from universal vehicle cargo system components including, but not limited to: customizable and interchangeable rigid frame sections that can be cut to a desired length; multifunction frame body sections that can also be cut to a desired length; multifunction frame corner units; one or more frame support legs that can be cut to a desired length; and/or one or more vehicle connection devices, such as seat hinge and/or seat frame and/or child seat anchor connection devices.

In various embodiments, the universal vehicle cargo system components are designed to be capable of customization, and/or modification, by the end user. In some embodiments, the universal vehicle cargo system components are sold as a kit so that the disclosed universal vehicle cargo systems can be assembled by the end user and therefore be customized by the end user to meet the specific needs of the end user.

In some embodiments, the universal vehicle cargo system components are stored as a kit and then assembled in whole, or in part, by a manufacturer and/or supplier based on the indicated needs of the vehicle owner. This not only makes the disclosed universal vehicle cargo systems highly customizable, but it also provides for efficient storage and warehousing of the universal vehicle cargo systems, either at the manufacturers facility, at an intermediate storage location such as a merchants store, or by the vehicle owner/end user.

In some embodiments, the universal vehicle cargo system components are sold as a kit with the components pre-cut to an indicated vehicle such that the component need only be assembled as supplied. In yet other embodiments, the universal vehicle cargo system is sold pre-assembled using components cut to an indicated vehicle.

Figure 1B:
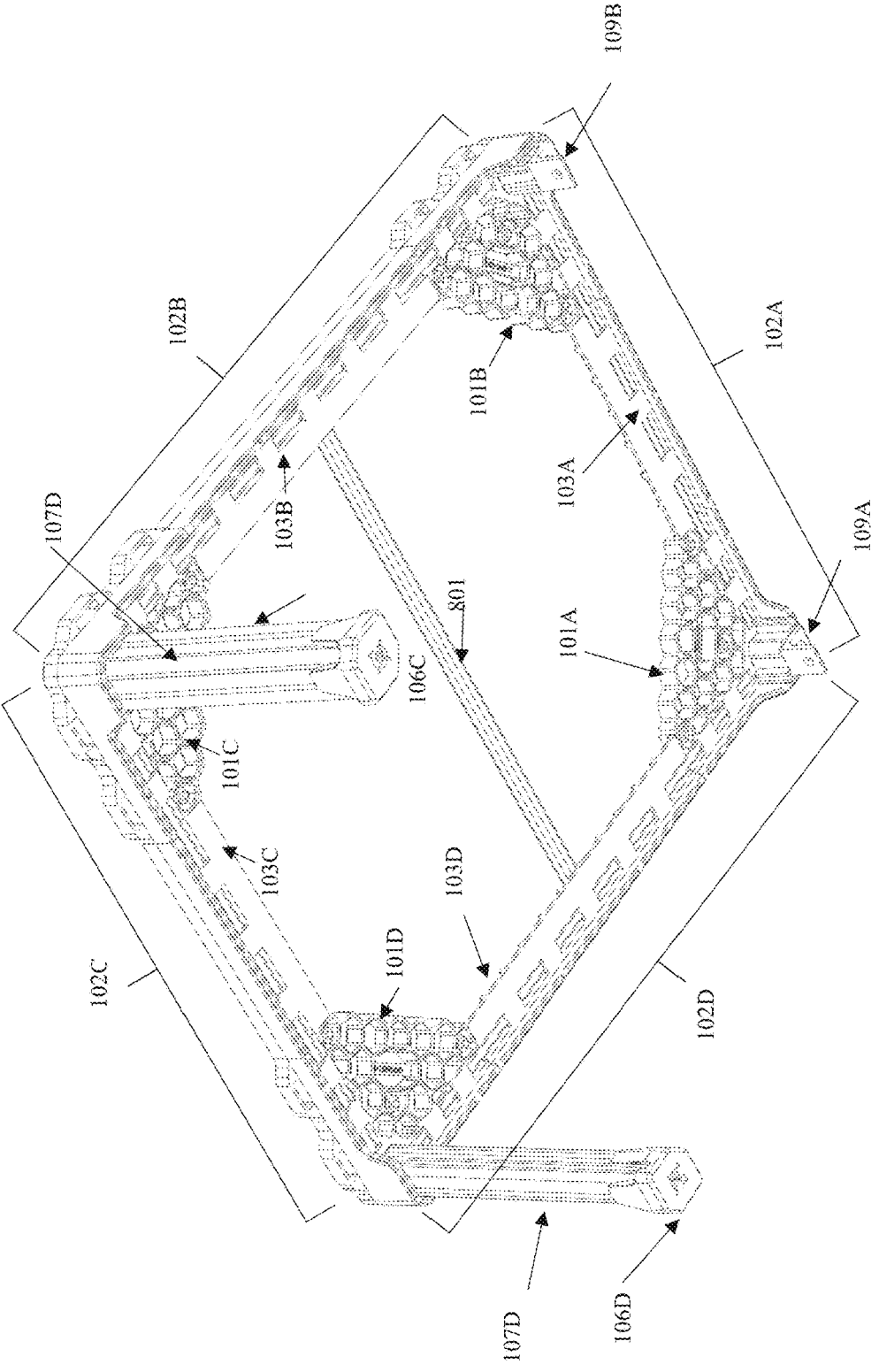
FIG. 1B is a line drawing bottom perspective of one embodiment of universal vehicle cargo system that is a single layer universal vehicle cargo system with vehicle connection devices, in this example seat hinge attachment devices, in accordance with one embodiment.

FIG. 1A is a line drawing top perspective of a single level universal vehicle cargo system 100 in accordance with one embodiment. FIG. 1B is a line drawing bottom perspective of single level universal vehicle cargo system 100 in accordance with one embodiment.

As seen in FIGS. 1A and 1B, in one embodiment, universal vehicle cargo system 100 is generally rectangular or square in shape and includes four universal vehicle cargo system sides 102A, 102B, 102C, and 102D.

In one embodiment, this is accomplished by building universal vehicle cargo system 100 from universal vehicle cargo system components including, but not limited to: customizable, and interchangeable rigid frame sections (not visible in FIGS. 1A and 1B, see 203A, 203B, 203C, and 203D in FIG. 2 discussed below) that can be cut to a desired length; multifunction frame body sections 103A, 103B, 103C, and 103D that can also be cut to a desired length; multifunction frame corner units 101A, 101B, 101C, and 101D; one or more frame support legs 107C and 107D that can be cut to a desired length; and/or one or more vehicle connection devices, in this example, seat hinge connection devices 109A and 109B.

As discussed in more detail below, in one embodiment, each of the universal vehicle cargo system sides 102A, 102B, 102C, and 102D are removably attached to multifunction frame corner units 101A, 101B, 101C, and 101D such that each of the universal vehicle cargo system sides 102A, 102B, 102C, and 102D is at an approximately right angle with respect to the universal vehicle cargo system sides adjacent to it to form universal vehicle cargo system horizontal frame 190.

Also shown in FIGS. 1A and 1B are removably attached frame support legs 107C and 107D and removably attached seat hinge attachment devices 109A and 109B. Also shown in FIGS. 1A and 1B are frame support feet 106C, 106D, and removably deck 105.

In one embodiment, the universal vehicle cargo system 100 is designed to be customizable in length, width, and height according to the needs of the user. To this end, as discussed in more detail below, in one embodiment the dimensions, e.g., the length of universal vehicle cargo system sides 102A, 102B, 102C, and 102D can be determined by the user and made to fit any vehicle and/or vehicle space desired.

In various embodiments, universal vehicle cargo system 100 components can be sold as a kit so that universal vehicle cargo system 100 can be assembled by the end user and therefore be customized by the end user to meet the specific needs of the end user in the field.

In some embodiments, the universal vehicle cargo system components are stored as a kit and then assembled in whole, or in part, by a manufacturer and/or supplier based on the indicated needs of the vehicle owner. This not only makes universal vehicle cargo system 100 highly customizable, but it also provides for efficient storage and warehousing of universal vehicle cargo system 100.

In some embodiments, the universal vehicle cargo system 100 components are sold as a kit with the components pre-cut to an indicated vehicle such that the component need only be assembled as supplied. In yet other embodiments, the universal vehicle cargo system 100 is sold pre-assembled using components cut to an indicated vehicle.

Each of the features shown in FIGS. 1A and 1B, and the universal vehicle cargo system components referred to above, is discussed in more detail below.

Figure 2:
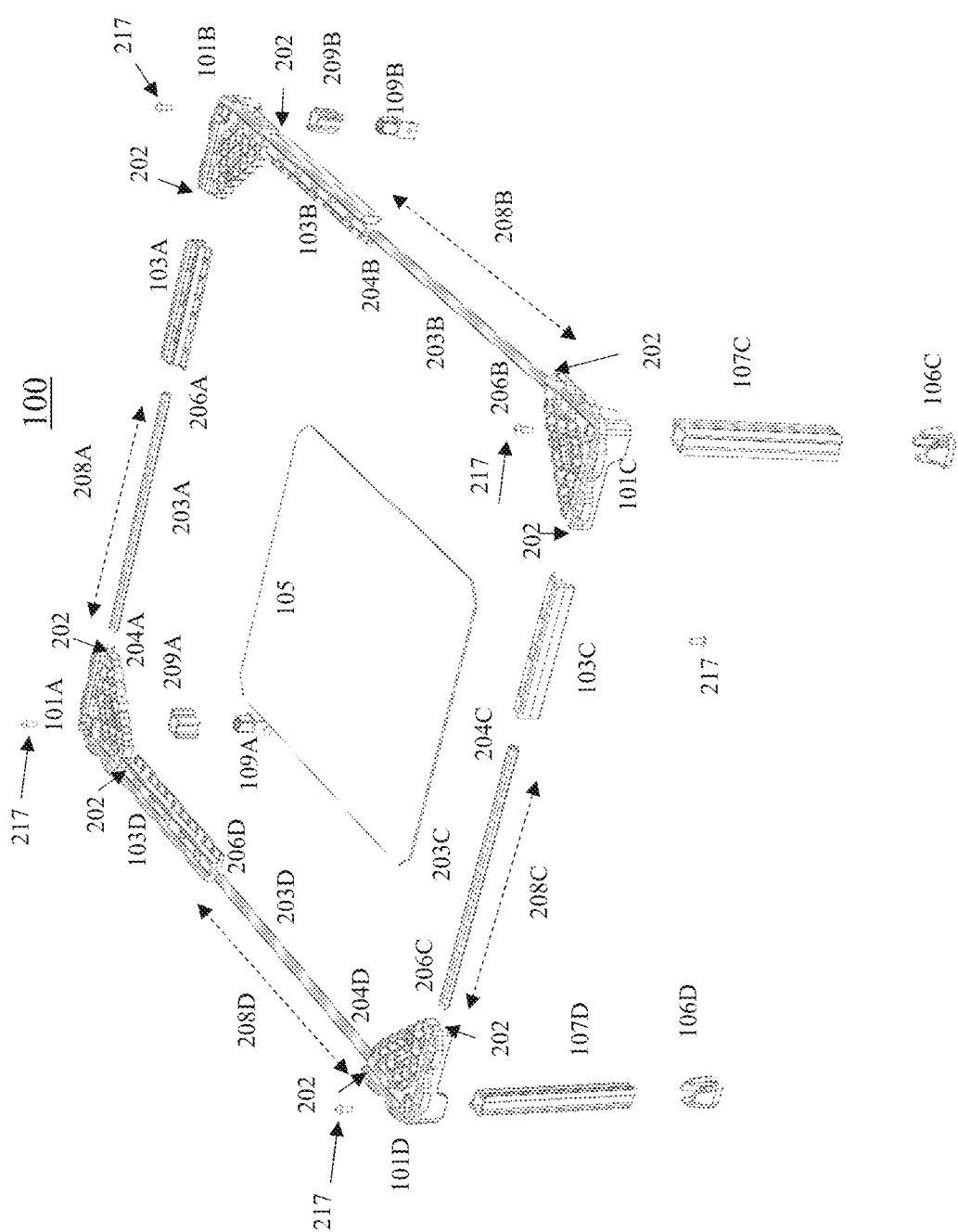
FIG. 2 is a line drawing of a top perspective exploded view of the single layer universal vehicle cargo system of FIGS. 1A and 1B showing the some of the assembly parts in accordance with one embodiment.

FIG. 2 is a line drawing of a top perspective exploded view of the single layer universal vehicle cargo system 100 of FIGS. 1A and 1B showing some of the assembly parts in accordance with one embodiment.

Referring to FIGS. 1A, 1B and 2, in one embodiment, universal vehicle cargo system 100 includes rigid frame sections 203A, 203B, 203C, and 203D.

In one embodiment, rigid frame sections 203A, 203B, 203C, and 203D are designed to be interchangeable with each other, as well as other rigid frame sections to provide customizable dimensions, i.e., lengths.

To this end, in one embodiment, rigid frame sections 203A, 203B, 203C, and 203D are made of materials that can be cut to a desired length using tools generally available to the average end user/vehicle owner.

Consequently, using the disclosed embodiments, not only can be rigid frame sections 203A, 203B, 203C, and 203D be cut to an initial desired length, but additional rigid frame sections can be obtained and then cut to other lengths to provide different length and width dimensions of the universal vehicle cargo system 100 to meet the needs of the user/vehicle owner, even if those needs change. Thus, the disclosed universal vehicle cargo system 100 can be significantly modified without the need to re-tool or obtain a completely new universal vehicle cargo system 100.

In some embodiments, rigid frame sections 203A, 203B, 203C, and 203D are made of aluminum, steel, or any metal or alloy. In some embodiments, rigid frame sections 203A, 203B, 203C, and 203D are made of high density polymers, fiber glass, or carbon fiber material. In other embodiments rigid frame sections 203A, 203B, 203C, and 203D can be made of any material capable of providing rigid frame support and capable of being cut using common tools such as various types of saws, as discussed herein, and/or as known/available in the art at the time of filing, and/or as become known/available after the time of filing.

In some embodiments, rigid frame sections 203A, 203B, 203C, and 203D are tubular, or hollow, and/or with any cross section desired such as, but not limited to, a circular cross section, a square cross section, a rectangular cross section, a hexagonal cross section, or any cross section as discussed herein, and/or as known/available in the art at the time of filing, and/or as becomes known/available after the time of filing.

FIG. 4A shows a perspective view of a rigid frame section 203A, representative of any of rigid frame sections 203A, 203B, 203C, and 203D of FIG. 2, in accordance with one embodiment.

In some embodiments, rigid frame sections 203A, 203B, 203C, and 203D are themselves used as frame sides of the disclosed universal vehicle cargo systems. However, in other embodiments, such as that shown in FIGS. 1A, 1B, and 2, rigid frame sections 203A, 203B, 203C, and 203D are designed to be at least partially enclosed in separate multifunction frame body sections 103A, 103B, 103C, and 103D.

Figure 4B:
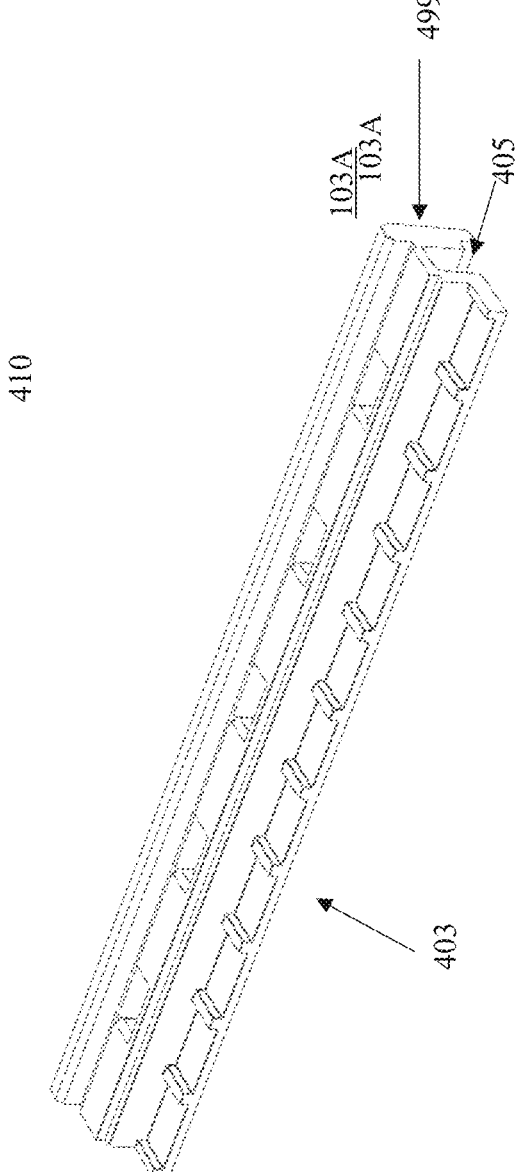
FIG. 4B shows a perspective view of a multifunction frame body section in accordance with one embodiment.

FIG. 4B shows a perspective view of a multifunction frame body section 103A representative of any of multifunction frame body sections 103A, 103B, 103C, and 103D of FIG. 2 in accordance with one embodiment.

FIG. 4C shows cross section 499A, in side and perspective view, of a multifunction frame body section 103A representative of any of multifunction frame body sections 103A, 103B, 103C, and 103D of FIG. 2 in accordance with one embodiment.

Referring now to FIGS. 1A, 1B, 2, 4A, 4B and 4C multifunction frame body sections 103A, 103B, 103C, and 103D, when used, include multifunction frame body section channels 405 through which at least part of a corresponding rigid frame section of rigid frame sections 203A, 203B, 203C, and 203D pass and which provide additional support for rigid frame sections 203A, 203B, 203C, and 203D.

In some embodiments, rigid frame section first ends 204A, 204B, 204C, 204D and rigid frame section second ends 206A, 206B, 206C, 206D of rigid frame sections 203A, 203B, 203C, and 203D then extend out of the channels 405 of multifunction frame body sections 103A, 103B, 103C, and 103D.

As discussed below, these extending end portions of rigid frame sections 203A, 203B, 203C, and 203D are then inserted into rigid frame section attachment position channels 302 (See FIGS. 3A and 5A) of multifunction corner units 101A, 101B, 101C, and 101D and removably secured in multifunction corner units 101A, 101B, 101C, and 101D to create the four universal vehicle cargo system frame sides 102A, 102B, 102C, and 102D of universal vehicle cargo system horizontal frame 190.

In one embodiment, the multifunction frame body sections 103A, 103B, 103C, and 103D have various multifunctional features formed in, on, attached to, multifunction frame body sections 103A, 103B, 103C, and 103D (not shown). These can include, but are not limited to, anchoring positions and mechanisms of various types, side support and mounting mechanisms, various attachment points and mechanisms, D-ring/carabiner attachment points, equipment hook or hanger attachment points, leg attachment mechanisms, vehicle connection devices, various attachment points and mechanisms, and/or any other multifunctional features desired and/or as discussed herein, and/or as known/available in the art at the time of filing, and/or as become known/available after the time of filing.

As noted, in one embodiment, multifunction frame body sections 103A, 103B, 103C, and 103D are designed to be customizable and interchangeable. To this end, in one embodiment, multifunction frame body sections 103A, 103B, 103C, and 103D are made of materials that can be cut to a desired length using tools generally available to the average end user/vehicle owner.

Consequently, using the disclosed embodiments, not only can multifunction frame body sections 103A, 103B, 103C, and 103D be cut to an initial desired length, but additional multifunction frame body sections can be obtained and then cut to other lengths to provide different length and width dimensions to meet the needs of the user/vehicle owner initially and as those needs may change. Thus, universal vehicle cargo system 100 can be significantly modified without the need to re-tool or obtain a completely new universal vehicle cargo system.

In addition, sets of, or individual, multifunction frame body sections 103A, 103B, 103C, and 103D can be obtained having specific multifunctional features, such as different anchor types, positions, orientations etc. Then, individual multifunction frame body sections 103A, 103B, 103C, and 103D having different multifunctional features, can be mixed, matched, or used as mixed sets in accordance with the needs of the user/vehicle owner.

In some embodiments, multifunction frame body sections 103A, 103B, 103C, and 103D can be made of various polymers, fiber glass, injections molded plastic, ceramics, composites, and/or carbon fiber material. In some embodiments, multifunction frame body sections 103A, 103B, 103C, and 103D can be made of aluminum, steel, or any metal or alloy. In some embodiments, multifunction frame body sections 103A, 103B, 103C, and 103D are made of any material capable of providing the desired features discussed herein and capable of being cut using common tools such as various types of saws, as discussed herein, and/or as known/available in the art at the time of filing, and/or as become known/available after the time of filing.

Figure 3A:
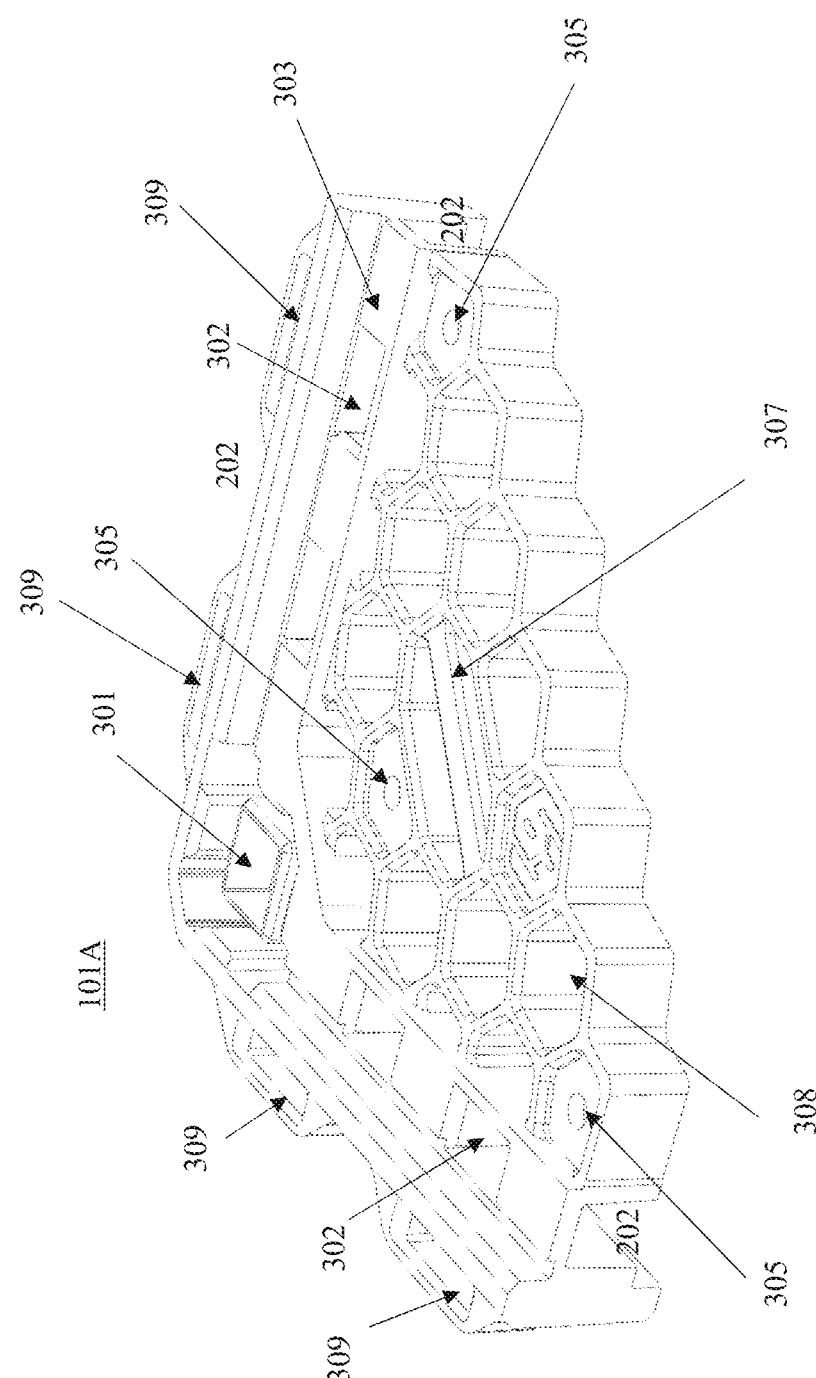
FIG. 3A shows a top perspective view of a multifunction frame corner unit in accordance with one embodiment.

FIG. 3A shows a top perspective view of a multifunction frame corner unit 101A representative of any of the multifunction frame corner units 101A, 101B, 101C, and 101D shown in FIG. 2, in accordance with one embodiment.

Figure 3B:
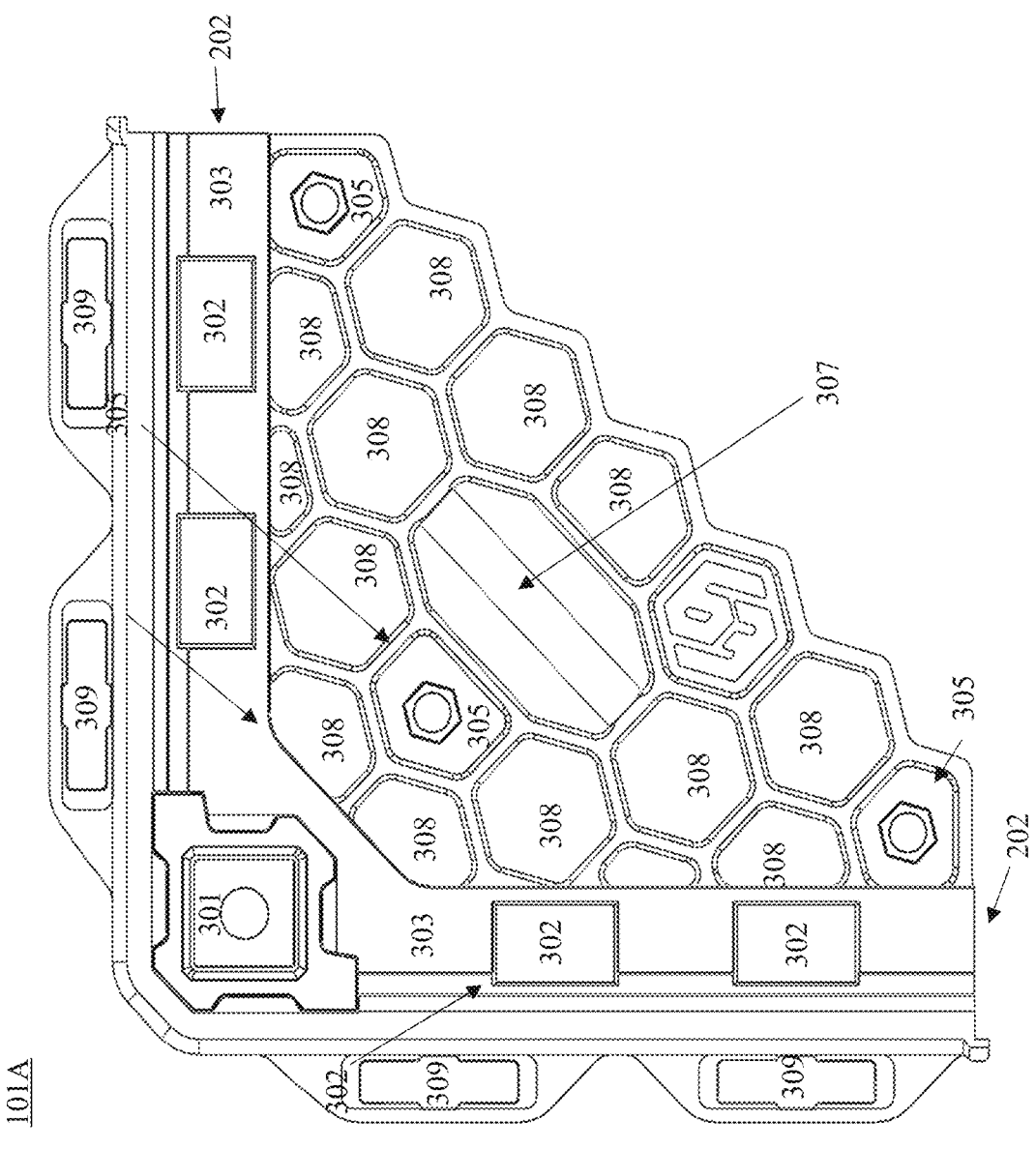
FIG. 3B shows a top view of a multifunction frame corner unit in accordance with one embodiment.

FIG. 3B shows a top view of multifunction frame corner unit 101A, representative of any of the multifunction frame corner units 101A, 101B, 101C, and 101D shown in FIG. 2 in accordance with one embodiment.

Figure 3C:
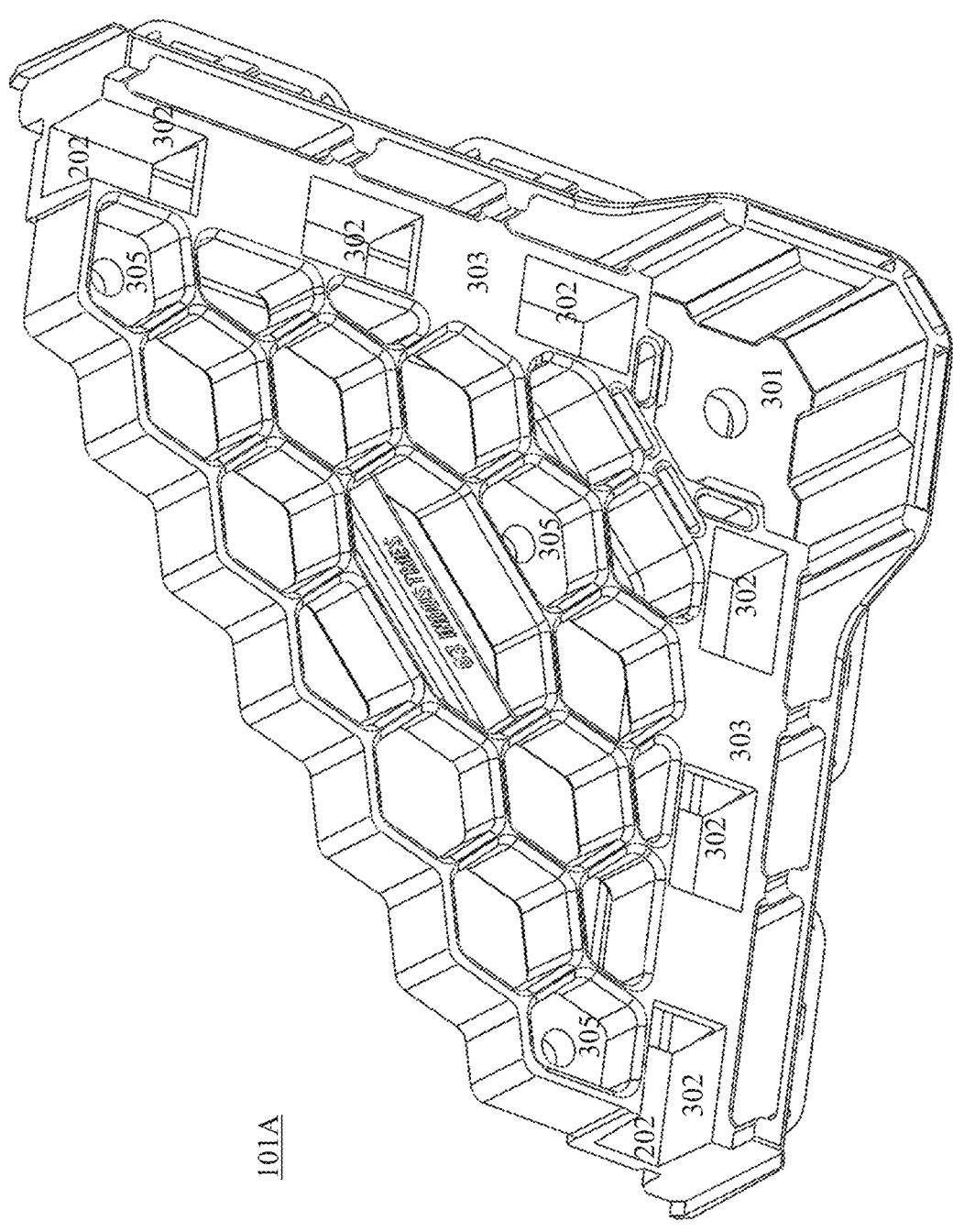
FIG. 3C shows a bottom perspective view of a multifunction frame corner unit in accordance with one embodiment.

FIG. 3C shows a bottom perspective view of multifunction frame corner unit 101A, representative of any of the multifunction frame corner units 101A, 101B, 101C, and 101D shown in FIG. 2 in accordance with one embodiment.

Figure 3D:
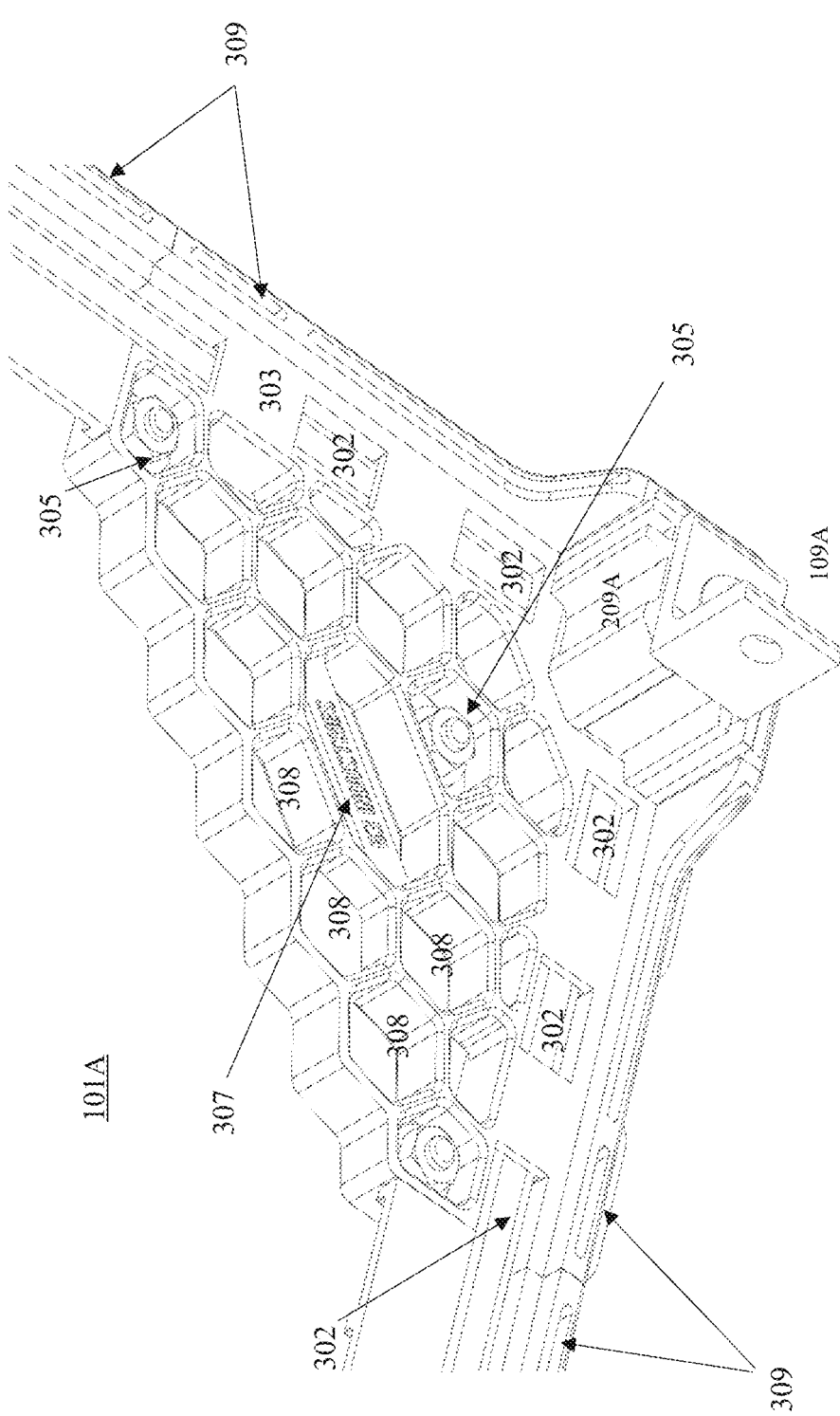
FIG. 3D shows a bottom perspective view of a multifunction frame corner unit, as assembled, in accordance with one embodiment.

FIG. 3D shows a bottom perspective view of multifunction frame corner unit 101A, representative of any of the multifunction frame corner units 101A, 101B, 101C, and 101D shown in FIG. 2, as assembled, in accordance with one embodiment.

Referring to FIGS. 1A, 1B, 2, 4A, 3A, 3B, 3C, and 3D, multifunction frame corner unit 101A includes rigid frame section attachment position 202, including in this example rigid frame section attachment position channel 302; frame support attachment mechanism 301; corner unit deck/rack support ledge 303; corner unit deck attachment point 305; strap down anchor 307; corner unit multifunctional feature 309; and corner unit weight reduction voids 308.

In one embodiment, rigid frame section attachment positions 202 are locations on or in multifunction frame corner unit 101A where rigid frame section first ends 204A, 204B, 204C, 204D and/or rigid frame section second ends 206A, 206B, 206C, 206D of rigid frame sections 203A, 203B, 203C, and 203D are removably attached to multifunction frame corner unit 101A.

In one embodiment, rigid frame section attachment positions 202 include rigid frame section attachment position channels 302. In one embodiment, end portions of rigid frame sections 203A, 203B, 203C, and 203D are inserted into rigid frame section attachment position channels 302 of multifunction corner units 101A, 101B, 101C, and 101D and removably secured in multifunction corner units 101A, 101B, 101C, and 101D to create the four universal vehicle cargo system frame sides 102A, 102B, 102C, and 102D.

In other embodiments, rigid frame section attachment positions 202 can be any mechanism for removably attaching rigid frame sections 203A, 203B, 203C, and 203D to multifunction frame corner units 101A, 102B, 102C, and 102D, as discussed herein, and/or as known available in the art at the time of filing, and/or as developed or made available after the time of filing.

In one embodiment, frame support attachment mechanism 301 is used at attach frame support mechanisms to multifunction frame corner units 101A, 102B, 102C, and 102D. In various embodiments, the frame support mechanisms are used to support universal vehicle cargo system 100. In one embodiment, frame support attachment mechanism 301 can be an expansion joint, recessed joint, socket joint, threaded screw and hole, bolt hole/bolt/nut, or any other attachment mechanism capable of attaching a frame support mechanism to multifunction frame corner units 101A, 102B, 102C, and 102D and universal vehicle cargo system 100 as discussed herein, and/or as known available in the art at the time of filing, and/or as developed or made available after the time of filing.

In various embodiments, the frame support mechanisms can be frame support legs, such as frame support legs 107A and 107B. In other embodiments, the frame support mechanisms can be vehicle connection devices, such as hinge connection devices 109A and 109B and hinge device spacers 209A and 209B. In other embodiments, the frame support mechanisms can be any devices, systems, or mechanisms that can be used to support universal vehicle cargo system 100, as discussed herein, and/or as known available in the art at the time of filing, and/or as developed or made available after the time of filing.

In one embodiment, corner unit deck/rack support ledge 303 is used to support a universal vehicle cargo system deck, such as deck 105, and/or a universal vehicle cargo system rack, such as interchangeable racks discussed in more detail below.

In one embodiment, corner unit deck attachment points 305 are used to removably attach/secure a universal vehicle cargo system deck, such as deck 105, to universal vehicle cargo system 100. In various embodiments, corner unit deck attachment points 305 can be cinch fasteners, screws, bolts, or any mechanism for removably attaching/securing a universal vehicle cargo system deck, such as deck 105, to universal vehicle cargo system 100, as discussed herein, and/or as known available in the art at the time of filing, and/or as developed or made available after the time of filing.

In one embodiment, strap down anchor 307 can an anchor or pass thorough for a strap used to secure universal vehicle cargo system 100 to a vehicle.

In various embodiments, corner unit multifunctional features 309 can be formed in, or on, multifunction corner unit 101A. These can include, but are not limited to, anchoring positions and mechanisms of various types, side support and mounting mechanisms, various attachment points and mechanisms, D-ring/carabiner attachment points, equipment hook or hanger attachment points, leg attachment mechanisms, seat vehicle connection devices, and/or any other multifunctional features desired and/or as discussed herein, and/or as known/available in the art at the time of filing, and/or as become known/available after the time of filing.

In one embodiment, corner unit weight reduction voids 308 are created to lighten the overall weight of multifunction corner unit 101A and universal vehicle cargo system 100.

In various embodiments, multifunction corner unit 101A can be formed by injection molding of various polymers; aluminum; steel; a metal alloy; high density polymers; fiber glass; carbon fiber; or any material capable of being formed into multifunction corner unit 101A to provide the described features of multifunction corner unit 101A as discussed herein, and/or as known/available in the art at the time of filing, and/or as become known/available after the time of filing.

Referring now to FIGS. 1A, 1B, 2, 3A, 3B, 3C, 3D, 3E, 3F, 3G, 4A, 4B, and 4C, together, in one embodiment, multifunction corner units multifunction frame corner units 101A, 101B, 101C, and 101D are used at each intersection of rigid frame sections 203A, 203B, 203C, and 203D and/or multifunction frame body sections 103A, 103B, 103C, and 103D, i.e., at each corner of the disclosed universal vehicle cargo systems.

As noted above, in some embodiments, rigid frame section first ends 204A, 204B, 204C, 204D and rigid frame section second ends 206A, 206B, 206C, 206D of rigid frame sections 203A, 203B, 203C, and 203D extend out of the channels 405 of multifunction frame body sections 103A, 103B, 103C, and 103D.

As also noted above, these extending end portions of rigid frame sections 203A, 203B, 203C, and 203D are then inserted into rigid frame section attachment position channels 302 of multifunction corner units 101A, 101B, 101C, and 101D and removably secured in multifunction corner units 101A, 101B, 101C, and 101D to create the four universal vehicle cargo system frame sides 102A, 102B, 102C, and 102D.

To this end, in one embodiment, each multifunction corner unit 101A, 101B, 101C, and 101D has two rigid frame section attachment position channels 302, or openings, having longitudinal axes at approximately ninety degree angles to each other.

In this way when a first end 204A, 204B, 204C, or 204D or a rigid frame section second end 206A, 206B, 206C, or 206D of a first one of rigid frame sections 203A, 203B, 203C, or 203D is inserted into a first channel 302 of the two multifunction corner unit channels of a first multifunction corner unit 101A, 101B, 101C, or 101D and a first end 204A, 204B, 204C, or 204D or a second end 206A, 206B, 206C, or 206D of a second one of rigid frame sections 203A, 203B, 203C, and 203D is inserted into the second channel 302 of the two multifunction corner unit channels of the first multifunction corner unit 101A, 101B, 101C, and 101D, the longitudinal axis 208A, 208B, 208C, or 208D of the first rigid frame section is at approximately ninety degrees with respect to the longitudinal axis 208A, 208B, 208C, or 208D of the second rigid frame section. In this way the first and second rigid frame sections and first multifunction corner unit form a first corner with first and second sides.

As discussed below with respect to FIGS. 5A through 5H, this process is then repeated for each of multifunction corner units 101A, 101B, 101C, and 101D and rigid frame sections 203A, 203B, 203C, and 203D until all four sides 102A, 102B, 102C, and 102D are removably attached to form a four sided horizontal frame 190 with each side 102A, 102B, 102C, and 102D at approximately ninety degrees with respect to the side adjacent to it.

As noted above, in one embodiment, when multifunction frame body sections 103A, 103B, 103C, and 103D are used they include multifunction frame body section rigid frame section channels 405, or slots, through which at least part of rigid frame sections 203A, 203B, 203C, and 203D pass and which provide additional support for rigid frame sections 203A, 203B, 203C, and 203D.

As discussed in more detail below, in these embodiments, multifunction frame body sections 103A, 103B, 103C, and 103D can be slid onto their respective rigid frame sections 203A, 203B, 203C, and 203D before the universal vehicle cargo system sides 102A, 102B, 102C, and 102D are assembled as discussed above.

Then, rigid frame section first ends 204A, 204B, 204C, 204D and rigid frame section second ends 206A, 206B, 206C, 206D of rigid frame sections 203A, 203B, 203C, and 203D that extend out of the channels 405 of multifunction frame body sections 103A, 103B, 103C, and 103D can be inserted into rigid frame section attachment position channels 302 of multifunction corner units 101A, 101B, 101C, and 101D as discussed above.

In various embodiments, multifunction frame body sections 103A, 103B, 103C, and 103D have various multifunctional features 309 formed in, or on, them. These can include, but are not limited to, anchoring positions and mechanisms of various types, side support and mounting mechanisms, various attachment points and mechanisms, D-ring/carabiner attachment points, equipment hook or hanger attachment points, leg attachment mechanisms, vehicle connection devices, quick release anchoring positions, various other attachment points and mechanisms, and/or any other multifunctional features desired and/or as discussed herein, and/or as known/available in the art at the time of filing, and/or as become known/available after the time of filing.

Similarly, as noted above, in various embodiments, multifunction corner units multifunction corner units 101A, 101B, 101C, and 101D can have various multifunctional features formed in, or on, multifunction corner units multifunction corner units 101A, 101B, 101C, and 101D. These can include, but are not limited to, anchoring positions and mechanisms of various types, side support and mounting mechanisms, various attachment points and mechanisms, D-ring/carabiner attachment points, equipment hook or hanger attachment points, leg attachment mechanisms, vehicle connection devices, quick release anchoring positions, various other attachment points and mechanisms, and/or any other multifunctional features desired and/or as discussed herein, and/or as known/available in the art at the time of filing, and/or as become known/available after the time of filing.

Figure 3E:
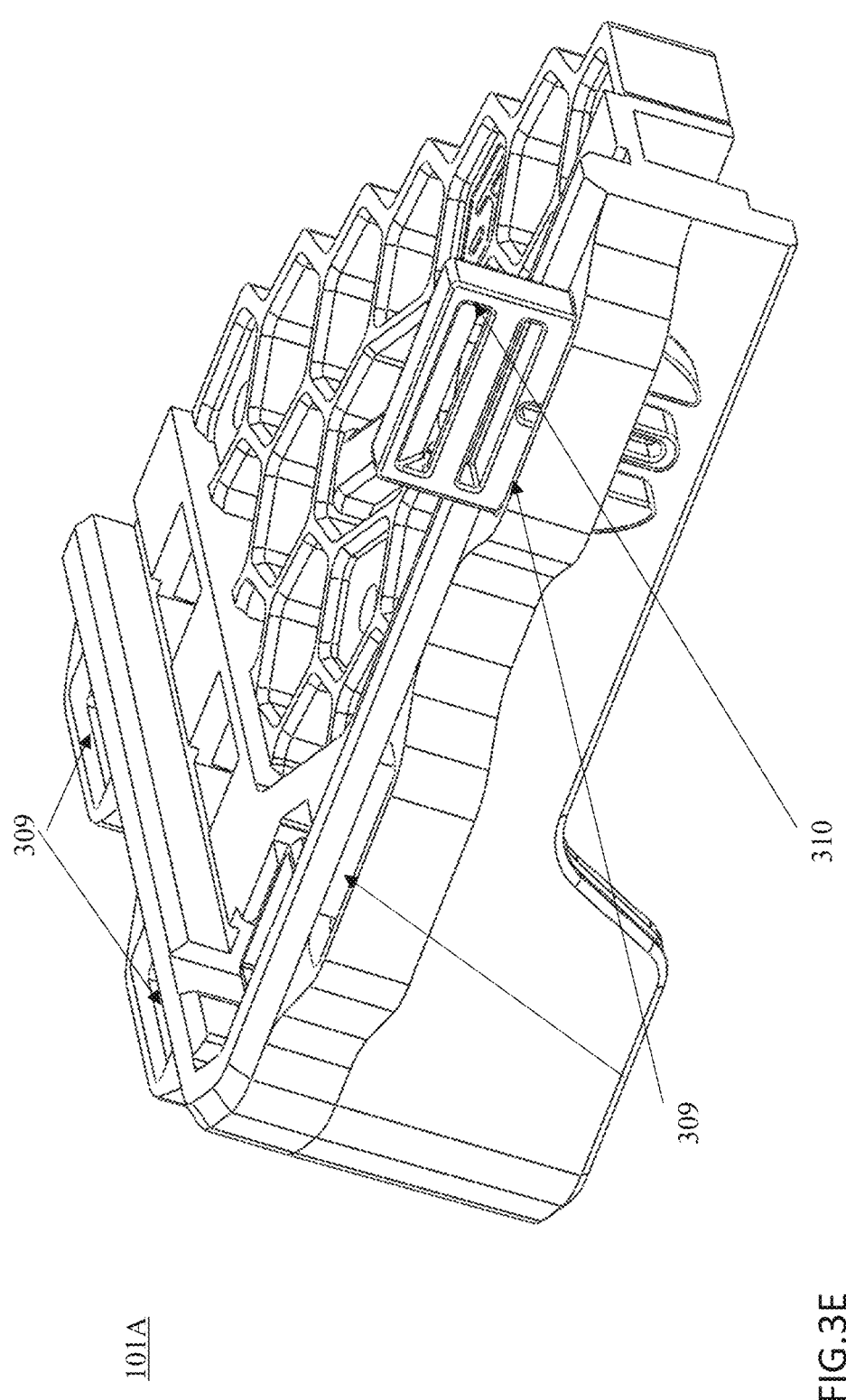
FIG. 3E shows a partial side perspective view of a multifunction frame corner unit including a quick release buckle positioned in a corner unit multifunctional feature in accordance with one embodiment.

FIG. 3E shows a partial side perspective view of multifunction frame corner unit 101A, representative of any of the multifunction frame corner units 101A, 101B, 101C, and 101D shown in FIG. 2 including a quick release clip 310 positioned in a corner unit multifunctional feature 309 in accordance with one embodiment.

Figure 3F:
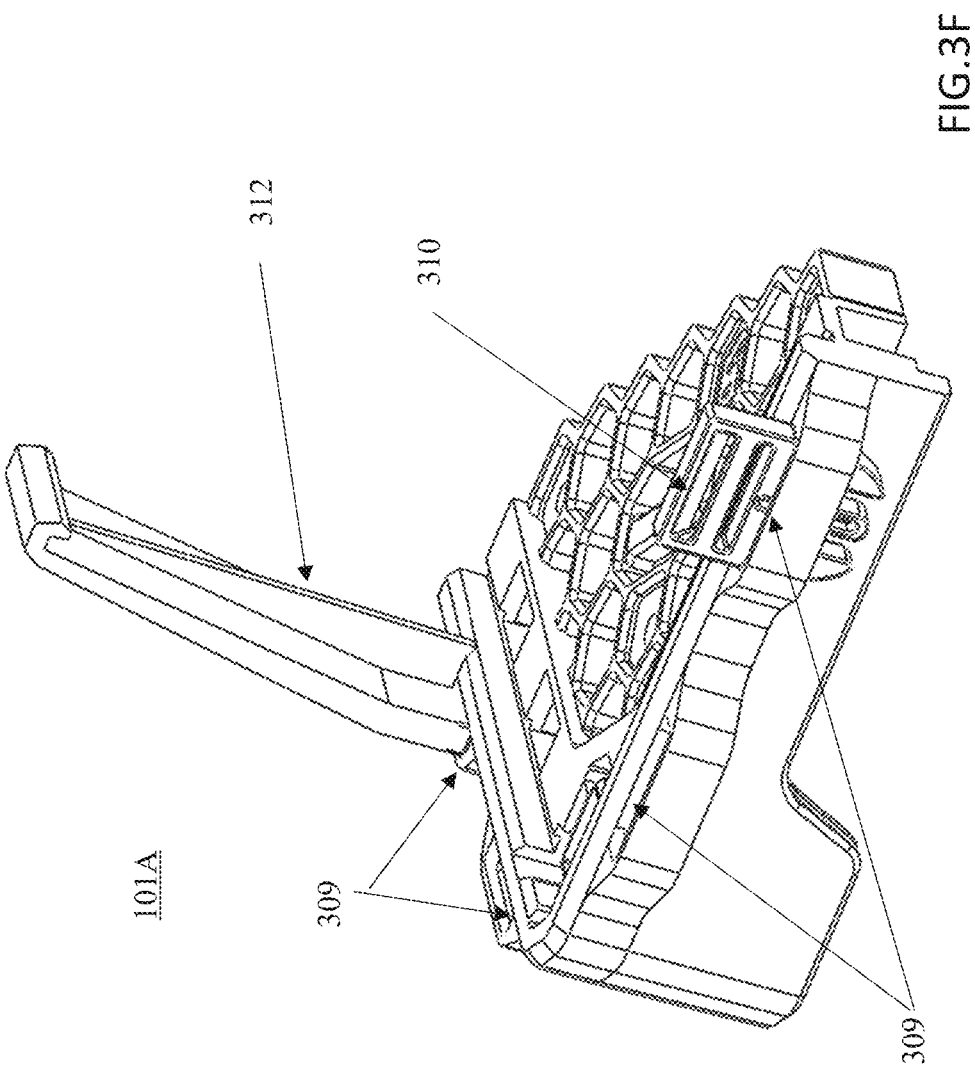
FIG. 3F shows a partial side perspective view of a multifunction frame corner unit including a quick release buckle positioned in one corner unit multifunctional feature and side panel stay positioned in a second corner unit multifunctional feature in accordance with one embodiment.

FIG. 3F shows a partial side perspective view of multifunction frame corner unit 101A, representative of any of the multifunction frame corner units 101A, 101B, 101C, and 101D shown in FIG. 2 including a quick release clip 310 positioned in a first multifunction frame corner unit multifunctional feature 309 and side panel stay 312 positioned in a second multifunction frame corner unit multifunctional feature 309 in accordance with one embodiment.

Figure 3G:
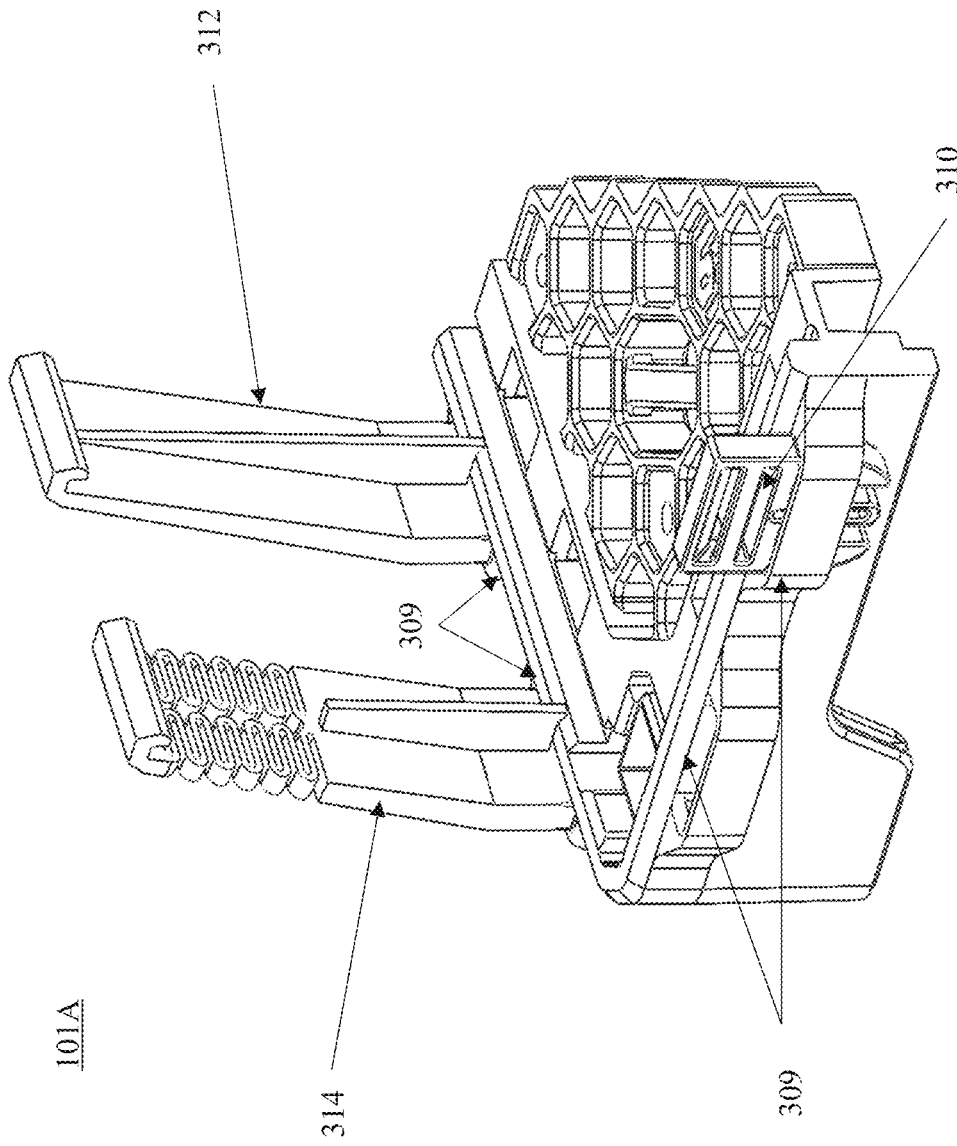
FIG. 3G shows a partial side perspective view of a multifunction frame corner unit including a quick release buckle positioned in one corner unit multifunctional feature, side panel stay positioned in a second corner unit multifunctional feature, and a spring tension side panel stay positioned in a third corner unit multifunctional feature in accordance with one embodiment.

FIG. 3G shows a partial side perspective view of multifunction frame corner unit 101A, representative of any of the multifunction frame corner units 101A, 101B, 101C, and 101D shown in FIG. 2 including a quick release clip 310 positioned in a first multifunction frame corner unit multifunctional feature 309, side panel stay 312 positioned in a second multifunction frame corner unit multifunctional feature 309, and spring tension side panel stay 314 positioned in a third multifunction frame corner unit multifunctional feature 309 in accordance with one embodiment.

As seen in FIGS. 3E, 3F, and 3G, multiple functions can be provided by virtue of the multifunction frame corner unit multifunctional features 309 formed in multifunction frame corner units 101A, 101B, 101C, and 101D. Consequently, as is true with the multifunction frame body sections, in various embodiments, the multifunction corner units can be formed to include various, and different, multifunctional features. Then sets or individual multifunction corner units can be obtained having specific multifunctional features, such as different anchor types, positions, orientations etc. Then, multifunction corner units having different multifunctional features, can be mixed, matched, or used as mixed sets in accordance with the changing needs of the user/vehicle owner. Thus, the disclosed embodiments provide a versatility of function that is not available in the prior art.

Referring back to FIG. 2, in various embodiments, one or more frame support legs 107C and 107D are used with universal vehicle cargo system 100. In one embodiment, the one or more frame support legs 107C and 107D have various multifunctional features formed in the one or more frame support legs (not shown). These can include, but are not limited to, anchoring positions and mechanisms of various types, clamping mechanisms, various attachment points and mechanisms, D-ring/carabiner attachment points, hooks and/or hangers, and/or any other multifunctional features desired and/or as discussed herein, and/or as known/available in the art at the time of filing, and/or as become known/available after the time of filing.

In addition, in some embodiments, the shape of the one or more frame support legs 107C and 107D themselves is designed to provide one or more functions.

Figure 5A:
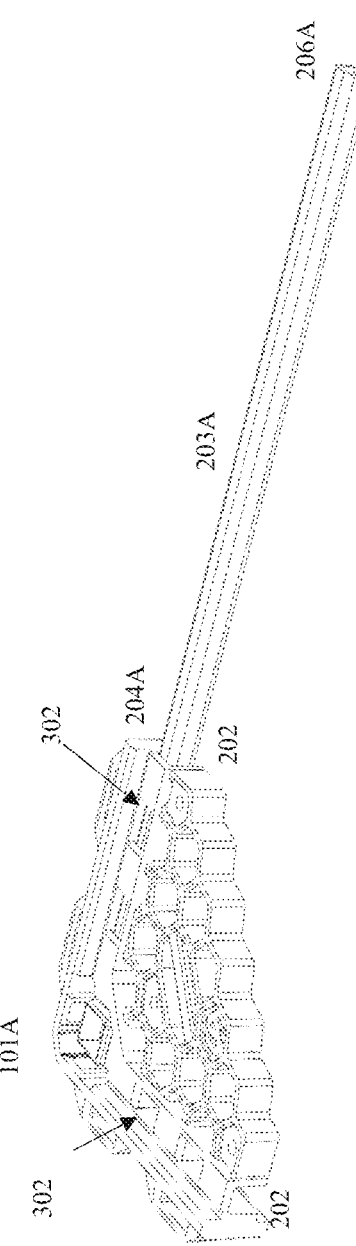
FIGS. 5A through 5H show the major steps for assembling one embodiment of a universal vehicle cargo system using the components discussed herein in accordance with one embodiment.
Figure 5B:
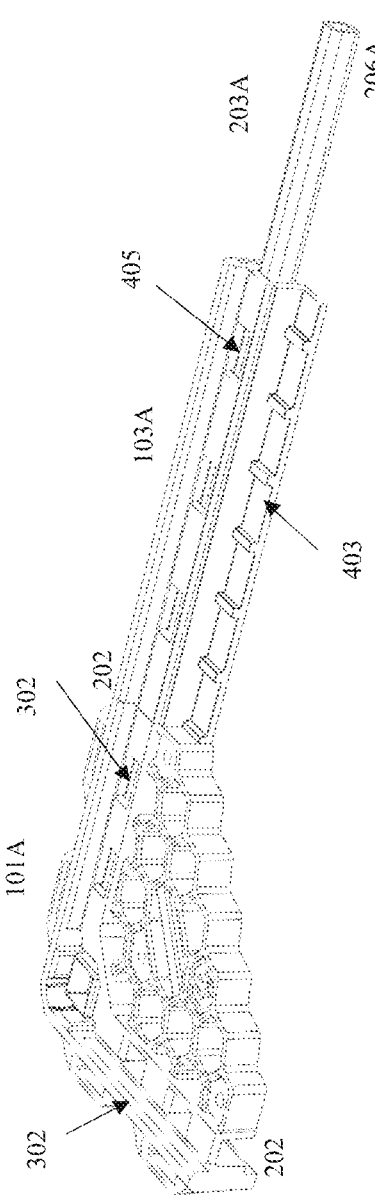
Figure 5C:
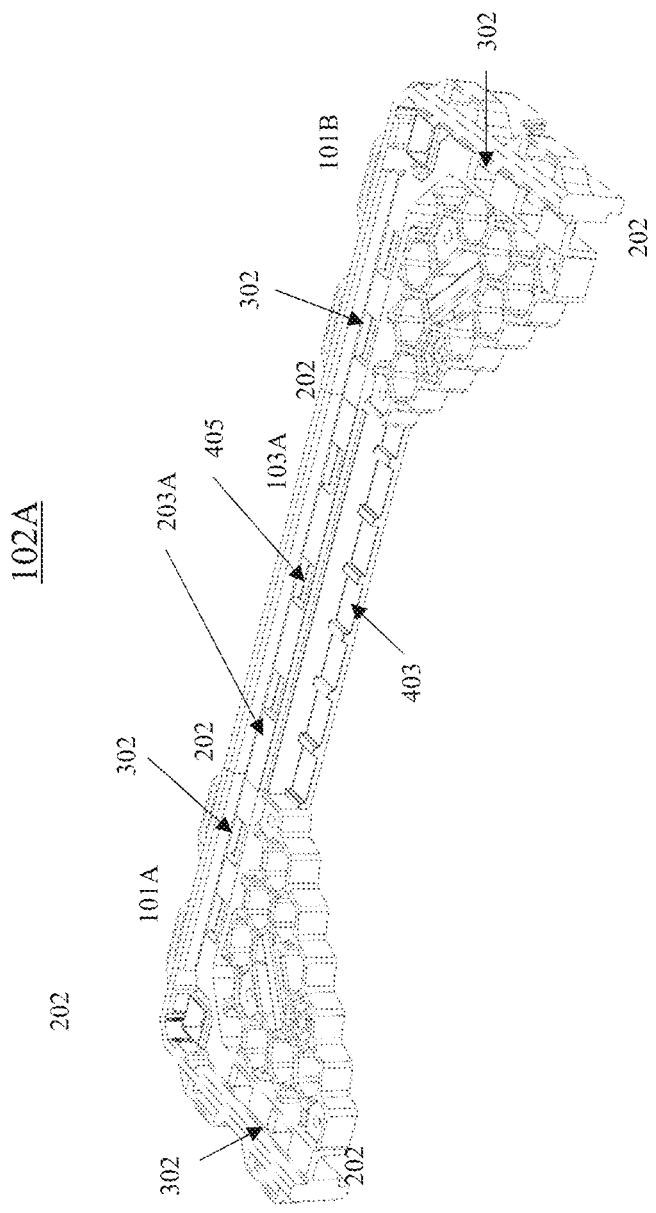
Figure 5D:
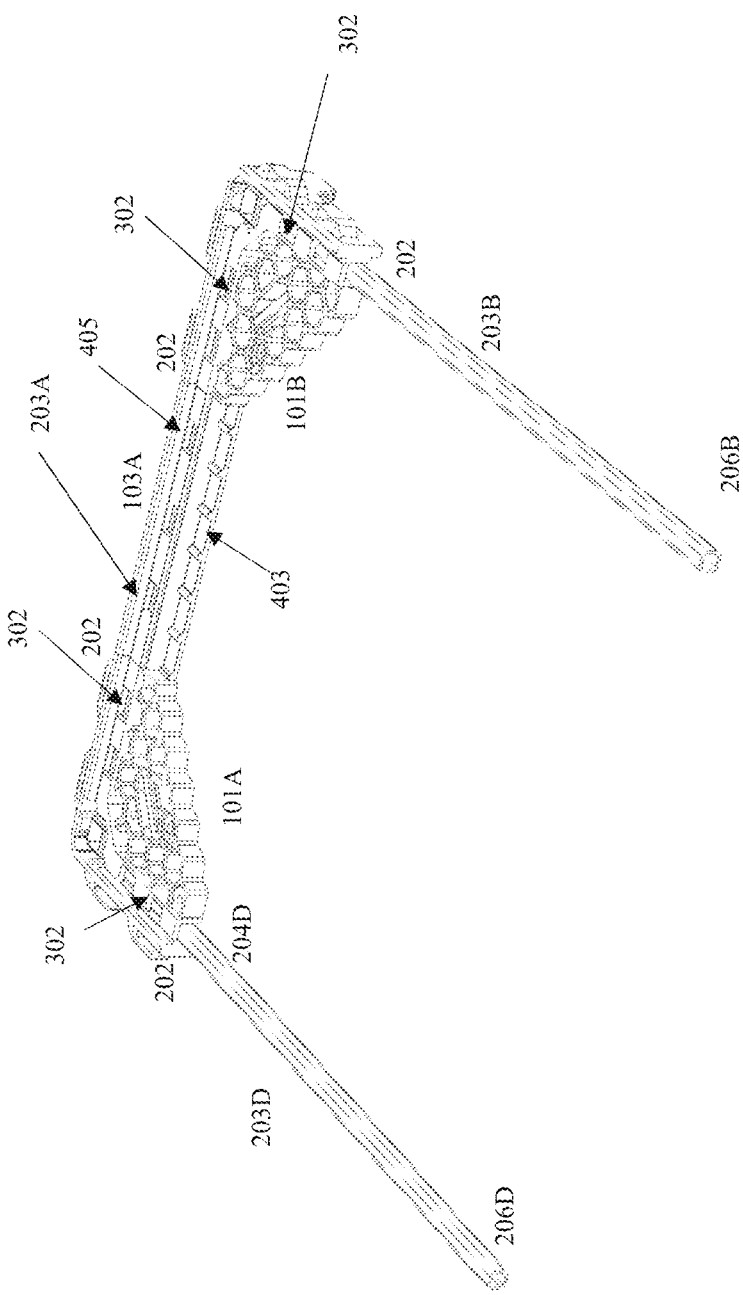
Figure 5E:
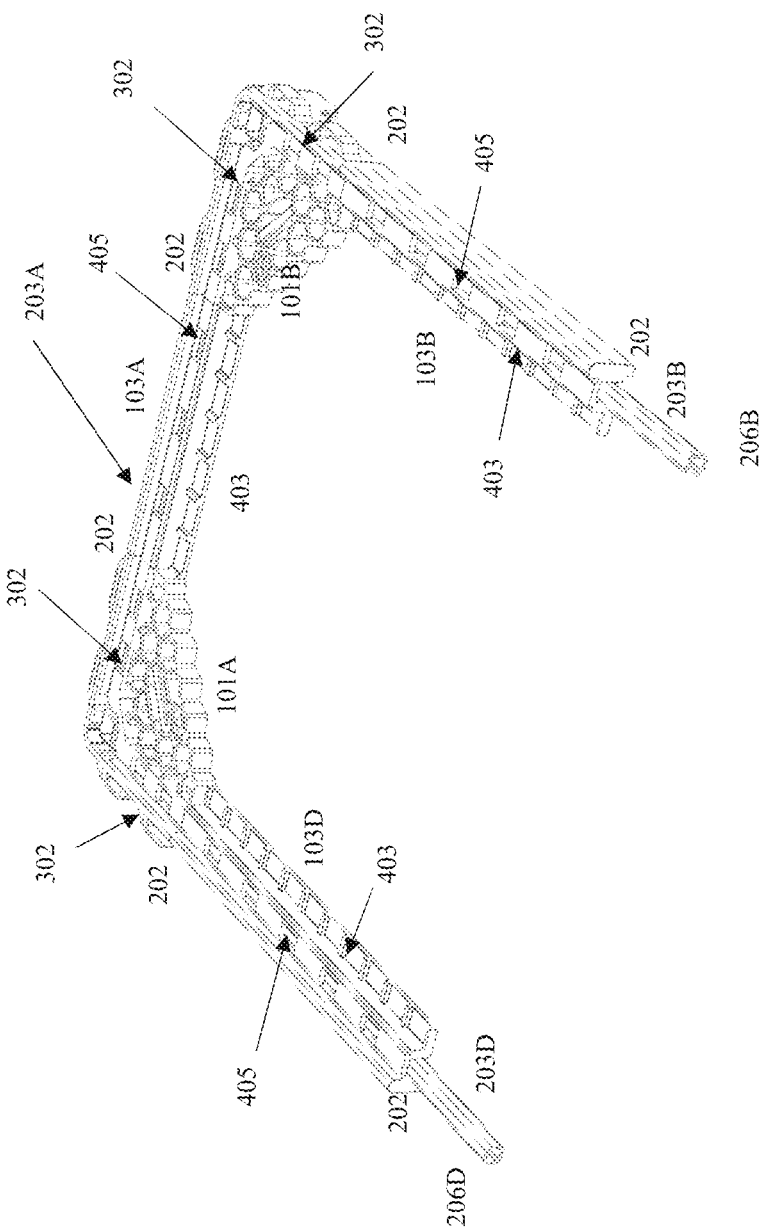
Figure 5F:
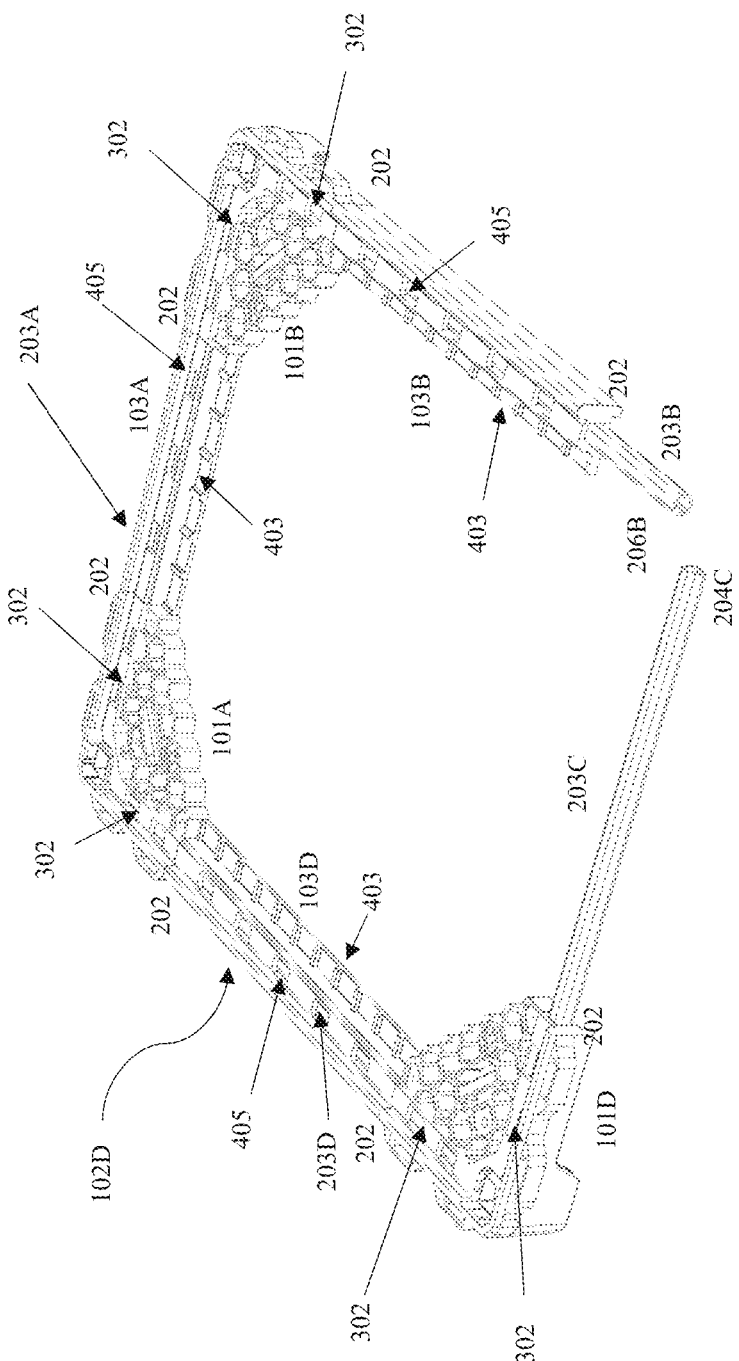
Figure 5G:
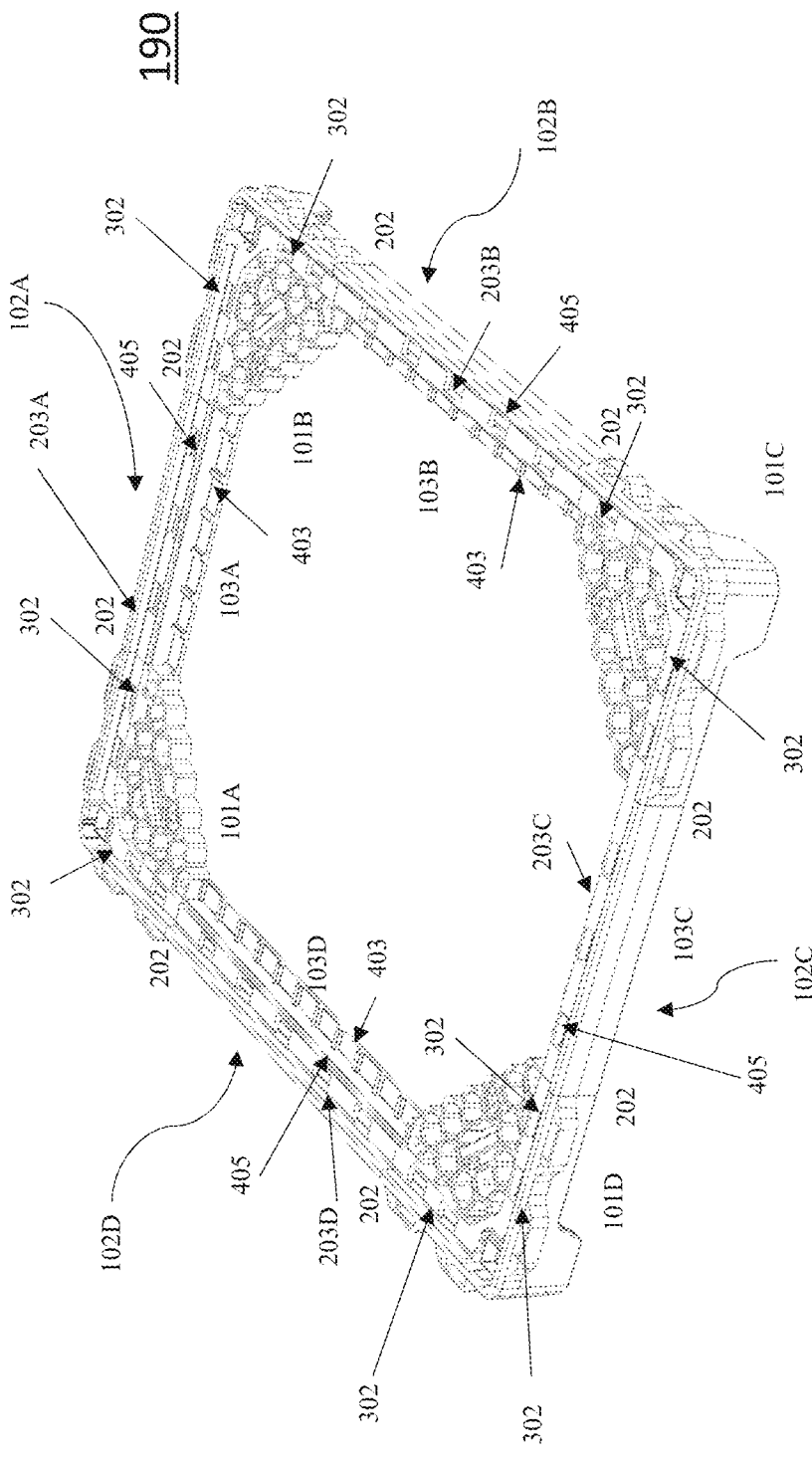

FIG. 5I shows three perspective views of a frame support leg 107C, representative of any of the disclosed support legs, in accordance with one embodiment. FIG. 5J shows a cross sectional view of frame support leg 107C in accordance with one embodiment.

As seen in FIGS. 5I and 5J, in one embodiment, frame support leg 107C, representative of any of the disclosed frame support legs, has a cross section designed to allow for the attachment of various multifunction features by providing non-parallel attachment surfaces 581 and 583 that can readily accept clamps and other attachment devices in a way similar to picatinny rail systems used in the firearms sector.

This novel frame support leg structure allows for any of various multifunctional features discussed herein, and/or as known/available in the art at the time of filing, and/or as become known/available after the time of filing, to be securely clamped to the disclosed frame support legs, such as frame support leg 107C.

As also seen in FIGS. 5I and 5J, in some embodiments, the disclosed frame support legs such as frame support leg 107C, include side panel support channels 591 and 593 used to support side panel sections as discussed in more detail below.

In one embodiment, the one or more frame support legs 107C and 107D, seat hinge attachment devices 109A and 109B, and vehicle attachment device spacers 209A and 209B, are designed to be customizable and interchangeable. Consequently, in one embodiment, frame support legs 107C and 107D are made from materials that can be cut to a desired length using tools generally available to the average end user/vehicle owner. Consequently, using the disclosed embodiments, not only can the one or more frame support legs 107C and 107D be cut to an initial desired length, but additional one or more frame support legs can be obtained and then cut to other lengths to provide different length legs if the needs of the user/vehicle owner change, such as a new use, new vehicle, different cargo/equipment, etc.

In addition, sets of individual frame support legs can be obtained having specific multifunctional features, such as different anchor types, positions, orientations etc. and of different lengths. Then, individual frame support legs having different multifunctional features and sizes, can be mixed, matched, or used as mixed sets in accordance with the changing needs of the user/vehicle owner.

In some embodiments, the one or more frame support legs 107C and 107D can be made of various polymers, fiber glass, molded plastic, ceramics, composites, and/or carbon fiber material. In some embodiments, the one or more frame support legs 107C and 107D can be made of aluminum, steel, or any metal or alloy. In some embodiments, the one or more frame support legs 107C and 107D are made of any material capable of providing the desired support and features discussed herein and that are capable of being cut using common tools such as various types of saws, as discussed herein, and/or as known/available in the art at the time of filing, and/or as become known/available after the time of filing.

Referring back to FIG. 2, in various embodiments, the one or more frame support legs 107C and 107D can be attached to multifunction corner units 101A, 101B, 101C, and/or 101D. In one embodiment, two frame support legs 107C and 107D are attached to multifunction corner units 101C and 101D that form side 102C of the resulting deck frame of universal vehicle cargo system 100.

In some embodiments, seat hinge connection devices 109A and 109B are attached to the other multifunction corner units, i.e., multifunction corner units 101A and 101B, that form side 102A of the resulting deck frame of universal vehicle cargo system 100 that is opposite and parallel to side 102C of the resulting deck frame of universal vehicle cargo system 100. in one embodiment, hinge attachment device spacers 209A and 209B are used to attach seat hinge connection devices 109A and 109B at the correct positions.

As discussed in more detail below, in these embodiments, all or a portion of the vehicle rear seat is either removed or folded back. Then, the seat hinge connection devices 109A and/or 109B are used to secure side 102A of universal vehicle cargo system 100 directly to the seat hinges of the removed, or folded back, seat portion (See FIG. 11A discussed below).

Returning to FIG. 2, in one embodiment, side 102C of universal vehicle cargo system 100 is then supported by the two frame support legs 107C and 107D so that a level platform is provided a desired height above the vehicle floor, regardless of the level, or lack of level, of the actual vehicle floor.

In various embodiments, different seat hinge connection devices 109A and 109B and/or vehicle attachment device spacers 209A and 209B may be required for different vehicles. However, in one embodiment, the seat hinge connection devices 109A and 109B and/or vehicle attachment device spacers 209A and 209B are removably attached to the multifunction corner units 101A and 101B. This allows the different seat hinge connection devices 109A and 109B to be removed and/or attached as needed to adapt to different vehicles. This is in direct contrast to the prior art vehicle specific systems, and most homemade systems, discussed above.

Figure 6A:
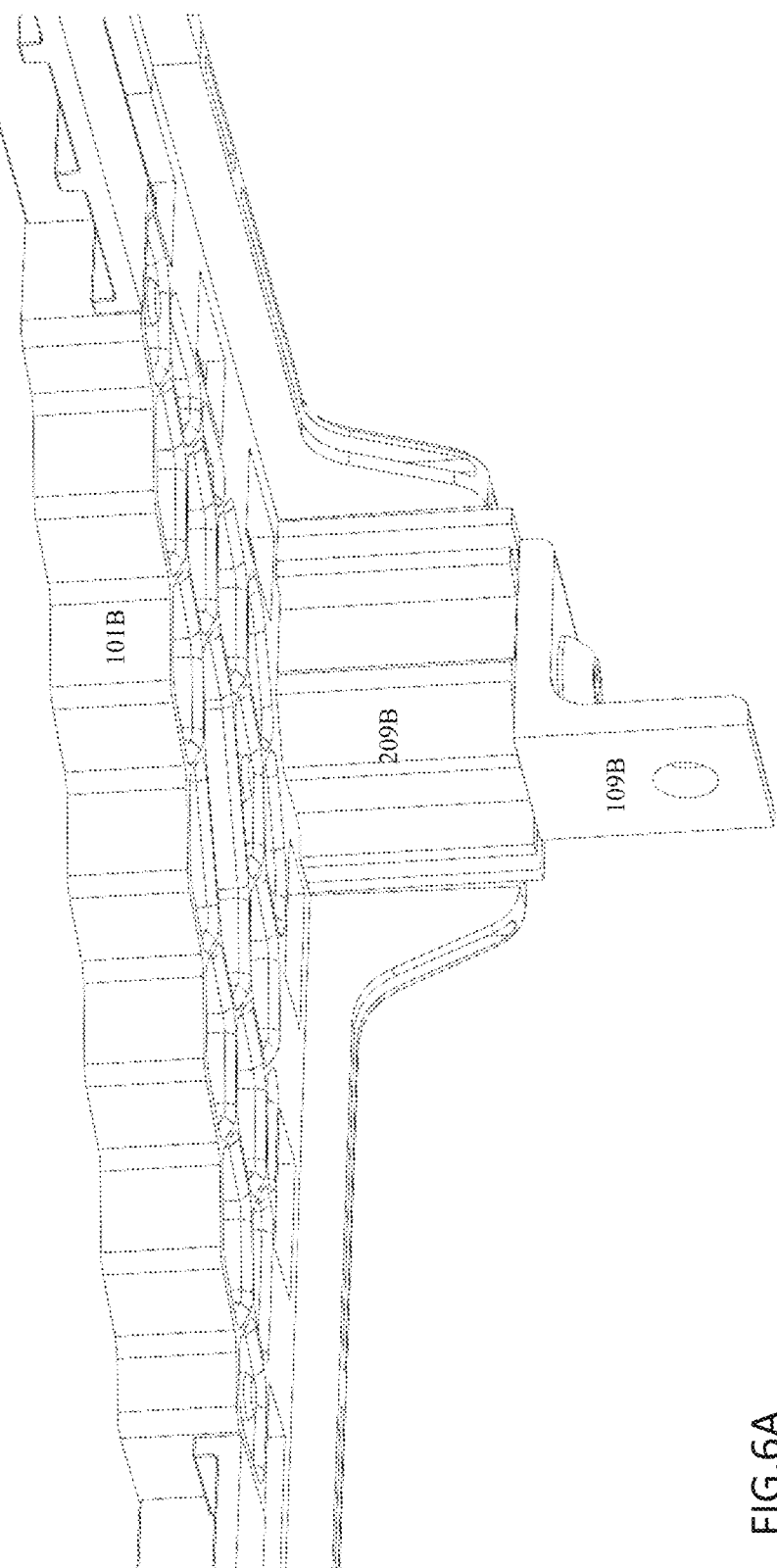
FIG. 6A shows a first perspective view of a vehicle connection device, in this specific example a seat hinge connection device, attached to a multifunction frame corner unit in accordance with one embodiment.

FIG. 6A shows a first perspective view of a seat hinge connection device 109B, representative of any of the seat hinge connection device 109B disclosed herein, attached to a multifunction frame corner unit 101B using a vehicle attachment device spacer 209B in accordance with one embodiment.

Figure 6B:
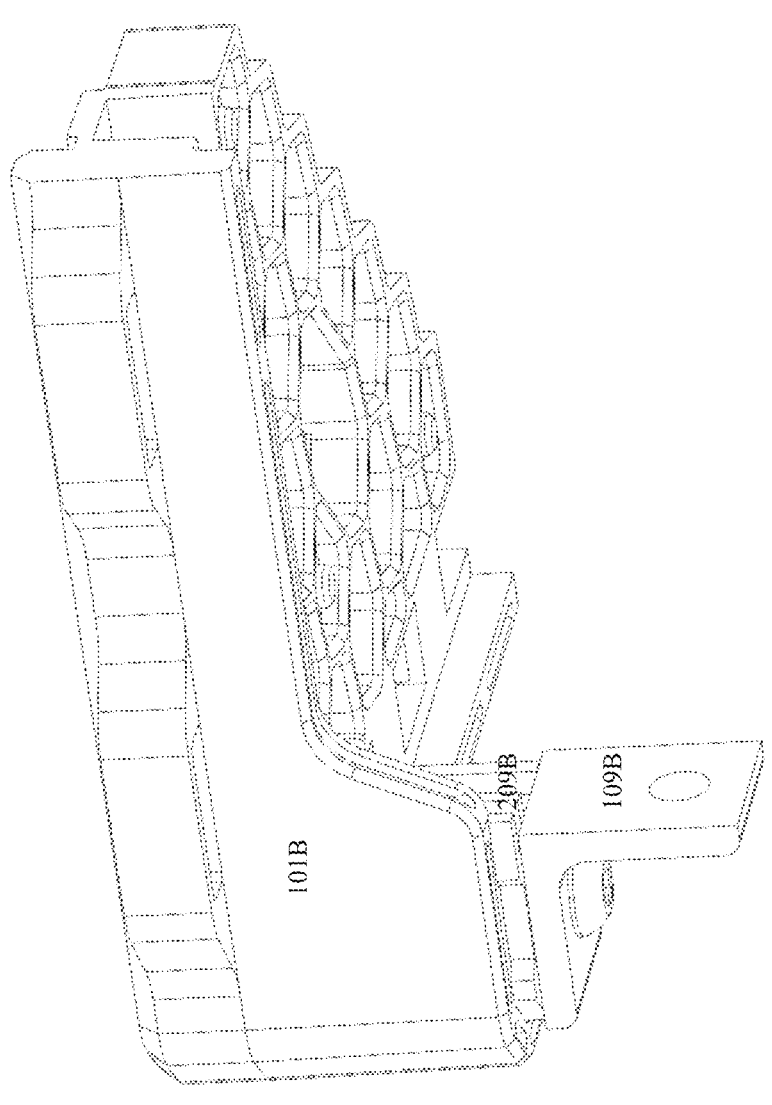
FIG. 6B shows a second perspective view of a vehicle connection device, in this specific example a seat hinge connection device, attached to a multifunction frame corner unit in accordance with one embodiment.

FIG. 6B shows a second perspective view of seat hinge connection device 109B attached to multifunction frame corner unit 101B using a vehicle attachment device spacer 209B in accordance with one embodiment.

Figure 6C:
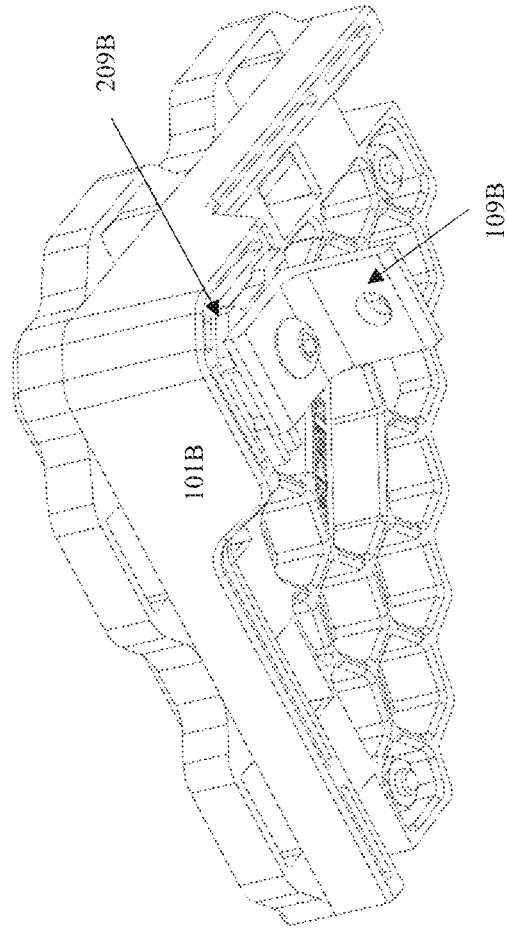
FIG. 6C shows a bottom perspective view of a vehicle connection device, in this specific example a seat hinge connection device, attached to a multifunction frame corner unit in accordance with one embodiment.

FIG. 6C shows a bottom perspective view of seat hinge connection device 109A attached to multifunction frame corner unit 101B using a vehicle attachment device spacer 209B in accordance with one embodiment.

In various other embodiments (not shown), four frame support legs, such as frame support legs 109A and 109B are attached to each of the four multifunction corner units 101A, 101B, 101C, 101D. In one embodiment, first and second frame support legs, such as frame support legs 109A and 109B, can be of a first length. In one embodiment, these first two frame support legs of the first length are attached to the multifunction corner units 101C and 101D that form side 102C of the resulting frame of universal vehicle cargo system 100

In one embodiment, third and fourth frame support legs, similar to frame support legs 109A and 109B, of a second length are attached to multifunction corner units 101A and 101B that form side 102A of universal vehicle cargo system 100.

In these embodiments, the side 102C of universal vehicle cargo system is then supported by the frame support legs of the first height and side 102A of universal vehicle cargo system 100 is supported by the frame support legs of the second height. In this way, a level platform can be provided a desired height above the vehicle floor, regardless of the level, or lack of level, of the actual vehicle floor.

In various other embodiments, identical height frame support legs are attached to each of the four multifunction corner units. In these embodiments, all four sides of the universal vehicle cargo system is then supported by the four identical frame support legs at a first height. In this way, a level platform can be provided a desired height above the vehicle floor.

Figure 5H:
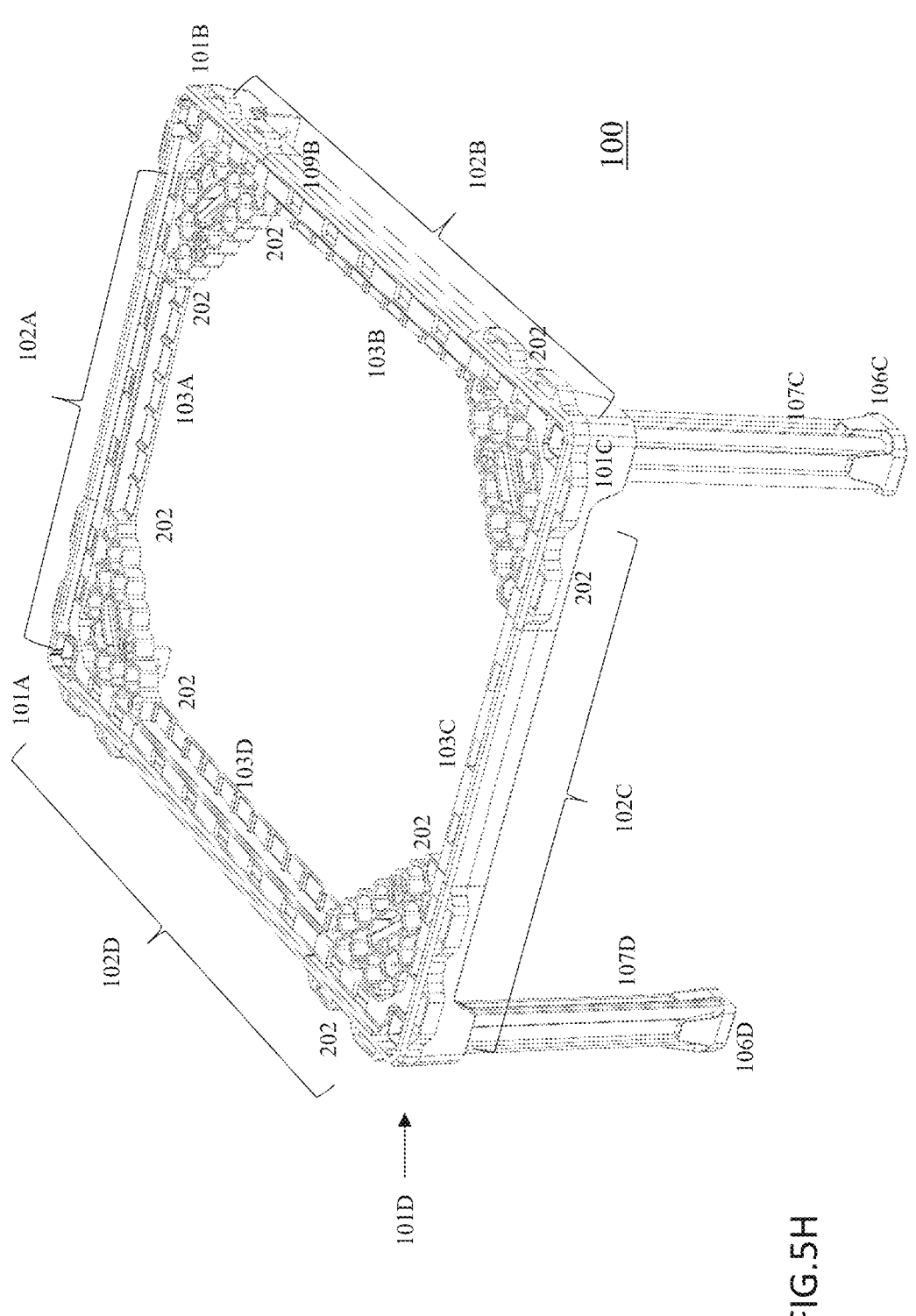
Figure 5J:
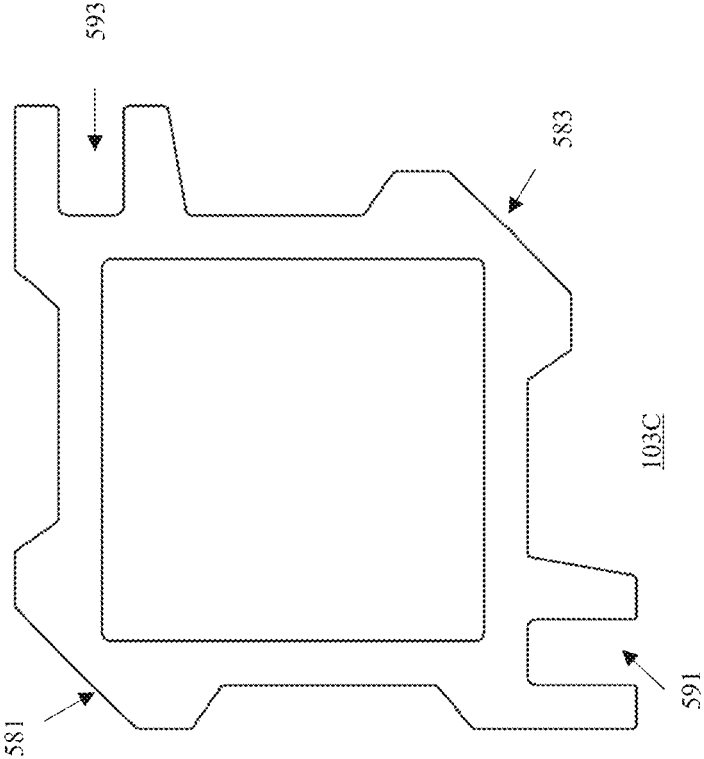
FIG. 5J shows a cross sectional view of a frame support leg in accordance with one embodiment.
Figure 6D:
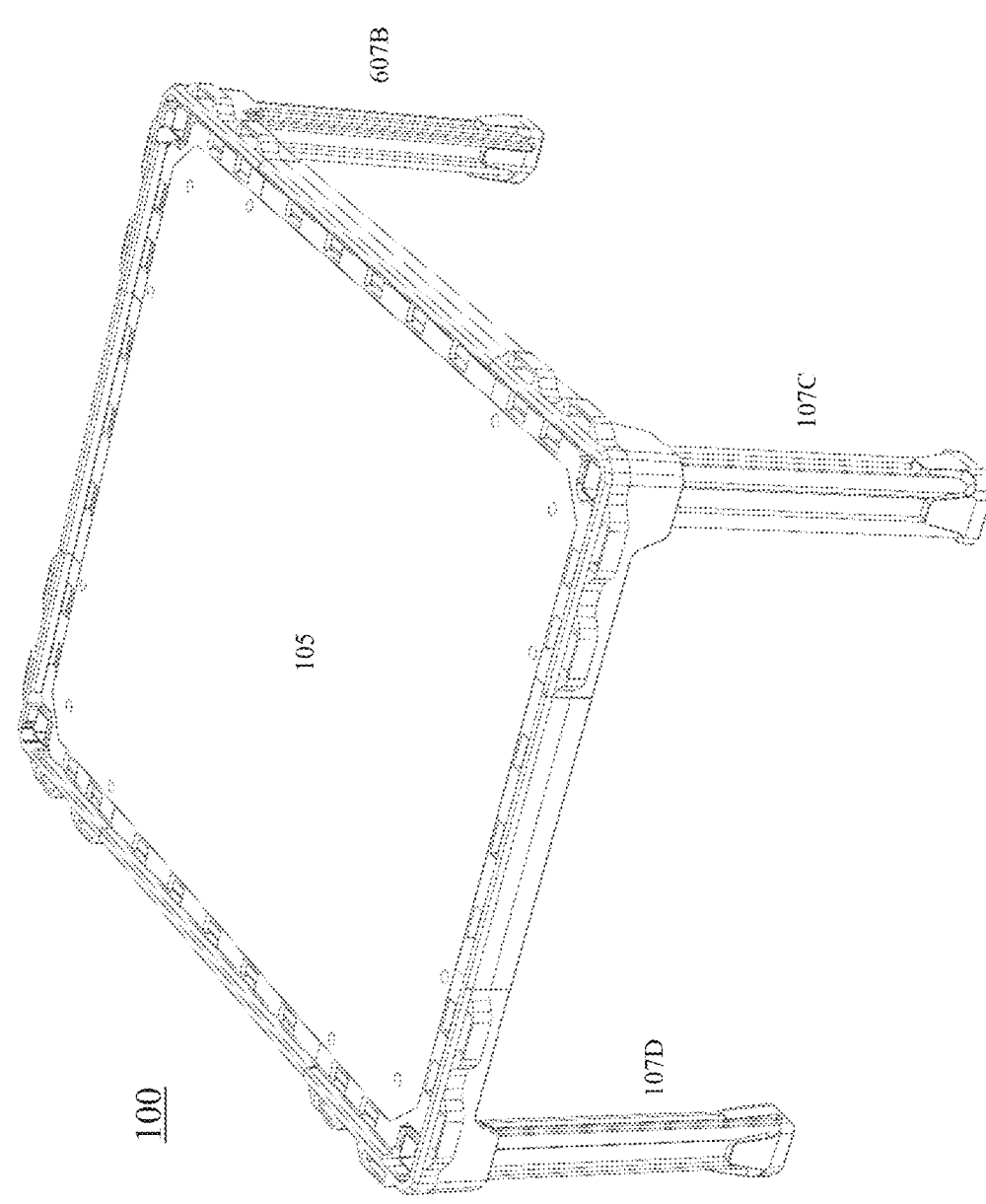
FIG. 6D shows the structure of FIG. 5H with four support legs in accordance with one embodiment.

FIG. 6D shows the structure of FIG. 5H with four support legs, 607A (not visible in FIG. 6D), 607B, 107C, and 107D in accordance with one embodiment.

Returning to FIGS. 1A, 1B, and 2, in one embodiment, once the universal vehicle cargo system frame 190 is formed as discussed above, the universal vehicle cargo system frame 190 can support various items in accordance with the needs of the user.

For instance, returning to FIGS. 1A, 1B, and 2, in one embodiment, a frame deck 105 can be attached to universal vehicle cargo system frame 190 to provide a level and flat surface. Then the various multifunction features of the multifunction frame body sections and/or corner units, and/ or frame support legs discussed above can be used to safely secure cargo/equipment to the universal vehicle cargo system.

In one embodiment, deck 105 is secured to universal vehicle cargo system frame 190 using corner unit deck attachment points 305 and fasteners 217 (FIG. 2) that can be Product Engineering Methodology (PEM) fasteners, clinch studs, or any fastener as discussed herein, known in the art at the time of filing, and/or as becomes known after the time of filing.

In other embodiments, as discussed below, universal vehicle cargo system frame 190 can be used to support interchangeable racks. In one embodiment, each rack and/or universal vehicle cargo system can be formed such that the racks simply drop into position with int the universal vehicle cargo system frame 190.

In some embodiments, universal vehicle cargo system frame 190 can be used to support pre-prepared specialty racks of equipment. As an example, a user might have several specialty racks for different activities, jobs, times of year etc. In this way, activity racks can be stored with the respective gear attached. Then when that activity is anticipated the appropriate rack can be placed in universal vehicle cargo system frame 190.

In other embodiments, racks are provided that include integral sub compartments to secure cargo/equipment of various types and sizes.

Figure 12A:
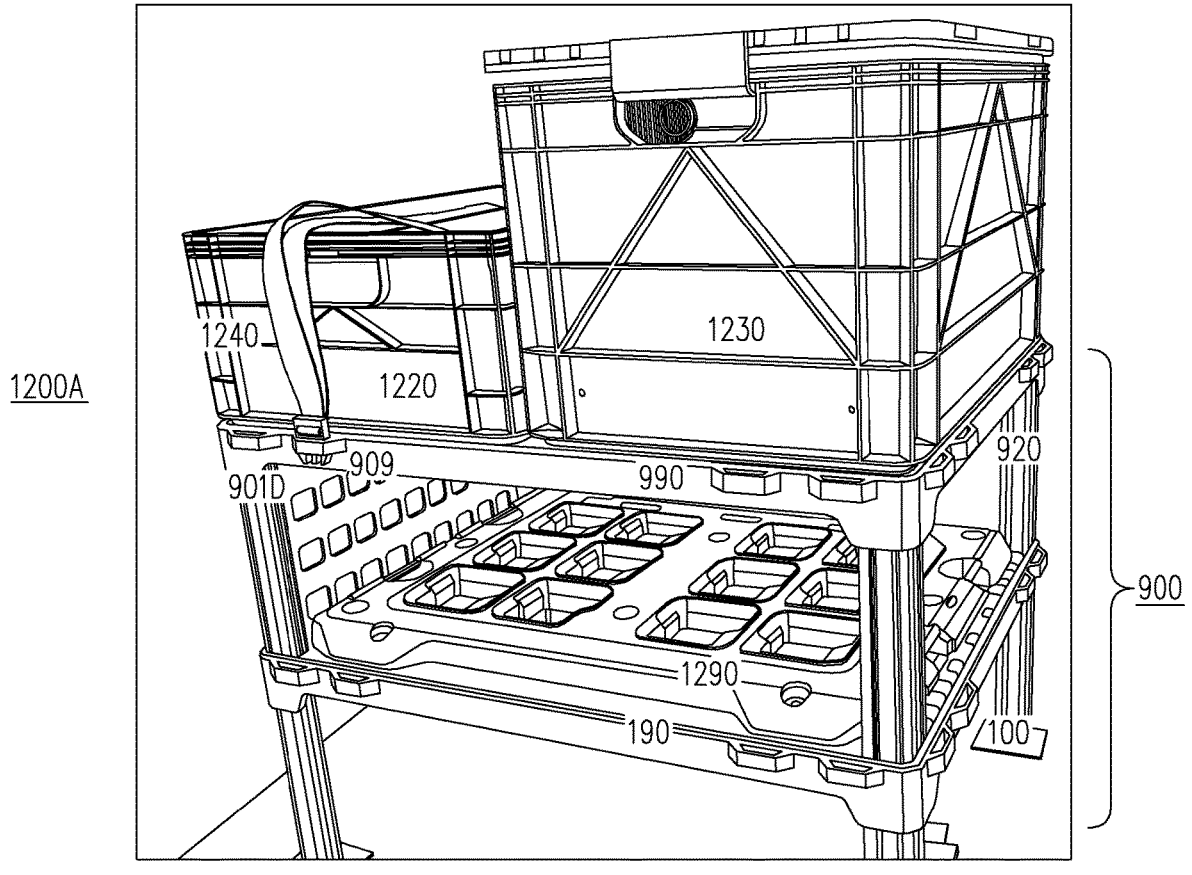
FIG. 12A is a photograph of a universal vehicle cargo system loaded with equipment in accordance with one embodiment.
Figure 12B:
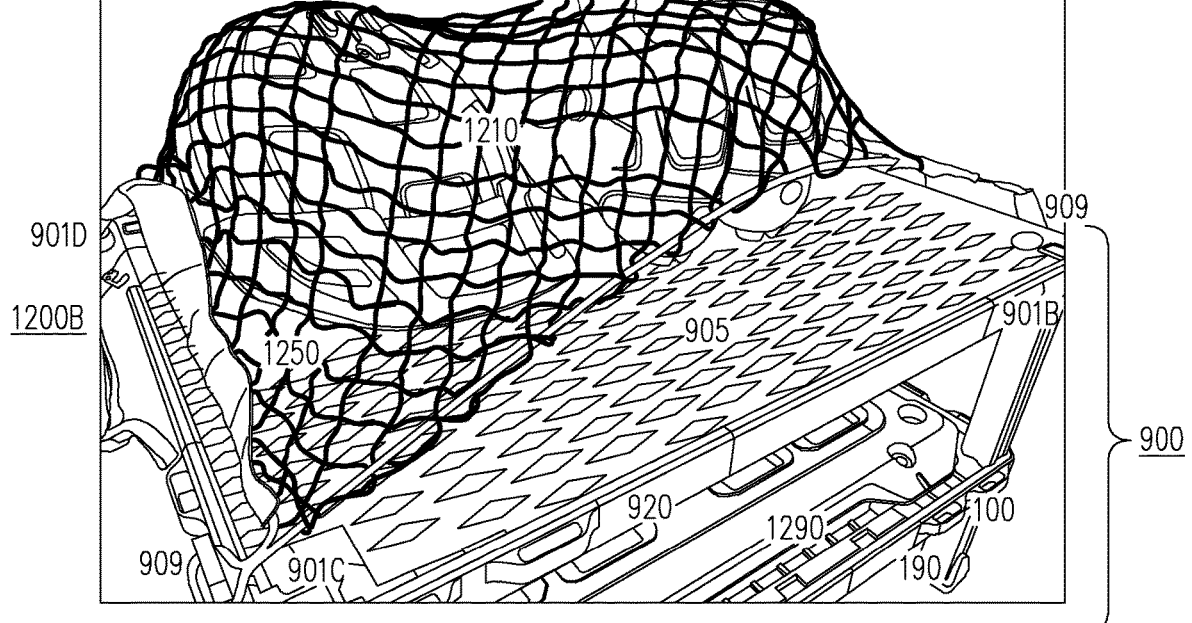
FIG. 12B is a photograph of a universal vehicle cargo system loaded with equipment in accordance with one embodiment.
Figure 12C:
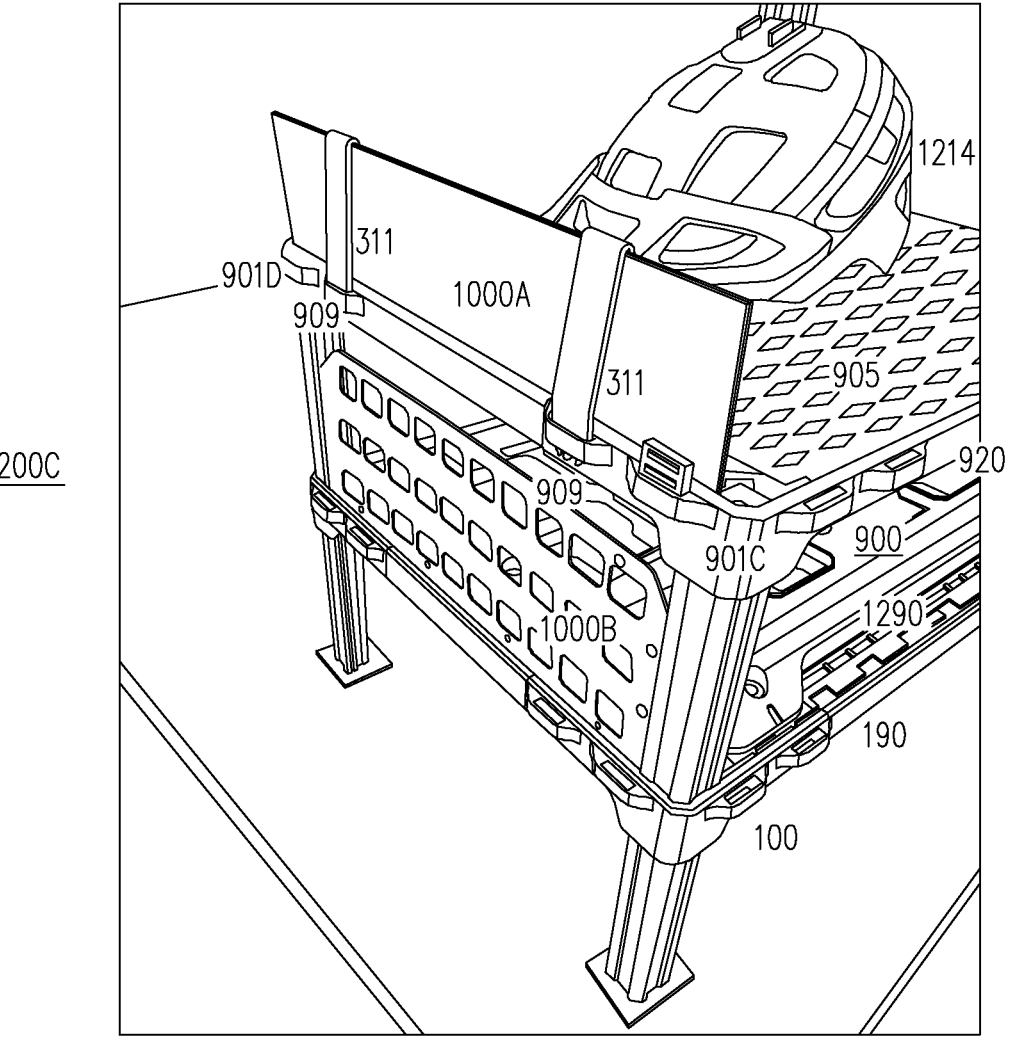
FIG. 12C is a photograph of a universal vehicle cargo system loaded with equipment in accordance with one embodiment.

FIGS. 12A, 12B, and 12C discussed below show examples of interchangeable racks 1290A, 1290B, and 1290C.

FIGS. 5A through 5H show the major steps for assembling one embodiment of universal vehicle cargo system 100 using the components discussed above with respect to FIGS. 1A, 1B, 2, 3A, 3B, 3C, 3D, 3E, 4A, 4B, 4C, 6A, 6B, and 6C in accordance with one embodiment.

Referring to FIGS. 1A, 1B, 2, and 5A through 5H together, FIG. 5A shows multifunction frame corner unit 101A with first end 204A of rigid frame section 203A inserted into a first channel 302 of multifunction frame corner unit 101A to form ridged frame attachment position and with second end 206A of rigid frame section 203A exposed in accordance with one embodiment.

FIG. 5B shows the structure of FIG. 5A with multifunction frame body section 103A having been added by sliding multifunction frame body section 103A onto rigid frame section 203A using multifunction frame body section rigid frame section channel 405 to form rigid frame section attachment position 202. Also seen in FIG. 5B is second end 206A of rigid frame section 203A extending from multifunction frame body section 103A.

FIG. 5C shows the structure of FIG. 5B with multifunction frame corner unit 101B having been attached to multifunction frame body section 103A by sliding second end 206A of rigid frame section 203A into multifunction frame body section rigid frame section channel 302 of multifunction frame corner unit 101B to form a rigid frame section attachment position 202. The resulting structure of FIG. 5C is universal vehicle cargo system frame 102A.

FIG. 5D shows the structure of FIG. 5C with first end 204B of rigid frame section 203B inserted into a second channel 302 of multifunction frame corner unit 101B and with second end 206B of rigid frame section 203B exposed in accordance with one embodiment.

In addition, FIG. 5D shows the structure of FIG. 5C with first end 204D of rigid frame section 203D inserted into a second channel 302 of multifunction frame corner unit 101A and with second end 206D of rigid frame section 203D exposed in accordance with one embodiment.

FIG. 5E shows the structure of FIG. 5D with multifunction frame body section 103B having been added by sliding multifunction frame body section 103B onto rigid frame section 203B using multifunction frame body section rigid frame section channel 405 to form a rigid frame section attachment position 202. Also seen in FIG. 5E is second end 206B of rigid frame section 203B extending from multifunction frame body section 103B.

FIG. 5E also shows the structure of FIG. 5D with multifunction frame body section 103D having been added by sliding multifunction frame body section 103D onto rigid frame section 203D using multifunction frame body section rigid frame section channel 405 to form a rigid frame section attachment position 202. Also seen in FIG. 5E is second end 206D of rigid frame section 203D extending from multifunction frame body section 103B.

FIG. 5F shows the structure of FIG. 5E with the addition of multifunction frame corner unit 101D with second end 206D of rigid frame section 203D inserted into a first channel 302 of multifunction frame corner unit 101D to form universal vehicle cargo system side 102D in accordance with one embodiment. In addition, FIG. 5F shows second end 206C of rigid frame section 203C inserted into a second channel 302 of multifunction frame corner unit 101D. Also shown in FIG. 5F is first end 204C of rigid frame section 203C and second end 206B of rigid frame section 203B exposed in accordance with one embodiment.

FIG. 5G shows the structure of FIG. 5F with multifunction frame body section 103C having been added by sliding multifunction frame body section 103C onto rigid frame section 203C using multifunction frame body section rigid frame section channel 405 to form a rigid frame section attachment position 202.

Also shown in FIG. 5G is the structure of FIG. 5F with the addition of multifunction frame corner unit 101C with first end 204C of rigid frame section 203C inserted into a first channel 302 of multifunction frame corner unit 101C to form universal vehicle cargo system side 102C in accordance with one embodiment.

In addition, FIG. 5G shows second end 206B of rigid frame section 203B inserted into a second channel 302 of multifunction frame corner unit 101C to form universal vehicle cargo system side 102B in accordance with one embodiment.

The result of the process set forth in FIGS. 5A through 5G is the formation of rectangular universal vehicle cargo system horizontal frame 190.

FIG. 5H shows the structure of FIG. 5G, i.e., rectangular universal vehicle cargo system horizontal frame 190, with frame support legs 106C and 106D attached to multifunction frame corner units 101C and 101D, respectively. In addition, FIG. 5H shows frame support leg feet 106C and 106D attached to frame support legs 107C and 107D, respectfully.

In addition, FIG. 5H shows the structure of FIG. 5G with seat hinge attachment device 109B attached to multifunction frame corner unit 101B. While not visible in FIG. 5H, in one embodiment, a seat hinge attachment device 109A would also be attached to multifunction frame corner unit 101A.

Figure 7A:
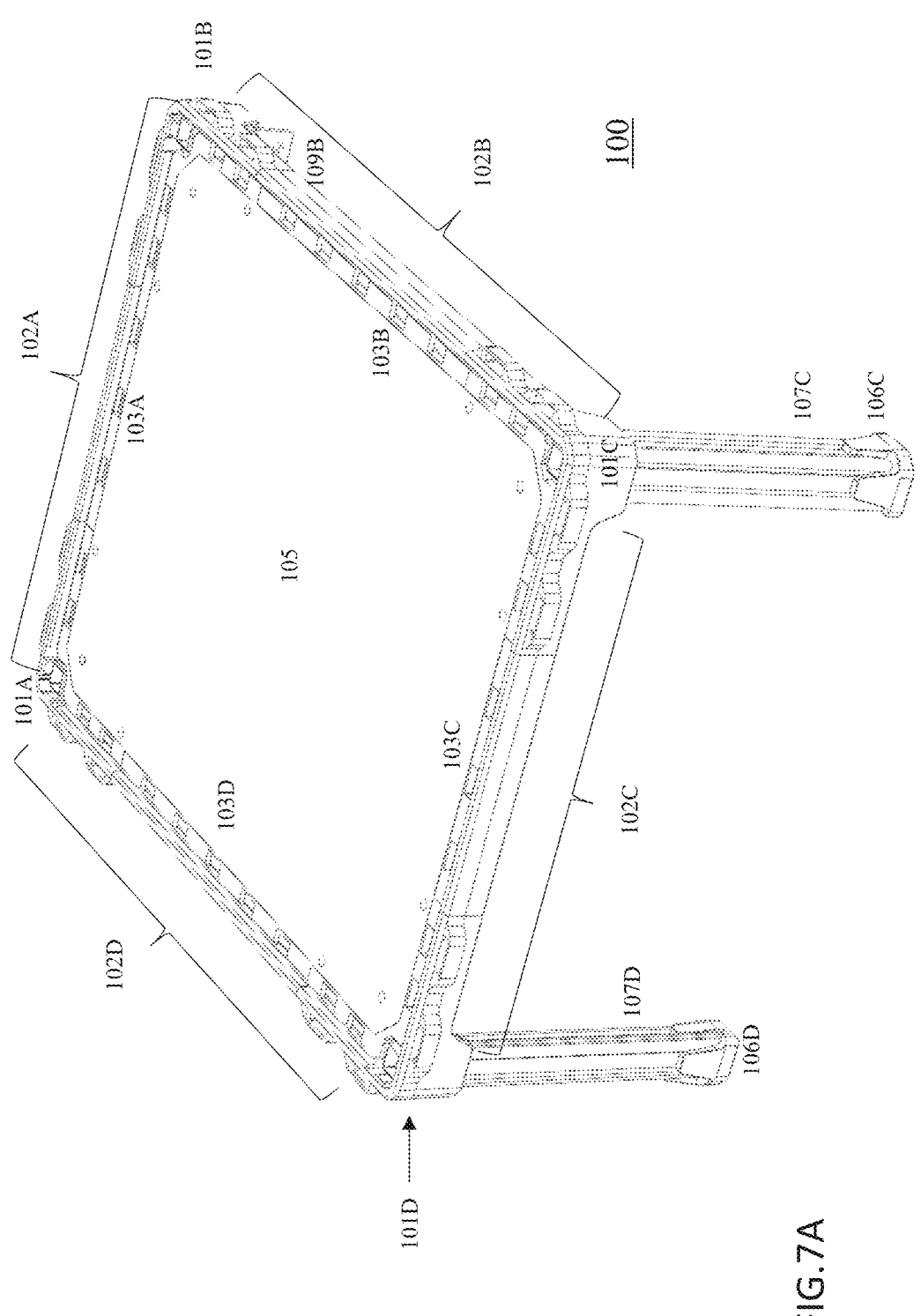
FIG. 7A shows the structure of FIG. 5H with a frame deck in accordance with one embodiment.

FIG. 7A shows the structure of FIG. 5H with a frame deck 105 attached in accordance with one embodiment.

Figure 7B:
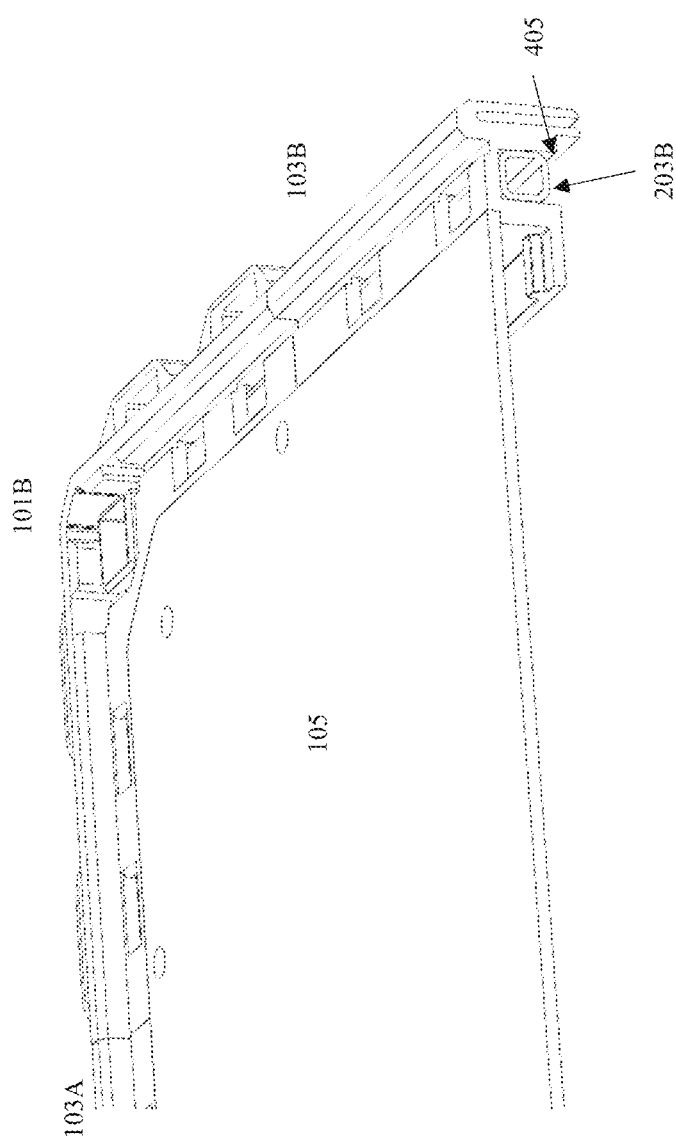
FIG. 7B shows a portion of the structure of FIG. 7A in cutaway in accordance with one embodiment.

FIG. 7B shows a portion of the structure of FIG. 7A in cutaway in accordance with one embodiment. Shown in FIG. 7B, in cutaway are, multifunction frame corner unit 101B, multifunction frame body sections 103A and 103B, rigid frame section 203B in multifunction frame body section 103B channel 405, and deck 105.

Referring to FIGS. 1A, 1B, 2, 7A and 7B, in one embodiment, deck 105 is supported by corner unit deck/rack support ledges 303 of multifunction frame corner units 101A, 101B, 101C, and 101D, as well as multifunction frame body section deck/rack support ledges 403 of multifunction frame body sections 103A, 103B, 103C and 103D.

In addition, in one embodiment, deck 105 is further secured to rectangular universal vehicle cargo system horizontal frame 190 using one or more of various attachment devices discussed herein and corner unit deck attachment points 305 of multifunction frame corner units 101A, 101B, 101C, and 101D.

In addition, in other embodiments, deck 105 is further secured to rectangular universal vehicle cargo system horizontal frame 190 by providing a deck 105 with an adhesive backing.

In various embodiments, deck 105 is designed to be customizable and to be sized as desired. To this end, in various embodiments, deck 105 is made of materials that can be cut to a desired dimensions using tools generally available to the average end user/vehicle owner.

In various embodiments, deck 105 can be made of metal, rubber, plastic, or wood. In some embodiments, deck 105 can be formed of multiple layers of material such as a layer of HDPE sandwiched between thin layers of metal or other material. In other embodiments, deck 105 can be made of any material capable of providing the structure and features desired as discussed above, and/or as known in the art at the time of filing, and/or as developed/made available after the time of filing.

In some embodiments extra support may be desired for heavier equipment. To accommodate these needs some embodiments include one or more supplemental support components.

Figure 8:
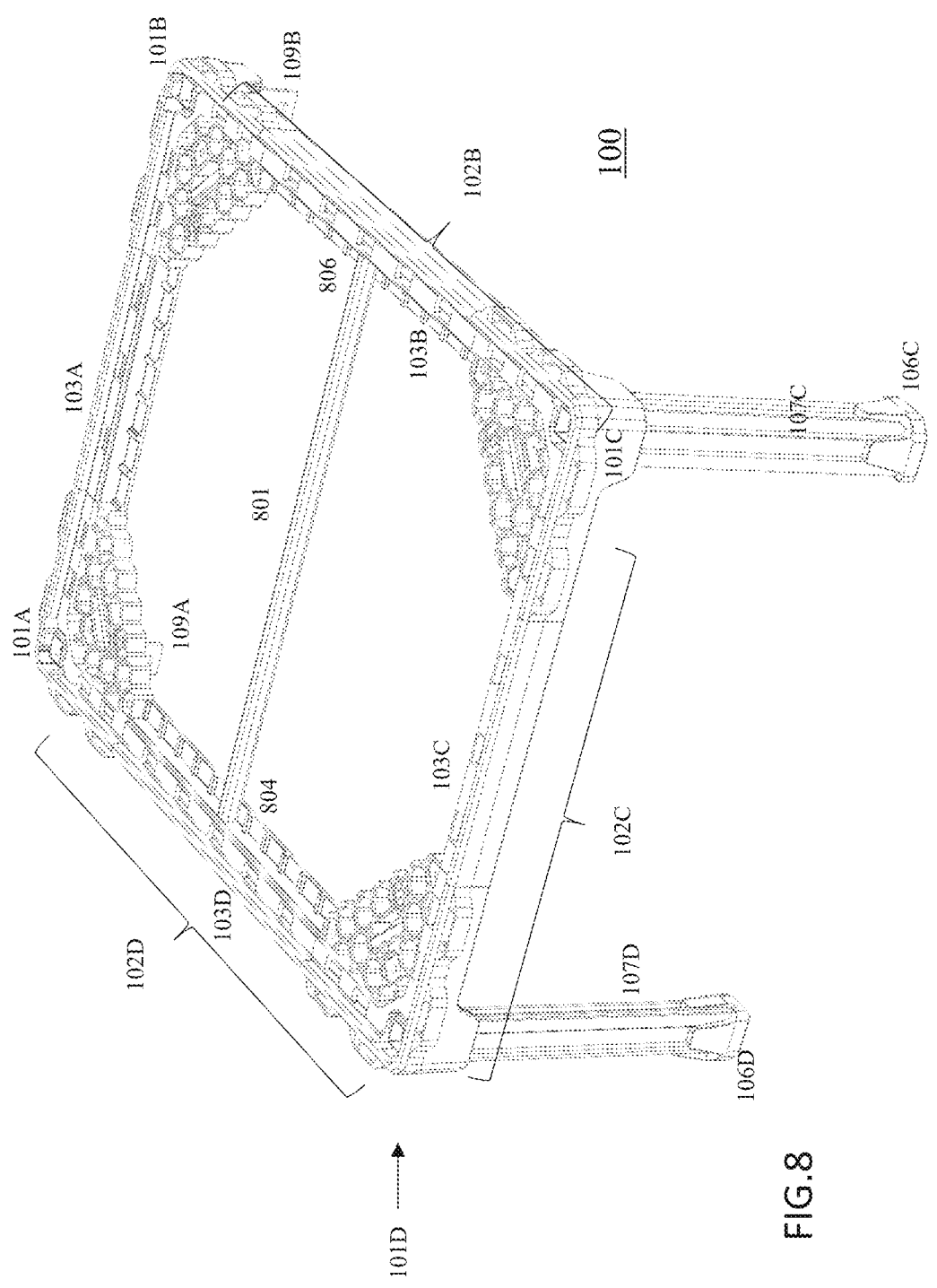
FIG. 8 shows the structure of FIG. 5H with the addition of a supplemental structural support component in accordance with one embodiment.

Referring to FIGS. 1A, 1B, 2, 4B, 4C, 5H, and 8, FIG. 8 shows the structure of FIG. 5H with the addition of a supplemental structural support component 801 in accordance with one embodiment. As seen in FIG. 8, in one embodiment, supplemental structural support component 801 has a supplemental structural support component first end 804 and supplemental structural support component second end 806. In the specific embodiment, shown in FIG. 8, supplemental structural support component 801 extends from multifunction frame body section deck/rack support ledge 403 of frame body section 103B of universal vehicle cargo system side 102B to multifunction frame body section deck/rack support ledge 403 of frame body section 103D of universal vehicle cargo system side 102D.

Of course, in other embodiments, not shown, supplemental structural support component 801 can extend from multifunction frame body section deck/rack support ledge 403 of frame body section 103A of universal vehicle cargo system side 102A to multifunction frame body section deck/rack support ledge 403 of frame body section 103C of universal vehicle cargo system side 102C. In addition, in various embodiments multiple supplemental structural support component 801 can be employed.

In one embodiment, supplemental structural support component 801 is similar to rigid frame sections 203A, 203B, 203C, and 203D. Therefore, in one embodiment, supplemental structural support components 801 are designed to be interchangeable with each other and other supplemental structural support component 801 to provide customizable dimensions, i.e., lengths.

To this end, in one embodiment, supplemental structural support component 801 is made of materials that can be cut to a desired length using tools generally available to the average end user/vehicle owner.

In some embodiments, supplemental structural support component 801 can be made of aluminum, steel, or any metal or alloy. In some embodiments, supplemental structural support component 801 can be made of high density polymers, fiber glass, or carbon fiber material. In other embodiments, supplemental structural support component 801 can be made of any material capable of providing additional support and capable of being cut using common tools such as various types of saws, as discussed herein, and/or as known/available in the art at the time of filing, and/or as become known/available after the time of filing.

In some embodiment, supplemental structural support component 801 is tubular, or hollow, with any cross section desired such as, but not limited to, a circular cross section, a square cross section, a rectangular cross section, a hexagonal cross section, or any cross section as discussed herein, and/or as known/available in the art at the time of filing, and/or as becomes known/available after the time of filing.

In various embodiments, the disclosed universal vehicle cargo systems can include multiple levels. In these embodiments, once a first level is assembled and installed as discussed above with respect to universal vehicle cargo system 100 and FIGS. 1A, 1B, 2, 3A, 3B, 3C, 3D, 3E, 4A, 4B, 4C, 6A, 6B, 5A through 5H, 7A, 7B, and 8, a second level is built using the methods and components discussed above. Each of the additional level(s) is/are then attached to the level below it using four more frame support legs attached to each four additional multifunction corner units. In most cases the four frame support legs would be of the same height.

Figure 9A:
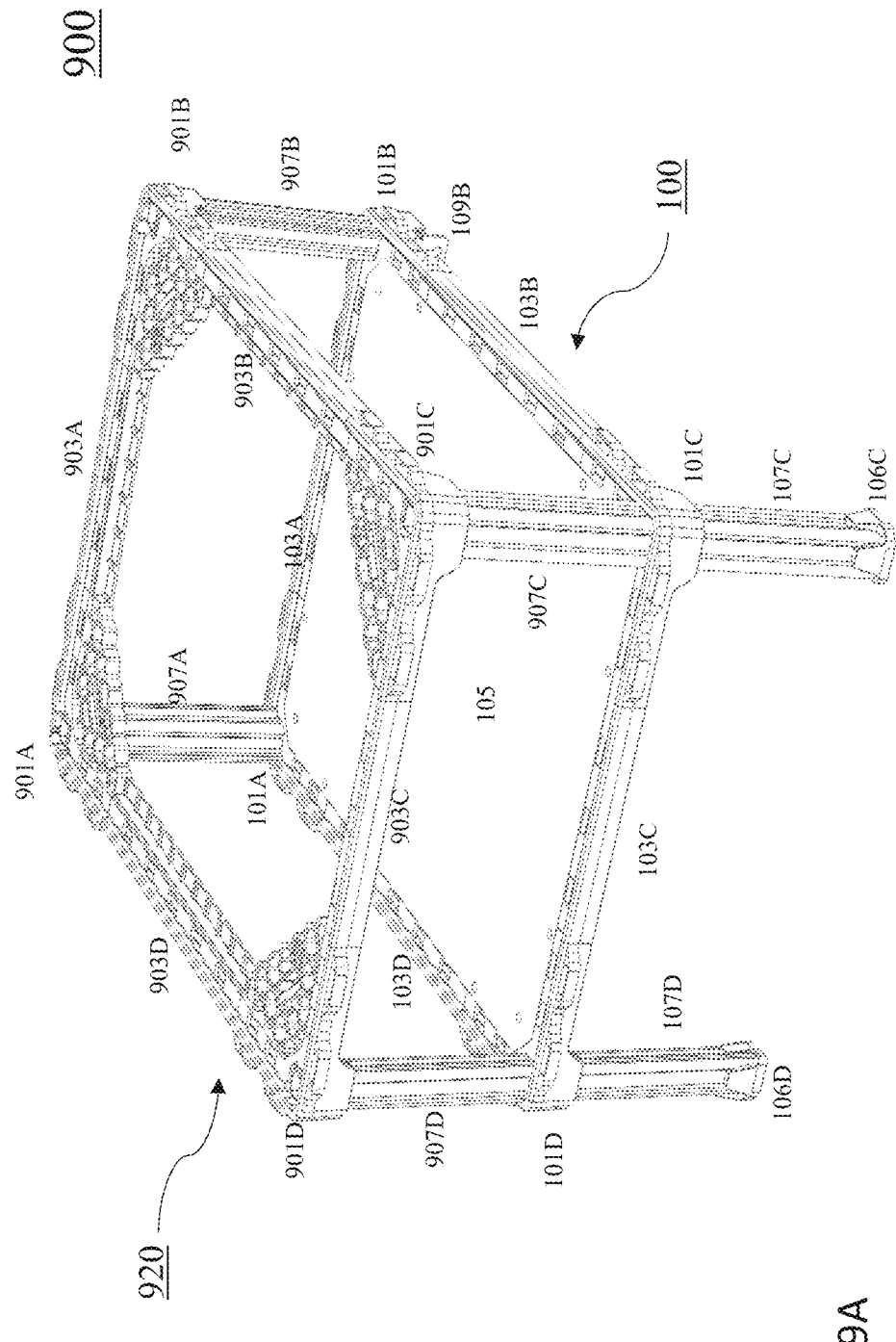
FIG. 9A is a line drawing top perspective of one embodiment of universal vehicle cargo system that is a two level universal vehicle cargo system with hinge attachment device in accordance with one embodiment.

FIG. 9A is a line drawing top perspective of one embodiment of universal vehicle cargo system 900 that is a two level universal vehicle cargo system with hinge attachment device in accordance with one embodiment.

As seen in FIG. 9A, universal vehicle cargo system 900 includes all of the features and components of universal vehicle cargo system 100 employed as a first level.

As also seen in FIG. 9A, universal vehicle cargo system 900 includes a second level 920 constructed on universal vehicle cargo system 100 using the methods discussed above with respect to universal vehicle cargo system 100 and FIGS. 1A, 1B, 2, 3A, 3B, 3C, 3D, 3E, 4A, 4B, 4C, 6A, 6B, 5A through 5H, 7A, 7B, and 8.

Figure 9B:
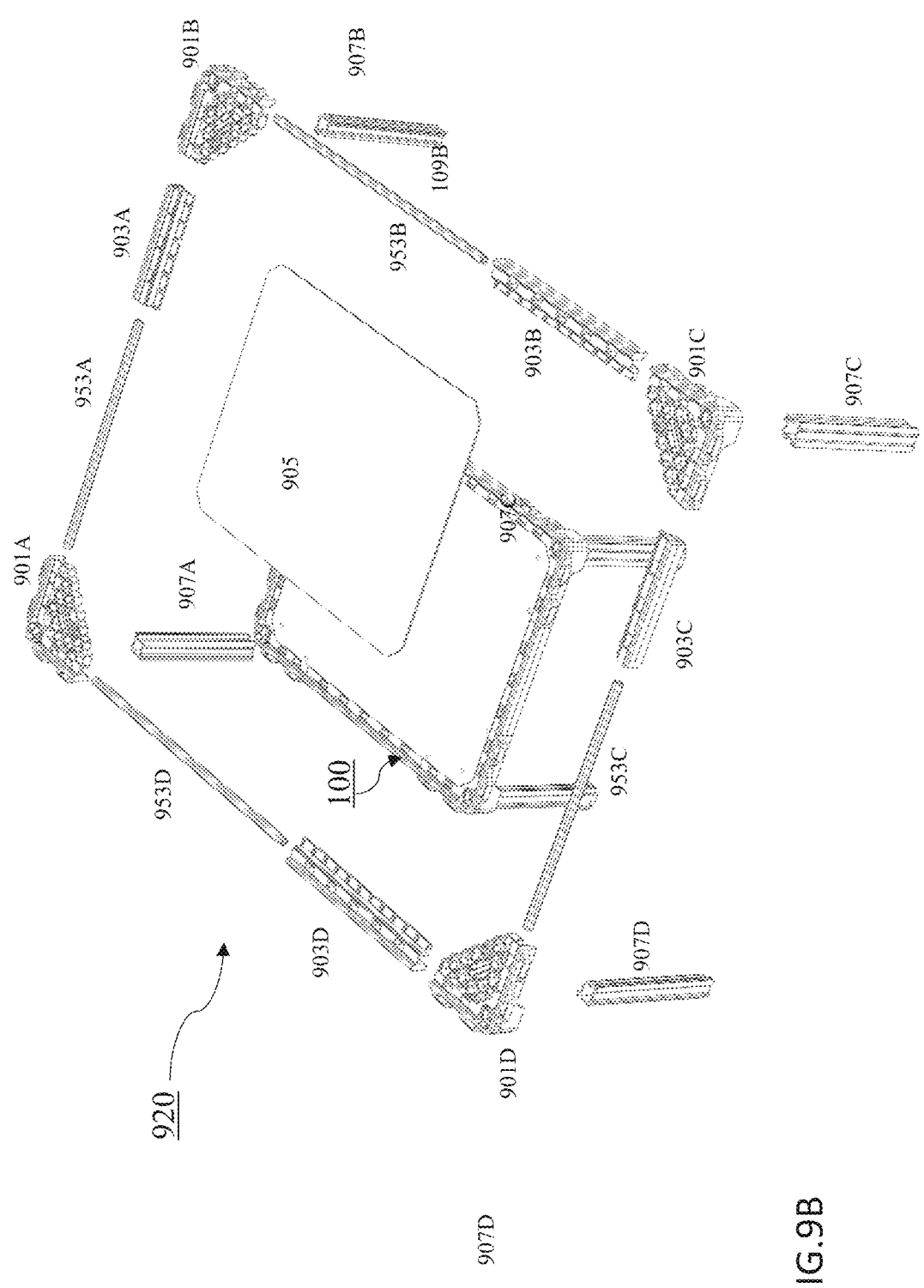
FIG. 9B is a line drawing of a partially exploded top perspective of one embodiment of universal vehicle cargo system that is a two level universal vehicle cargo system with hinge attachment device in accordance with one embodiment.

Consequently, in FIGS. 9A and 9B, all of the components of second level 920 include numbering similar to the numbering of universal vehicle cargo system 100 except that the first digit of the numbering of the components of second level 920 is a "9", i.e., the components are 900 series numbered while the first digit of the numbering of the components of universal vehicle cargo system 100 is a "1", i.e., the components are 100 series numbered. However, unlike universal vehicle cargo system 100, second level 920 of universal vehicle cargo system 900 does not include seat hinge connection devices 109A and 109B, but instead has four equal height frame support legs 907A, 907B, 907C, and 907D. In addition, in FIG. 9B, the rigid frame sections corresponding the rigid frame sections 203A, 203B, 203C, and 203D, as labeled as rigid frame sections 953A, 953B, 953C, and 953D.

FIG. 9B is a line drawing of a partially exploded top perspective of universal vehicle cargo system 900 in accordance with one embodiment. As noted above, second level 920 of universal vehicle cargo system 900 is virtually identical to universal vehicle cargo system 100 except that second level 920 of universal vehicle cargo system 900 does not include seat hinge connection devices 109A and 109B, but instead has four equal height frame support legs 907A, 907B, 907C, and 907D and has rigid frame sections labeled 953A, 953B, 953C, and 953D. Consequently the assembly of second level 920 of universal vehicle cargo system 900 is virtually identical to the assembly of universal vehicle cargo system 100. Consequently, for a more detailed discussion of the assembly of universal vehicle cargo system 900, including universal vehicle cargo system 100 and second level 920 of universal vehicle cargo system 900, the reader is referred to the discussion above with respect to FIGS. 2 and 5A through 5H.

Figure 9C:
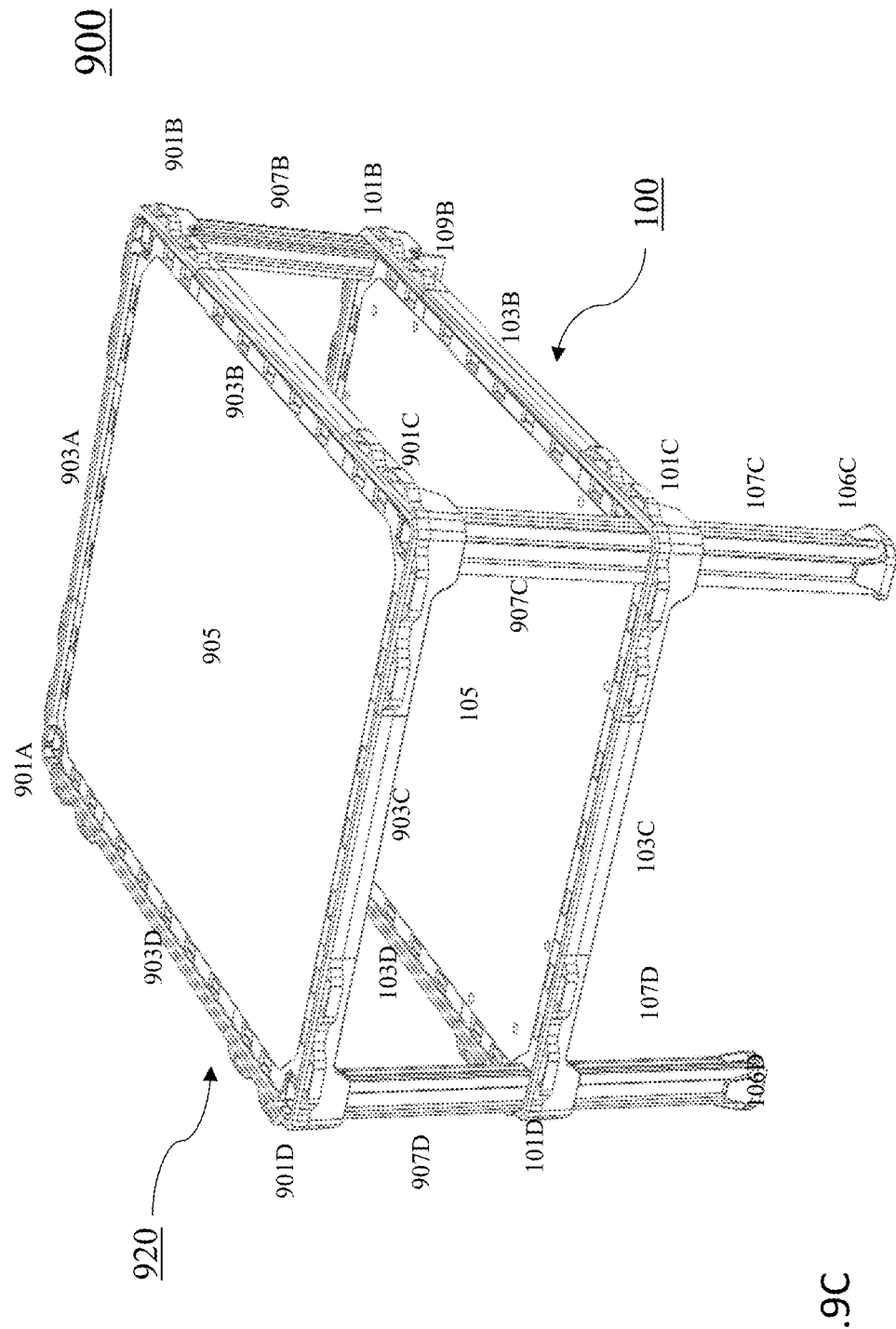
FIG. 9C shows the structure of FIG. 9A with decks installed on the first and second universal vehicle cargo system frames in accordance with one embodiment.

FIG. 9C shows the structure of FIGS. 9A and 9B with decks 105 and 905 installed in accordance with one embodiment.

In some embodiments, side panels can be used to create closed compartments.

As noted above, in one embodiment, the multifunction frame corner units 101A, 101B, 101C, and 101D, multifunction frame body sections 103A, 103B, 1103C, and 1103D, and frame support legs 107C 107D, 907A, 907B, 907C and 907D can have various multifunctional features.

In various embodiments, these multifunctional features can include side support and mounting mechanisms including side panel channels 410/510 and/or side panel stays 311/312. In various embodiments, these side support and mounting mechanisms can be used to hold panels on one or more sides of one or more of the levels of the disclosed universal vehicle cargo systems.

Figure 10A:
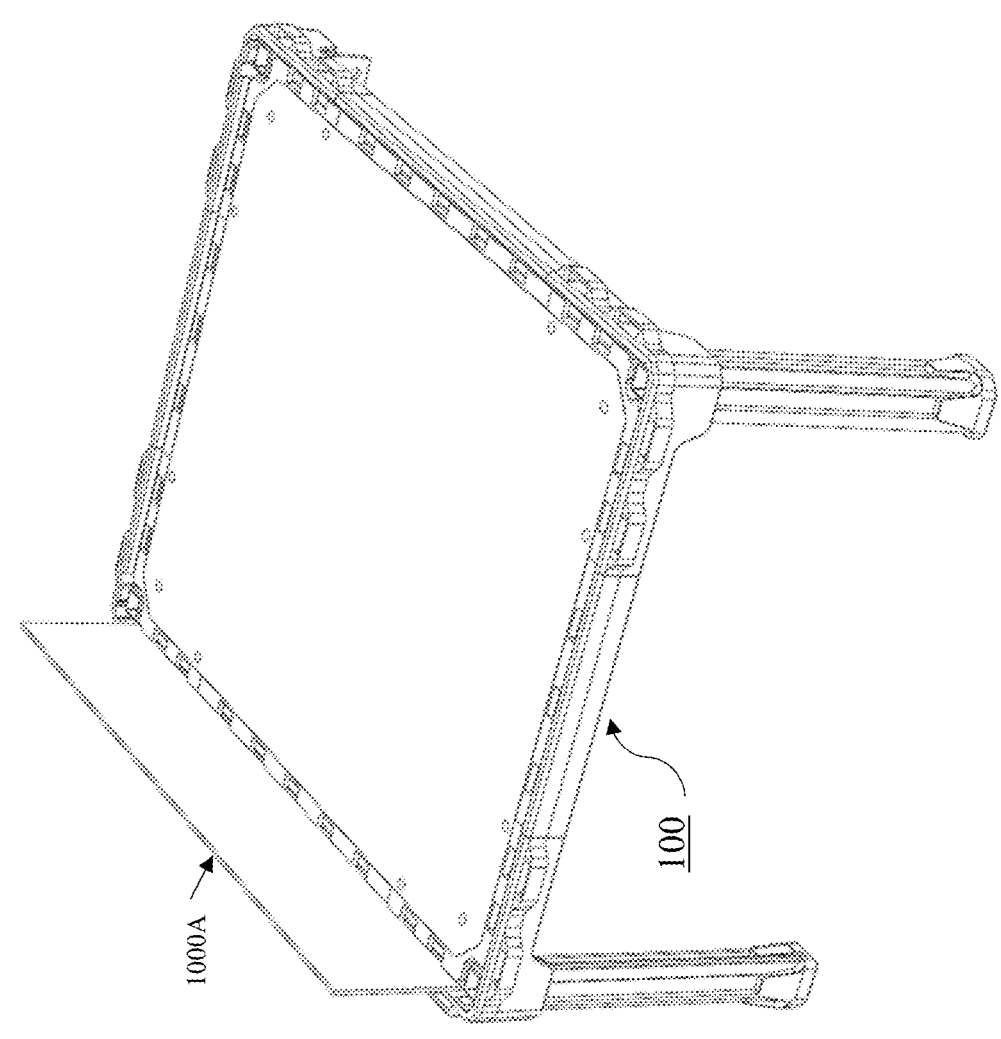
FIG. 10A shows the structure of FIG. 5H with a removable side panel installed in accordance with one embodiment.

FIG. 10A shows the structure of FIG. 5H with a removable side panel 1001A installed in accordance with one embodiment-cutaway side view.

Figure 10B:
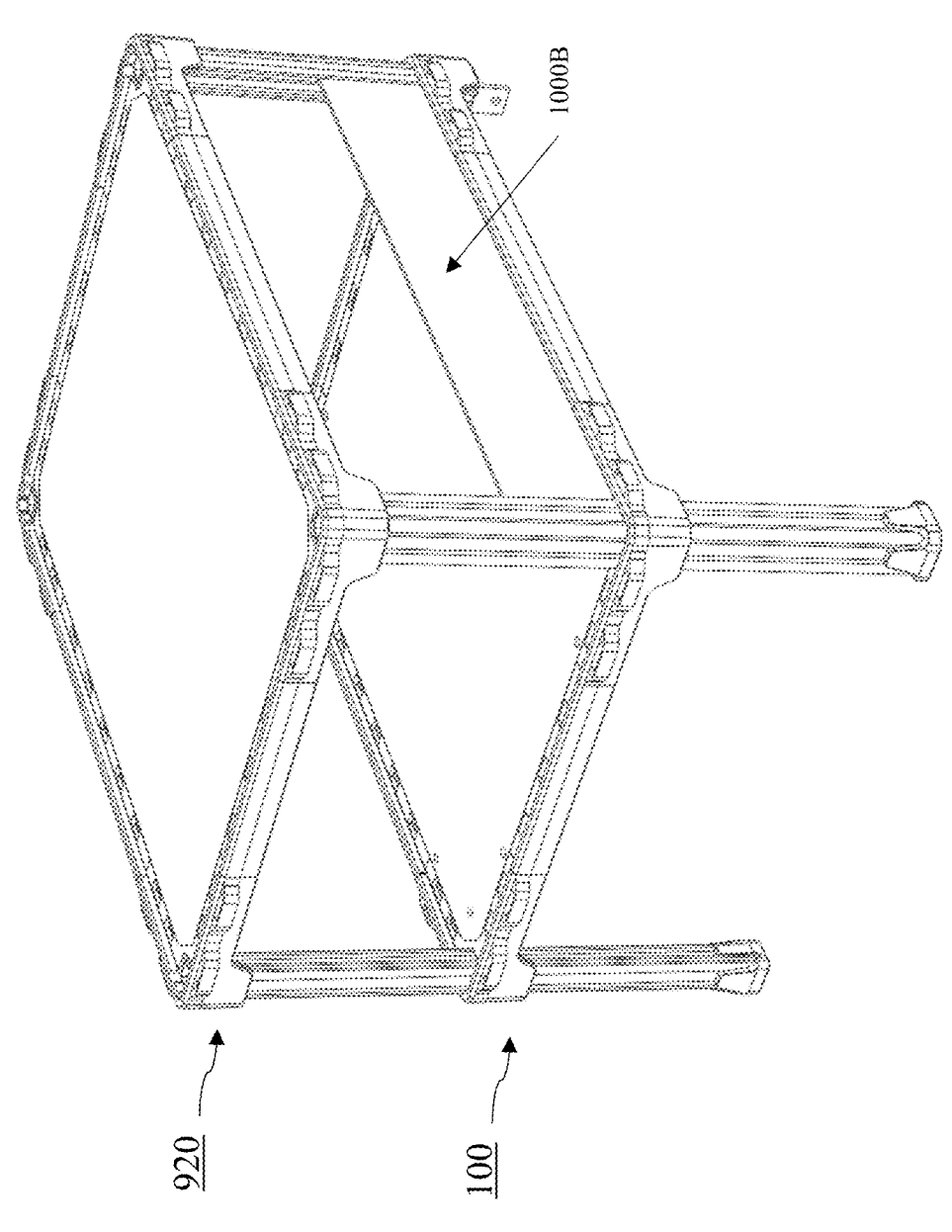
FIG. 10B shows the structure of FIG. 9C with a removable side panel installed in accordance with one embodiment.

FIG. 10B shows the structure of FIG. 9C with a removable side panel 1001B installed in accordance with one embodiment-perspective view.

This side panel feature not only provides additional support and containment for the cargo/equipment, but it also allows further compartmentalization of gear and keeps the cargo/equipment out of sight.

In various embodiments, all of the components of the disclosed universal vehicle cargo systems are specifically designed to be removably attached to each other. Consequently, the disclosed universal vehicle cargo systems can be easily installed, and uninstalled, as the user desires.

In addition, various embodiments of the disclosed universal vehicle cargo systems are also designed to be easily removed and installed in a vehicle. In some embodiments, the disclosed universal vehicle cargo systems are specifically designed to secured to the vehicle's seat hinges, seat frames, and/or various other anchor points such as child seat anchors, using the disclosed vehicle connection devices, such as seat hinge attachment devices 109A and 109B.

Referring now to FIGS. 9A, 9B, 9C, and 11A, FIG. 11A shows a side perspective view of universal vehicle cargo system 900 installed in a vehicle compartment 1150 in accordance with one embodiment.

Figure 11A:
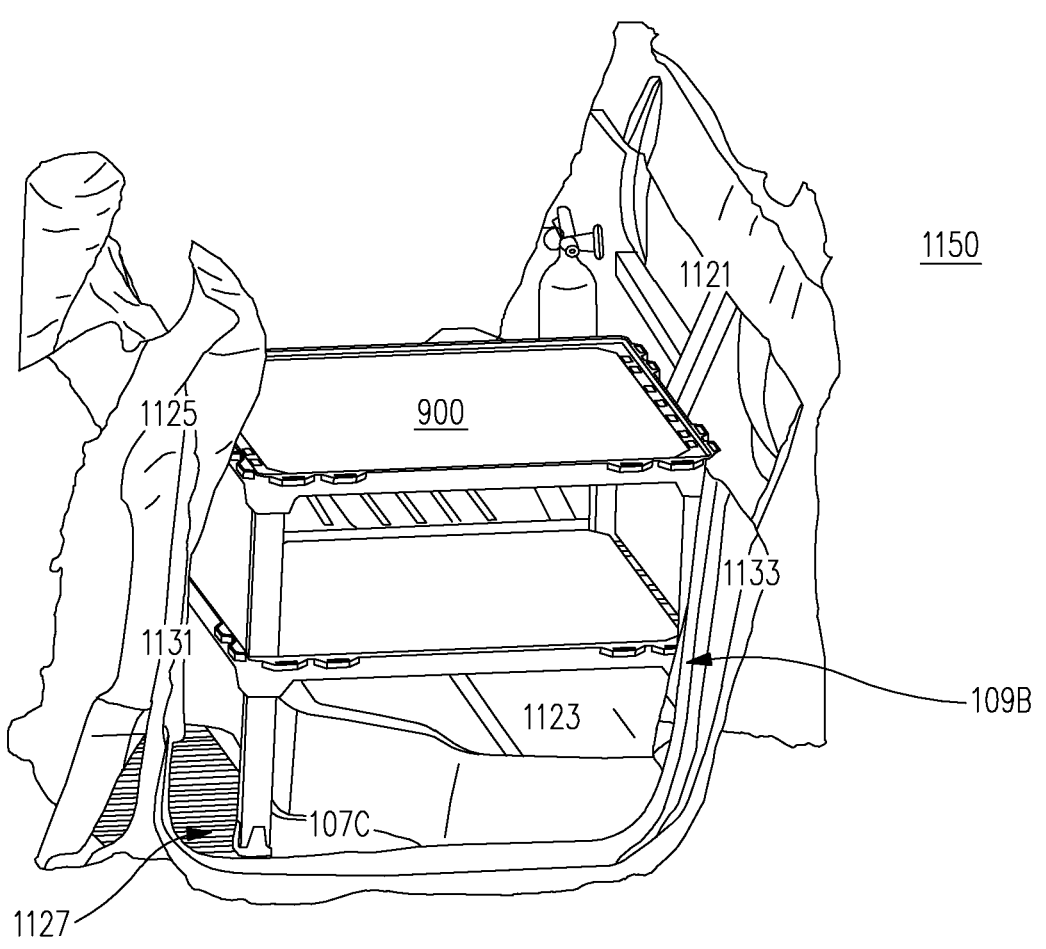
FIG. 11A shows a side perspective view of the universal vehicle cargo system of FIGS. 9A, 9B, and 9C installed in a vehicle compartment in accordance with one embodiment.
Figure 11B:
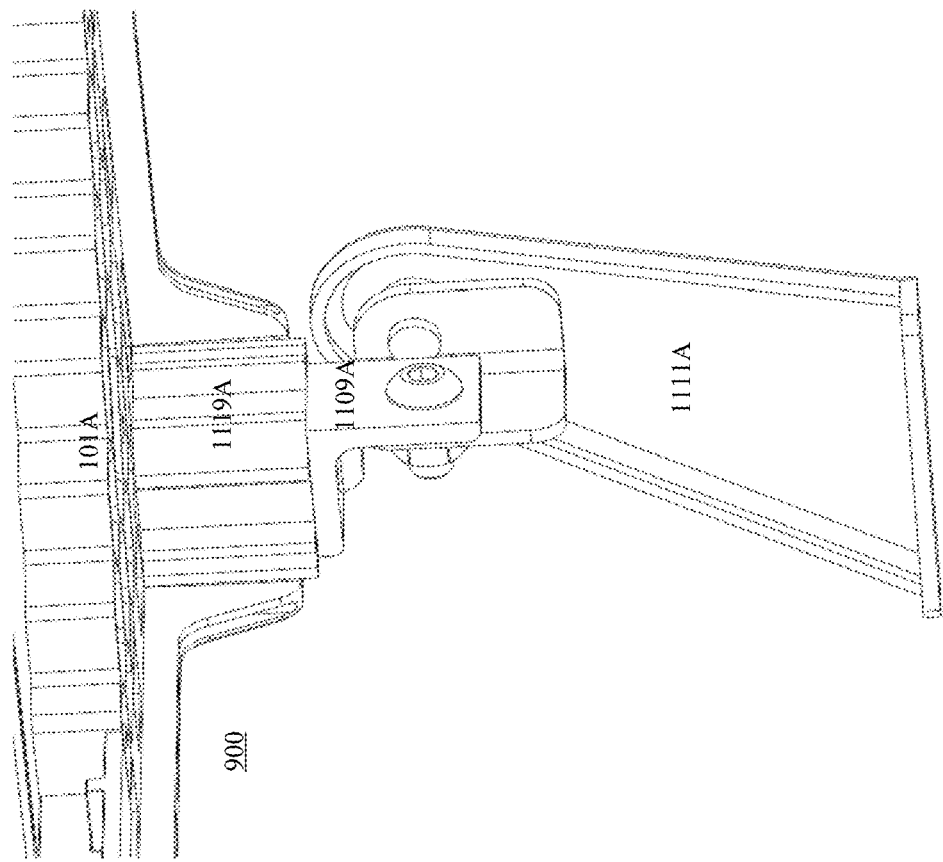
FIG. 11B shows the universal vehicle cargo system of FIGS. 9A, 9B, and 9C being secured to a vehicle anchor portion, in this example using a seat hinge connection device and a vehicle seat hinge, in accordance with one embodiment.

As seen in FIG. 11A, vehicle compartment 1150 includes folded back seat 1121, raised/contoured vehicle floor portion 1123, flat vehicle floor portion 1127, and back of vehicle front seat 1125. As also seen in FIG. 11A, frame support legs 107C and 107D (not visible in FIG. 11A) rest on flat vehicle floor portion 1127 and thereby support front portion 1131 of universal vehicle cargo system 900. As also seen in FIG. 11A, back portion 1133 of universal vehicle cargo system 900 is supported by seat hinge attachment devices 109A (not visible in FIG. 11A) and 109B that are attached to vehicle anchoring portions that are, in this example, vehicle hinges 1111A and 1111B (not visible in FIG. 11A, see FIG. 11B).

Referring now to FIGS. 9A, 9B, 9C, 11A, and 11B, FIG. 11B shows multifunction frame corner unit 101A of universal vehicle cargo system 900 secured to a seat hinge 1111A using a vehicle attachment device spacer 1119A and a vehicle connection device that in, this specific example, is seat hinge attachment device 109A in accordance with one embodiment.

Figure 11C:
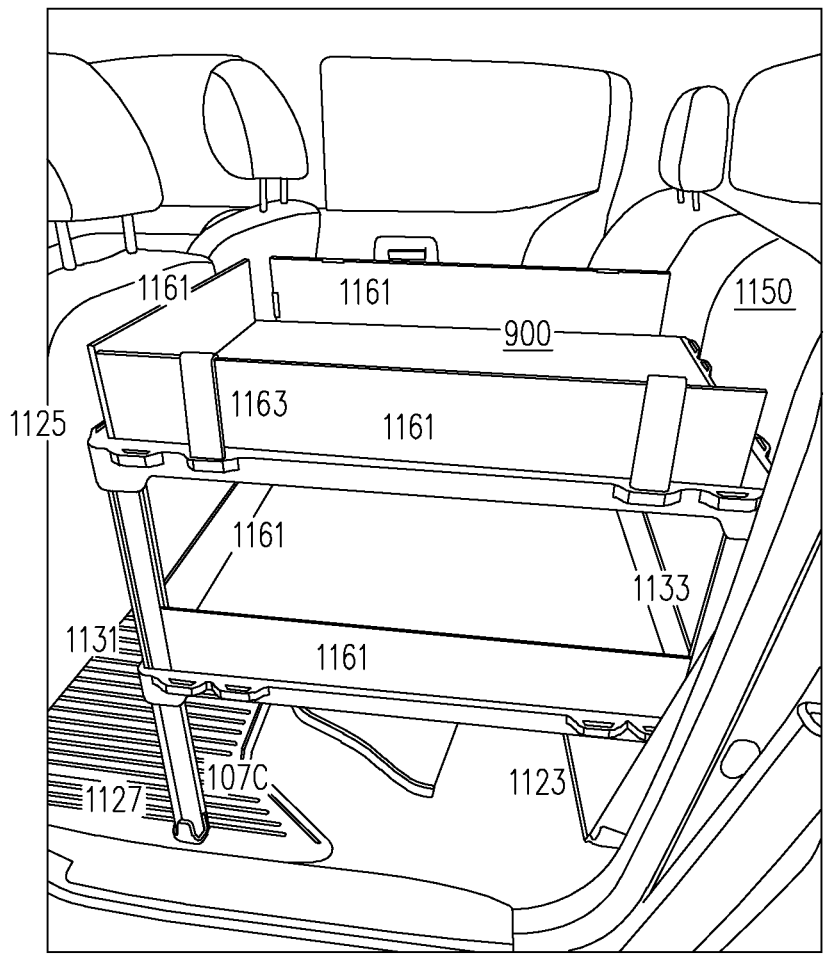
FIG. 11C is a photograph showing a side perspective view of the universal vehicle cargo system of FIGS. 9A, 9B, and 9C installed in vehicle including side panels and side panel stays in accordance with one embodiment.

FIG. 11C shows a side perspective view of universal vehicle cargo system 900 installed in vehicle 1150 and including side panels 1161 and side panel stays 1163 in accordance with one embodiment.

As noted above, and in direct contrast to prior art methods and systems, the disclosed universal vehicle cargo systems provide vehicle owners numerous options for providing equipment storage.

Also in direct contrast to prior art methods and systems, the disclosed universal vehicle cargo systems provide versatile, effective, and efficient mechanisms for securing both the storage platform itself to the vehicle and for securing equipment of various types, in various ways, to the storage platform. In addition, and in direct contrast to prior art methods and systems, the disclosed universal vehicle cargo systems are relatively inexpensive and are designed to be relatively easy to install and uninstall; thereby increasing the versatility and utility of the parent vehicle.

FIGS. 12A through 12C are photographs of just some ways the disclosed universal vehicle cargo systems can be loaded with equipment in accordance with various embodiment.

FIG. 12A is a photograph of a loaded two level universal vehicle cargo system 1200A loaded with equipment in boxes and with a removable rack in accordance with one embodiment.

FIG. 12B is a photograph of a loaded two level universal vehicle cargo system 1200B loaded with equipment on a deck and using a cargo net in accordance with one embodiment.

FIG. 12C is a photograph of a loaded two level universal vehicle cargo system 1200C with side panels 1000A and 1000B in accordance with one embodiment.

Referring to FIGS. 1A, 1B, 2, 7A, 9A, 9B, 9C, 10A, 10B. 12A, 12B, and 12C, together, FIGS. 12A, 12B, and 12C all show loaded two level universal vehicle cargo systems that include the two level universal vehicle cargo system 900 of FIGS. 9A, 9B, and 9C including a first level that is universal vehicle cargo system 100 and second universal vehicle cargo system level 920. However, for display purposes, the two level universal vehicle cargo system 900 of FIGS. 12A, 12B, and 12C have four frame support legs of equal height.

As seen in FIG. 12A, loaded two level universal vehicle cargo system 1200A includes equipment in boxes 1220 and 1230 with equipment box 1220 secured with strap and quick release buckle 1240 attached to multifunction frame corner unit 901D by corner unit multifunctional feature 909. As also seen in FIG. 12A equipment box 1230 is positioned within horizonal frame 990 of universal vehicle cargo system level 920. Also shown in FIG. 12A is removably rack 1290 positioned within and on horizonal frame 190 of universal vehicle cargo system 100.

Similarly, FIG. 12B is a photograph of a loaded two level universal vehicle cargo system 1200B loaded with equipment 1210 on a deck 905 having been secured with a cargo net 1250. As seen in FIG. 12B, cargo net 1250 is secured to multifunction frame corner units 901A (not visible in FIG. 12B) 901B, 901C and 901D (not fully visible in FIG. 12B) by corner unit multifunctional features 909. Also shown in FIG. 12A is removably rack 1290 positioned within and on horizonal frame 190 of universal vehicle cargo system 100.

Similarly, FIG. 12C is a photograph of a loaded two level universal vehicle cargo system 1200B loaded with equipment 1214 on a deck 905 and removably rack 1290 positioned within and on horizonal frame 190 of universal vehicle cargo system 100. Also shown in FIG. 12C are side panels 1000A and 1000B. As seen in FIG. 12C side panel 1000A is held in place by side panel stays 311 inserted into corner unit multifunctional features 909 of multifunction frame corner units 901C and 901D. As also seen in FIG. 12C, side panel 1000B is held in place by side panel channels 410/510 (not shown in FIG. 12C). As seen in FIG. 12C, side panel 1000B is formed as a molle attachment capable side panel.

FIG. 13 is a flow chart of a process 1300 for providing a universal vehicle cargo system in accordance with one embodiment.

As seen in FIG. 13, process 13 begins at begin operation 1301 and process flow proceeds to operation 1303.

In one embodiment, at operation 1303 multifunction frame corner units are provided.

In one embodiment, each of the multifunction frame corner units provided at operation 1303 are substantially similar to the multifunction frame corner units discussed above with respect to FIGS. 1A, 1B, 2, 3A through 3F, 5A through 5H, 7A, 7B, 8, and 9A and 9B.

Returning to FIG. 13, in one embodiment, once multifunction frame corner units are provided at operation 1303, process flow proceeds to operation 1305.

In one embodiment, at operation 1305 rigid frame sections are provided.

In one embodiment, the rigid frame sections provided at operation 1305 are substantially similar to the rigid frame sections discussed above with respect to FIGS. 1A, 1B, 2, 3A through 3F, 4A, 5A through 5H, 7A, 7B, 8, and 9A and 9B. In one embodiment, at operation 1305 the rigid frame sections are cut to a desired size.

Returning to FIG. 13, in one embodiment, once rigid frame sections are provided at operation 1305, process flow proceeds to operation 1307.

In one embodiment, at operation 1307 each of the rigid frame sections of operation 1305 are removably attached to respective rigid frame section attachment positions of respective the multifunction frame corner units of operation 1303.

In one embodiment, at operation 1307, each of the rigid frame section of operation 1307 are removably attached to respective rigid frame section attachment positions of respective the multifunction frame corner units of operation 1303 in a manner substantially similar to that discussed above with respect to FIGS. 5A through 5H such that the rigid frame sections form a universal vehicle cargo system horizontal frame such that each rigid frame section longitudinal axis is substantially perpendicular to the longitudinal axis of the adjacent rigid frame section.

In one embodiment, once each of the rigid frame sections of operation 1305 are removably attached to respective rigid frame section attachment positions of respective the multifunction frame corner units of operation 1303 at operation 1307, process flow proceeds to operation 1309.

In one embodiment, at operation 1309, two or more frame support legs are provided.

In one embodiment, the two or more frame support legs are provided at operation 1309 are substantially similar the frame support legs discussed above with respect to FIGS. 1A, 1B, 2, 3A through 3F, 4A, 5A through 5J, 7A, 7B, 8, and 9A and 9B. In one embodiment, the two or more frame support legs are also cut to a desired size at operation 1309.

In one embodiment, once the two or more frame support legs are provided at operation 1309, process flow proceeds to operation 1311.

In one embodiment, at operation 1311, the two or more frame support legs provided at operation 1309 are removably attached to the universal vehicle cargo system horizontal frame of operation 1307.

In one embodiment, once the two or more frame support legs provided at operation 1309 are removably attached to the universal vehicle cargo system horizontal frame of operation 1307 at operation 1311, process flow proceeds to operation 1313.

In one embodiment, at operation 1313, at least one vehicle connection device, such as a seat hinge attachment device is provided.

In one embodiment the at least one at least one vehicle connection device provided at operation 1313 is substantially similar to the vehicle connection devices discussed above with respect to FIGS. 1A, 1B, 2, 3A through 3F, 4A, 5A through 5J, FIGS. 6A through 6D 7A, 7B, 8, and 9A and 9B.

Returning to FIG. 13, once at least one vehicle connection device is provided at operation 1313, process flow proceeds to operation 1315.

In one embodiment, at operation 1315 the at least one vehicle connection device provided at operation 1313 is removably attached to the universal vehicle cargo system horizontal frame of operation 1307 to form a universal vehicle cargo system.

In one embodiment, once the at least one vehicle connection device provided at operation 1313 is removably attached to the universal vehicle cargo system horizontal frame of operation 1307 to form a universal vehicle cargo system at operation 1315, process flow proceeds to operation 1317.

In one embodiment, at operation 1317 the universal vehicle cargo system of operation 1315 is installed in a vehicle.

In one embodiment, at operation 1317 the universal vehicle cargo system of operation 1315 is installed in a vehicle by accessing, removing, or folding a vehicle seat and removably attaching the at least one vehicle connection device of operation 1315 to a seat hinge, a child seat anchor, or a seat frame portion of the vehicle and positioning the two or more frame support legs of operation 1309 on a floor surface of the vehicle.

In one embodiment, once the universal vehicle cargo system of operation 1315 is installed in a vehicle at operation 1317, process flow proceeds to END operation 1330. In one embodiment, at operation 1330, process 1300 ends.

As discussed above, in contrast to prior art methods and systems, the disclosed universal vehicle cargo systems can be modified by the vehicle user as needed, when needed, wherever needed, and as many times as needed.

In addition, as discussed above, the disclosed universal vehicle cargo systems are designed to be customizable for use with any vehicle, to carry numerous types of specialty cargo/equipment, and provide the ability to secure that equipment using different types of securing systems that are best suited for the cargo/equipment and the needs of the user in a highly effective and efficient manner.

In addition, as discussed above, the disclosed universal vehicle cargo systems are designed to be customizable in length, width, and height according to the needs of the user.

As discussed above, in one embodiment, this is accomplished by building the disclosed universal vehicle cargo systems from universal vehicle cargo system components including, but not limited to, customizable, and interchangeable, rigid frame sections that can be cut to a desired length; multifunction frame body sections that can also be cut to a desired length; multifunction frame corner units; and one or more frame support legs that can be cut to a desired length and/or one or more vehicle connection devices.

In addition, as discussed above, in various embodiments, the universal vehicle cargo system components are designed to be capable of customization, and/or modification, by the end user and can be sold as a kit so that the disclosed universal vehicle cargo systems can be assembled by the end user and therefore customized by the end user to meet the specific needs of the end user.

In addition, as discussed above, the universal vehicle cargo system components are stored as a kit and then assembled in whole, or in part, based on the indicated needs of the vehicle owner. This not only makes the disclosed universal vehicle cargo systems highly customizable, but it also provides for efficient storage and warehousing of the universal vehicle cargo systems either at the manufacturers facility, an intermediate storage location such as a merchants store, or by the vehicle owner/end user so that the disclosed universal vehicle cargo systems can be modified as needed by the end user.

In addition, as discussed above, in various embodiments, all of the components of the disclosed universal vehicle cargo systems are specifically designed to be removably attached to each other. Consequently, the disclosed universal vehicle cargo systems can be easily installed, and uninstalled, as the user desires.

As a result, and in direct contrast to prior art methods and systems, the disclosed universal vehicle cargo systems provide vehicle owners numerous options for providing in-vehicle/in-cab equipment storage.

Also in direct contrast to prior art methods and systems, the disclosed universal vehicle cargo systems provide versatile, effective, and efficient mechanisms for securing both the storage platform itself to the vehicle and for securing equipment of various types, in various ways, to the storage platform. In addition, and in direct contrast to prior art methods and systems, the disclosed universal vehicle cargo systems are relatively inexpensive and are designed to be relatively easy to install and uninstall; thereby increasing the versatility and utility of the parent vehicle.

Therefore, the disclosed methods and systems provide vehicles the versatility and utility their owners desire. In addition, the disclosed methods and systems provide versatile, efficient, and effective solutions to the shifting load hazards discussed above and thereby make our highways safer. This again is in direct contrast to many of the prior art methods and systems discussed above.

Consequently, the disclosed universal vehicle cargo systems provide a technical solution to the long-standing technical problem of providing a vehicle cargo storage platform that is versatile, efficient, effective, and relatively inexpensive, while at the same time providing mechanisms to truly secure various types of cargo in various ways; thereby minimizing the hazards associated with load shifting.

Disclosed here is a universal vehicle cargo system. In one embodiment, the disclosed universal vehicle cargo system includes at least four multifunction frame corner units, each of the at least four multifunction frame corner units having at least two rigid frame section attachment positions.

In one embodiment, the disclosed universal vehicle cargo system includes at least four rigid frame sections cut to a desired length, each of the rigid frame sections having a rigid frame section first end and a rigid frame section second end, opposite the rigid frame section first end, each of the rigid frame sections having a longitudinal axis extending from the rigid frame section first end to the rigid frame section second end.

In one embodiment, each of the rigid frame section ends is attached to a respective rigid frame section attachment position of one of the four multifunction frame corner units such that the rigid frame sections form a universal vehicle cargo system frame such that each rigid frame section longitudinal axis is substantially perpendicular to the longitudinal axis of the adjacent rigid frame section.

In one embodiment, the disclosed universal vehicle cargo system includes two or more frame support legs, each of the two or more frame support legs being cut to a desired length and attached to a respective one of the multifunction frame corner units.

In one embodiment, the disclosed universal vehicle cargo system includes at least one vehicle connection device. In one embodiment, two support legs are attached to a respective first and second one of the multifunction frame corner units and each of the at least one first vehicle connection devices is connected to a multifunction frame corner unit other than the first and second one of the multifunction frame corner units.

In one embodiment, each of the at least one of the vehicle connection devices is also connected to at least one anchor portion of a vehicle to secure the universal vehicle cargo system to the vehicle.

In one embodiment, at least one of the multifunction frame corner units includes at least one multifunctional feature selected from the group of multifunctional features including an anchoring position; an anchoring mechanism; a side support mechanism; an equipment attachment point; and an equipment attachment mechanism.

In one embodiment, the disclosed universal vehicle cargo system includes at least one multifunction frame body section cut to a desired length, wherein each of the at least one multifunction frame body sections encloses at least part of one of the at least four rigid frame sections.

In one embodiment, the at least one multifunction frame body section includes at least one multifunctional feature selected from the group multifunctional features including an anchoring position; an anchoring mechanism; a side support mechanism; an equipment attachment point; an equipment attachment mechanism; and at least one supplemental structural support component attachment location.

In one embodiment, at least one of the rigid frame sections is made of rigid frame section material selected from the group of rigid frame section material including aluminum; steel; a metal alloy; high density polymers; injection molded polymers; fiber glass; and carbon fiber.

In one embodiment, at least one of the multifunction frame corner units is made of multifunction frame corner unit material selected from the group of multifunction frame corner unit material including aluminum; steel; a metal alloy; high density polymers; injection molded polymers; fiber glass; and carbon fiber.

In one embodiment, at least one of the frame support legs is made of frame support leg material selected from the group of frame support leg including aluminum; steel; a metal alloy; high density polymers; injection molded polymers; fiber glass; and carbon fiber.

In one embodiment, the disclosed universal vehicle cargo system includes a frame deck attached to the universal vehicle cargo system frame to provide a level and flat surface within, and supported by, the universal vehicle cargo system frame.

In one embodiment, the frame deck is formed of frame deck material selected from the group of frame deck material including aluminum; steel; a metal alloy; high density polymers; injection molded polymers; fiber glass; Aluminum Composite Metal (ACM); laminated metal and Polyethylene (PE); plywood; bamboo sheeting; and carbon fiber.

In one embodiment, the disclosed universal vehicle cargo system includes one or more interchangeable racks removably positioned within, and supported by, the universal vehicle cargo system frame.

In one embodiment, at least one of the one or more interchangeable racks is a pre-prepared specialty rack including activity specific equipment.

In one embodiment, the disclosed universal vehicle cargo system includes at least one side panel, the at least one side panel being attached to at least one side of the universal vehicle cargo system frame.

In one embodiment, the disclosed universal vehicle cargo system includes at least two universal vehicle cargo system levels, a first universal vehicle cargo system level being attached to a floor of a vehicle, each of other universal vehicle cargo system levels of the at least two universal vehicle cargo system levels being removably attached to a universal vehicle cargo system level below it.

In one embodiment, each of the at least two universal vehicle cargo system levels includes at least four multifunction frame corner units, each of the at least four multifunction frame corner units having at least two rigid frame section attachment positions.

In one embodiment, each of the at least two universal vehicle cargo system levels includes at least four rigid frame sections cut to a desired length, each of the rigid frame sections having a rigid frame section first end and a rigid frame section second end, opposite the rigid frame section first end, each of the rigid frame sections having a longitudinal axis extending from the rigid frame section first end to the rigid frame section second end.

In one embodiment, each of the rigid frame section ends is attached to a respective rigid frame section attachment position of one of the four multifunction frame corner units such that the rigid frame sections form a universal vehicle cargo system frame such that each rigid frame section longitudinal axis is substantially perpendicular to the longitudinal axis of the adjacent rigid frame section.

In one embodiment, each of the at least two universal vehicle cargo system levels includes two or more frame support legs, each of the two or more frame support legs being cut to a desired length and attached to a respective one of the multifunction frame corner units.

In one embodiment, the universal vehicle cargo system lowest level includes at least one vehicle connection device. In one embodiment, the two support legs are attached to a respective first and second one of the first universal vehicle cargo system level multifunction frame corner units and each of the at least one first vehicle connection devices is connected to a first universal vehicle cargo system level multifunction frame corner unit other than the first and second one of the first universal vehicle cargo system level multifunction frame corner units.

In one embodiment, each of the at least one of the vehicle connection devices is also connected to at least one anchor position of a vehicle to secure the universal vehicle cargo system to the vehicle.

In one embodiment, the at least universal vehicle cargo system includes at least one multifunction frame body section cut to a desired length, wherein each of the at least one multifunction frame body sections at least partially encloses one of the at least four rigid frame sections.

In one embodiment, the at least one multifunction frame body section includes at least one multifunctional feature selected from the group of multifunctional features including an anchoring position; an anchoring mechanism; a side support mechanism; an equipment attachment point; and an equipment attachment mechanism.

In one embodiment, the at least one multifunction frame body section includes a frame deck attached to the universal vehicle cargo system frame to provide a level and flat surface.

In one embodiment, the frame deck is formed of frame deck material selected from the group of frame deck material including aluminum; steel; a metal alloy; high density polymers; injection molded polymers; fiber glass; ACM; laminated metal and PE; plywood; bamboo sheeting; and carbon fiber.

In one embodiment, the at least universal vehicle cargo system includes one or more interchangeable racks removably positioned within one or more of the universal vehicle cargo system frames.

In one embodiment, the at least one of the one or more interchangeable racks is a pre-prepared specialty rack including activity specific equipment.

Disclosed herein is a cargo system including a vehicle, the vehicle having a vehicle floor and at least one vehicle anchor portion and at least one universal vehicle cargo system.

In one embodiment, the at least one universal vehicle cargo system includes at least four multifunction frame corner units, each of the at least four multifunction frame corner units having at least two rigid frame section attachment positions.

In one embodiment, the at least one universal vehicle cargo system includes at least four rigid frame sections cut to a desired length, each of the rigid frame sections having a rigid frame section first end and a rigid frame section second end, opposite the rigid frame section first end, each of the rigid frame sections having a longitudinal axis extending from the rigid frame section first end to the rigid frame section second end.

In one embodiment, each of the rigid frame section ends is attached to a respective rigid frame section attachment position of one of the four multifunction frame corner units such that the rigid frame sections form a universal vehicle cargo system frame such that each rigid frame section longitudinal axis is substantially perpendicular to the longitudinal axis of the adjacent rigid frame section.

In one embodiment, the at least one universal vehicle cargo system includes at least one multifunction frame body section cut to a desired length, wherein each of the at least one multifunction frame body sections at least partially encloses one of the at least four rigid frame sections, the at least one multifunction frame body section including at least one multifunctional feature.

In one embodiment, the at least one universal vehicle cargo system includes two or more frame support legs, each of the two or more frame support legs being cut to a desired length and attached to a respective one of the multifunction frame corner units, two of the two or more support legs being attached to a respective first and second one of the multifunction frame corner units.

In one embodiment, the at least one universal vehicle cargo system includes at least one seat hinge connection device, each of the at least one seat hinge connection devices being connected to a multifunction frame corner unit other than the first and second one of the multifunction frame corner units.

In one embodiment, each of the at least one of the seat hinge connection devices is also connected to at least one seat hinge of the vehicle to secure the universal vehicle cargo system to the vehicle.

In one embodiment, the at least one universal vehicle cargo system includes one or more interchangeable racks removably positioned within, and supported by, the universal vehicle cargo system frame.

Disclosed herein is a method for providing a universal vehicle cargo system. In one embodiment, the disclosed method includes providing at least four multifunction frame corner units, each of the at least four multifunction frame corner units having at least two rigid frame section attachment positions.

In one embodiment, the disclosed method includes providing at least four rigid frame sections, each of the rigid frame sections having a rigid frame section first end and a rigid frame section second end, opposite the rigid frame section first end, each of the rigid frame sections having a longitudinal axis extending from the rigid frame section first end to the rigid frame section second end.

In one embodiment, the disclosed method includes cutting the at least four rigid frame sections to a desired length.

In one embodiment, the disclosed method includes removably attaching each of the rigid frame section ends to a respective rigid frame section attachment position of one of the four multifunction frame corner units such that the rigid frame sections form a universal vehicle cargo system frame such that each rigid frame section longitudinal axis is substantially perpendicular to the longitudinal axis of the adjacent rigid frame section.

In one embodiment, the disclosed method includes providing two or more frame support legs.

In one embodiment, the disclosed method includes cutting each of the two or more frame support legs to a desired length.

In one embodiment, the disclosed method includes attaching each of the two or more frame support legs to a respective one of the multifunction frame corner units.

In one embodiment, the disclosed method includes attaching the universal vehicle cargo system to a vehicle.

In one embodiment, the disclosed method includes attaching two of the at least two support legs to a respective first and second one of the multifunction frame corner units.

In one embodiment, the disclosed method includes providing at least one vehicle connection device.

In one embodiment, the disclosed method includes connecting each of the at least one first vehicle connection devices to at least one multifunction frame corner unit other than the first and second ones of the multifunction frame corner units.

In one embodiment, the disclosed method includes connecting each of the at least one of the vehicle connection devices to at least one anchor position of the vehicle to secure the universal vehicle cargo system to the vehicle.

In one embodiment, the disclosed method includes providing at least one multifunction frame body section.

In one embodiment, the disclosed method includes cutting the at least one multifunction frame body section to a desired length.

In one embodiment, the disclosed method includes positioning each of the at least one multifunction frame body sections on a respective one of the at least four rigid frame sections such that the each of the at least one multifunction frame body sections encloses at least part of a respective one of the at least four rigid frame sections.

In one embodiment, the disclosed method includes providing a frame deck.

In one embodiment, the disclosed method includes attaching the frame deck to the universal vehicle cargo system frame to provide a level and flat surface within, and supported by, the universal vehicle cargo system frame.

In one embodiment, the disclosed method includes providing one or more interchangeable racks.

In one embodiment, the disclosed method includes removably positioning the one or more interchangeable racks within the universal vehicle cargo system frame such that the one or more interchangeable racks are supported by the universal vehicle cargo system frame.

In one embodiment, at least one of the one or more interchangeable racks is a pre-prepared specialty rack including activity specific equipment.

In one embodiment, the disclosed method includes providing at least one side panel.

In one embodiment, the disclosed method includes attaching the at least one side panel to at least one side of the universal vehicle cargo system frame.

In one embodiment, a method for providing universal vehicle cargo system includes providing at least four multifunction frame corner units, each of the at least four multifunction frame corner units having at least two rigid frame section attachment positions.

In one embodiment, the method for providing universal vehicle cargo system includes providing at least four rigid frame sections, each of the rigid frame sections having a rigid frame section first end and a rigid frame section second end, opposite the rigid frame section first end, each of the rigid frame sections having a longitudinal axis extending from the rigid frame section first end to the rigid frame section second end.

In one embodiment, the method for providing universal vehicle cargo system includes cutting the at least four rigid frame sections to a desired length, In one embodiment, the method for providing universal vehicle cargo system includes removably attaching each of the rigid frame section ends to a respective rigid frame section attachment position of one of the four multifunction frame corner units such that the rigid frame sections form a first level universal vehicle cargo system frame such that each rigid frame section longitudinal axis is substantially perpendicular to the longitudinal axis of the adjacent rigid frame section.

In one embodiment, the method for providing universal vehicle cargo system includes providing two or more frame support legs.

In one embodiment, the method for providing universal vehicle cargo system includes cutting each of the two or more frame support legs to a desired length.

In one embodiment, the method for providing universal vehicle cargo system includes attaching each of the two or more frame support legs to a respective one of the multifunction frame corner units.

In one embodiment, the method for providing universal vehicle cargo system includes attaching the first level universal vehicle cargo system frame to a vehicle.

In one embodiment, the method for providing universal vehicle cargo system includes providing at least four additional multifunction frame corner units, each of the at least four additional multifunction frame corner units having at least two rigid frame section attachment positions.

In one embodiment, the method for providing universal vehicle cargo system includes providing at least four additional rigid frame sections, each of the additional rigid frame sections having a rigid frame section first end and a rigid frame section second end, opposite the rigid frame section first end, each of the additional rigid frame sections having a longitudinal axis extending from the rigid frame section first end to the rigid frame section second end.

In one embodiment, the method for providing universal vehicle cargo system includes cutting the at least four additional rigid frame sections to a desired length.

In one embodiment, the method for providing universal vehicle cargo system includes removably attaching each of the additional rigid frame section ends to a respective rigid frame section attachment position of one of the four additional multifunction frame corner units such that the rigid frame sections form a second level universal vehicle cargo system frame such that each additional rigid frame section longitudinal axis is substantially perpendicular to the longitudinal axis of the adjacent additional rigid frame section.

In one embodiment, the method for providing universal vehicle cargo system includes providing two or more additional frame support legs.

In one embodiment, the method for providing universal vehicle cargo system includes cutting each of the two or more additional frame support legs to a desired length.

In one embodiment, the method for providing universal vehicle cargo system includes attaching each of the two or more additional frame support legs to a respective one of the additional multifunction frame corner units.

In one embodiment, the method for providing universal vehicle cargo system includes removably attaching the second level universal vehicle cargo system frame to the first level universal vehicle cargo system frame.

In one embodiment, the method for providing universal vehicle cargo system includes attaching two support legs of the first level universal vehicle cargo system frame a respective first and second one of the multifunction frame corner units.

In one embodiment, the method for providing universal vehicle cargo system includes providing at least one first vehicle connection device.

In one embodiment, the method for providing universal vehicle cargo system includes connecting each of the at least one first vehicle connection devices to a multifunction frame corner unit other than the first and second one of the multifunction frame corner units.

In one embodiment, the method for providing universal vehicle cargo system includes connecting each of the at least one of the vehicle connection devices to at least one anchor position of the vehicle to secure the universal vehicle cargo system to the vehicle.

In one embodiment, the method for providing universal vehicle cargo system includes providing at least one multifunction frame body section.

In one embodiment, the method for providing universal vehicle cargo system includes cutting the at least one multifunction frame body section to a desired length.

In one embodiment, the method for providing universal vehicle cargo system includes positioning each of the at least one multifunction frame body sections on a respective one of the rigid frame sections such that the each of the at least one multifunction frame body sections encloses at least part of a respective one of the rigid frame sections.

In one embodiment, the method for providing universal vehicle cargo system includes providing a frame deck.

In one embodiment, the method for providing universal vehicle cargo system includes attaching the frame deck to one of the universal vehicle cargo system frames to provide a level and flat surface.

In one embodiment, the method for providing universal vehicle cargo system includes providing one or more interchangeable racks.

In one embodiment, the method for providing universal vehicle cargo system includes removably positioning one or more interchangeable racks within one or more of the universal vehicle cargo system frames.

In one embodiment, the at least one of the one or more interchangeable racks is a pre-prepared specialty rack including activity specific equipment.

In one embodiment, a method includes providing a vehicle, the vehicle having a vehicle floor and at least one vehicle seat hinge.

In one embodiment, the method includes providing at least one universal vehicle cargo system.

In one embodiment, the at least one universal vehicle cargo system includes at least four multifunction frame corner units, each of the at least four multifunction frame corner units having at least two rigid frame section attachment positions.

In one embodiment, the at least one universal vehicle cargo system includes at least four rigid frame sections cut to a desired length, each of the rigid frame sections having a rigid frame section first end and a rigid frame section second end, opposite the rigid frame section first end, each of the rigid frame sections having a longitudinal axis extending from the rigid frame section first end to the rigid frame section second end, wherein each of the rigid frame section ends is attached to a respective rigid frame section attachment position of one of the four multifunction frame corner units such that the rigid frame sections form a universal vehicle cargo system frame such that each rigid frame section longitudinal axis is substantially perpendicular to the longitudinal axis of the adjacent rigid frame section.

In one embodiment, the at least one universal vehicle cargo system includes at least one multifunction frame body section cut to a desired length, wherein each of the at least one multifunction frame body sections at least partially encloses one of the at least four rigid frame sections, the at least one multifunction frame body section including at least one multifunctional feature.

In one embodiment, the at least one universal vehicle cargo system includes two or more frame support legs, each of the two or more frame support legs being cut to a desired length and attached to a respective one of the multifunction frame corner units, two of the two or more support legs being attached to a respective first and second one of the multifunction frame corner units.

In one embodiment, the at least one universal vehicle cargo system includes at least one seat hinge connection device, each of the at least one seat hinge connection devices being connected to a multifunction frame corner unit other than the first and second one of the multifunction frame corner units, wherein, each of the at least one of the seat hinge connection devices is also connected to at least one seat hinge of the vehicle to secure the universal vehicle cargo system to the vehicle.

In one embodiment, the at least one universal vehicle cargo system includes one or more interchangeable racks removably positioned within, and supported by, the universal vehicle cargo system frame.

Disclosed herein is a universal vehicle cargo system kit. In one embodiment, the disclosed universal vehicle cargo system kit includes at least four multifunction frame corner units, each of the at least four multifunction frame corner units having two rigid frame section attachment channels including a rigid frame section attachment channel longitudinal axis, the two rigid frame section channel axes of each multifunction frame corner unit being substantially perpendicular to each other.

In one embodiment, the disclosed universal vehicle cargo system kit includes at least four rigid frame sections capable of being cut to a desired length, each of the rigid frame sections having a rigid frame section first end and a rigid frame section second end opposite the rigid frame section first end, each of the rigid frame sections having a rigid frame section longitudinal axis extending from the rigid frame section first end to the rigid frame section second end, wherein each of the rigid frame section ends can be removably inserted into a respective rigid frame section attachment channel of one of the four multifunction frame corner units such that the rigid frame sections form a universal vehicle cargo system frame and such that each rigid frame section longitudinal axis is substantially perpendicular to the longitudinal axis of the adjacent rigid frame section.

In one embodiment, the disclosed universal vehicle cargo system kit includes two or more frame support legs, each of the two or more frame support legs being capable of being cut to a desired length and capable of being removably attached to a respective one of the multifunction frame corner units.

In one embodiment, the disclosed universal vehicle cargo system kit includes at least two vehicle connection devices, wherein, two support legs can be removably attached to a respective first and second one of the multifunction frame corner units and each of the two or more vehicle connection devices can be removably connected to a respective third and fourth one of the multifunction frame corner units.

In one embodiment, each of the two or more vehicle connection devices can be removably connected to at least one anchoring portion of a vehicle to removably secure the universal vehicle cargo system to the vehicle.

In one embodiment, at least one of the multifunction frame corner units includes at least one multifunctional feature selected from the group of least one multifunctional features including an anchoring position; an anchoring mechanism; a side support mechanism; an equipment attachment point; and an equipment attachment mechanism.

In one embodiment, the disclosed universal vehicle cargo system kit includes at least one multifunction frame body section capable of being cut to a desired length, wherein each of the at least one multifunction frame body sections can at least partially removably enclose one of the at least four rigid frame sections.

In one embodiment, the at least one multifunction frame body section includes at least one multifunctional feature selected from the group of least one multifunctional features including an anchoring position; an anchoring mechanism; a side support mechanism; an equipment attachment point; and an equipment attachment mechanism.

In one embodiment, at least one the rigid frame sections are made of rigid frame section material selected from the group of rigid frame section material including aluminum; steel; a metal alloy; high density polymers; fiber glass; and carbon fiber.

In one embodiment, at least one of the multifunction frame corner units are made of multifunction frame corner unit material selected from the group of multifunction frame corner unit material including aluminum; steel; a metal alloy; high density polymers; fiber glass; and carbon fiber.

In one embodiment, at least one of the frame support legs are made of frame support leg material selected from the group of frame support leg including aluminum; steel; a metal alloy; high density polymers; fiber glass; and carbon fiber.

In one embodiment, the disclosed universal vehicle cargo system kit includes a frame floor deck that can be removably attached to the universal customizable and modular universal vehicle equipment system frame to provide a level and flat surface.

In one embodiment, the frame floor deck is formed of frame floor deck material selected from the group of frame floor deck material including aluminum; steel; a metal alloy; high density polymers; injection molded polymers; fiber glass; ACM; laminated metal and PE; plywood; bamboo sheeting; and carbon fiber.

In one embodiment, the disclosed universal vehicle cargo system kit includes one or more interchangeable racks that can be removably positioned within the universal customizable and modular universal vehicle equipment system frame.

In one embodiment, at least one of the one or more interchangeable racks is a pre-prepared specialty rack including activity specific equipment.

In one embodiment, the disclosed universal vehicle cargo system kit includes at least one side panel, the at least one side panel capable of being removably attached to at least one side of the universal vehicle cargo system frame.

In one embodiment, the disclosed universal vehicle cargo system kit includes components to assemble at least two universal vehicle cargo system levels, each of the at least two universal vehicle cargo system levels being capable of being removably attached to a universal vehicle cargo system level below the universal vehicle cargo system level.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, sections of one or more of the process steps and/or operations can be re-grouped as sections of one or more other of the process steps and/or operations discussed herein. Consequently, the particular order and/or grouping of the process steps and/or operations discussed herein do not limit the scope of the invention as claimed below.

In addition, the features shown in the figures are identified using a particular nomenclature for ease of description and understanding, but other nomenclature is often used in the art to identify equivalent features.

Therefore, numerous variations, whether explicitly provided for by the specification or implied by the specification or not, may be implemented by one of skill in the art in view of this disclosure.

What is claimed is:

1. A method for providing a universal vehicle cargo system, the method comprising:

providing at least four multifunction frame corner units, each of the at least four multifunction frame corner units having at least two rigid frame section attachment positions;

providing at least four rigid frame sections, each of the rigid frame sections having a rigid frame section first end and a rigid frame section second end, opposite the rigid frame section first end, each of the rigid frame sections having a longitudinal axis extending from the rigid frame section first end to the rigid frame section second end;

cutting the at least four rigid frame sections to a desired length;

removably attaching each of the rigid frame section ends to a respective rigid frame section attachment position of one of the four multifunction frame corner units such that the rigid frame sections form a universal vehicle cargo system frame such that each rigid frame section longitudinal axis is substantially perpendicular to the longitudinal axis of the adjacent rigid frame section;

providing two or more frame support legs;

cutting each of the two or more frame support legs to a desired length;

attaching each of the two or more frame support legs to a respective one of the multifunction frame corner units;

providing at least one multifunction frame body section;

cutting the at least one multifunction frame body section to a desired length;

positioning each of the at least one multifunction frame body sections on a respective one of the at least four rigid frame sections such that the each of the at least one multifunction frame body sections encloses at least part of a respective one of the at least four rigid frame sections; and attaching the universal vehicle cargo system to a vehicle.

2. The method of claim 1 wherein the at least one multifunction frame body section includes at least one multifunctional feature selected from the group multifunctional features consisting of:

an anchoring position;

an anchoring mechanism;

a side support mechanism;

an equipment attachment point; and an equipment attachment mechanism.

3. The method of claim 1 wherein at least one of the rigid frame sections is made of rigid frame section material selected from the group of rigid frame section material consisting of:

aluminum;

steel;

a metal alloy;

polymers;

fiber glass; and carbon fiber.

4. The method of claim 1 wherein at least one of the multifunction frame corner units is made of multifunction frame corner unit material selected from the group of multifunction frame corner unit material consisting of:

aluminum;

steel;

a metal alloy;

polymers;

fiber glass; and carbon fiber.

5. The method of claim 1 wherein at least one of the frame support legs is made of frame support leg material selected from the group of frame support leg material consisting of:

aluminum;

steel;

a metal alloy;

polymers;

fiber glass; and carbon fiber.

6. The method of claim 1 further comprising:

providing a frame deck;

attaching the frame deck to the universal vehicle cargo system frame to provide a level and flat surface within, and supported by, the universal vehicle cargo system frame.

7. The method of claim 1 wherein the frame deck is formed of frame deck material selected from the group of frame deck material consisting of:

aluminum;

steel;

a metal alloy;

polymers;

injection molded polymers;

fiber glass;

ACM;

laminated metal and PE;

plywood;

bamboo sheeting; and carbon fiber.

8. The method of claim 1 further comprising:

providing one or more interchangeable racks;

removably positioning the one or more interchangeable racks within the universal vehicle cargo system frame such that the one or more interchangeable racks are supported by the universal vehicle cargo system frame.

9. The method of claim 1 further comprising:

providing at least one side panel;

attaching the at least one side panel to at least one side of the universal vehicle cargo system frame.

10. The method of claim 1 further comprising;

attaching two of the at least two or more frame support legs to a respective first and second one of the multifunction frame corner units;

providing at least one vehicle connection device;

connecting each of the at least one vehicle connection devices to at least one multifunction frame corner unit other than the first and second ones of the multifunction frame corner units; and connecting each of the at least one of the vehicle connection devices to at least one anchoring portion of the vehicle to secure the universal vehicle cargo system to the vehicle.

11. The method of claim 1 wherein at least one of the multifunction frame corner units includes at least one multifunctional feature selected from the group of multifunctional features consisting of:

an anchoring position;

an anchoring mechanism;

a side support mechanism;

an equipment attachment point; and an equipment attachment mechanism.

12. A method comprising:

providing a vehicle, the vehicle having a vehicle floor and at least one vehicle seat hinge;

providing at least one universal vehicle cargo system, the at least one universal vehicle cargo system including:

at least four multifunction frame corner units, each of the at least four multifunction frame corner units having at least two rigid frame section attachment positions;

at least four rigid frame sections cut to a desired length, each of the rigid frame sections having a rigid frame section first end and a rigid frame section second end, opposite the rigid frame section first end, each of the rigid frame sections having a longitudinal axis extending from the rigid frame section first end to the rigid frame section second end, wherein each of the rigid frame section ends is attached to a respective rigid frame section attachment position of one of the four multifunction frame corner units such that the rigid frame sections form a universal vehicle cargo system frame such that each rigid frame section longitudinal axis is substantially perpendicular to the longitudinal axis of the adjacent rigid frame section;

at least one multifunction frame body section cut to a desired length, wherein each of the at least one multifunction frame body sections at least partially encloses one of the at least four rigid frame sections, the at least one multifunction frame body section including at least one multifunctional feature;

two or more frame support legs, each of the two or more frame support legs being cut to a desired length and attached to a respective one of the multifunction frame corner units, two of the two or more support legs being attached to a respective first and second one of the multifunction frame corner units;

at least one seat hinge connection device, each of the at least one seat hinge connection devices being connected to a multifunction frame corner unit other than the first and second one of the multifunction frame corner units, wherein, each of the at least one of the seat hinge connection devices is also connected to at least one seat hinge of the vehicle to secure the universal vehicle cargo system to the vehicle; and one or more interchangeable racks removably positioned within, and supported by, the universal vehicle cargo system frame.

13. A method for providing a universal vehicle cargo system, the method comprising:

providing at least four multifunction frame corner units, each of the at least four multifunction frame corner units having at least two rigid frame section attachment positions;

providing at least four rigid frame sections, each of the rigid frame sections having a rigid frame section first end and a rigid frame section second end, opposite the rigid frame section first end, each of the rigid frame sections having a longitudinal axis extending from the rigid frame section first end to the rigid frame section second end;

cutting the at least four rigid frame sections to a desired length;

removably attaching each of the rigid frame section ends to a respective rigid frame section attachment position of one of the four multifunction frame corner units such that the rigid frame sections form a first level universal vehicle cargo system frame such that each rigid frame section longitudinal axis is substantially perpendicular to the longitudinal axis of the adjacent rigid frame section;

providing two or more frame support legs;

cutting each of the two or more frame support legs to a desired length;

attaching each of the two or more frame support legs to a respective one of the multifunction frame corner units;

attaching the first level universal vehicle cargo system frame to a vehicle;

providing at least four additional multifunction frame corner units, each of the at least four additional multifunction frame corner units having at least two rigid frame section attachment positions;

providing at least four additional rigid frame sections, each of the additional rigid frame sections having a rigid frame section first end and a rigid frame section second end, opposite the rigid frame section first end, each of the additional rigid frame sections having a longitudinal axis extending from the rigid frame section first end to the rigid frame section second end;

cutting the at least four additional rigid frame sections to a desired length;

removably attaching each of the additional rigid frame section ends to a respective rigid frame section attachment position of one of the four additional multifunction frame corner units such that the rigid frame sections form a second level universal vehicle cargo system frame such that each additional rigid frame section longitudinal axis is substantially perpendicular to the longitudinal axis of the adjacent additional rigid frame section;

providing two or more additional frame support legs;

cutting each of the two or more additional frame support legs to a desired length;

attaching each of the two or more additional frame support legs to a respective one of the additional multifunction frame corner units;

providing at least one multifunction frame body section;

cutting the at least one multifunction frame body section to a desired length;

positioning each of the at least one multifunction frame body sections on a respective one of the rigid frame sections such that the each of the at least one multifunction frame body sections encloses at least part of a respective one of the rigid frame sections; and removably attaching the second level universal vehicle cargo system frame to the first level universal vehicle cargo system frame.

14. The method of claim 13 wherein the at least one multifunction frame body section includes at least one multifunctional feature selected from the group of multifunctional features consisting of:

an anchoring position;

an anchoring mechanism;

a side support mechanism;

an equipment attachment point; and an equipment attachment mechanism.

15. The method of claim 13 further comprising:

providing a frame deck;

attaching the frame deck to one of the universal vehicle cargo system frames to provide a level and flat surface.

16. The method of claim 13 wherein the frame deck is formed of frame deck material selected from the group of frame deck material consisting of:

aluminum;

steel;

a metal alloy;

polymers;

injection molded polymers;

fiber glass;

ACM;

laminated metal and PE;

plywood;

bamboo sheeting; and carbon fiber.

17. The method of claim 13 further comprising:

providing one or more interchangeable racks;

removably positioning one or more interchangeable racks within one or more of the universal vehicle cargo system frames.

18. The method of claim 13 further comprising:

attaching two of the at least two or more support legs of the first level universal vehicle cargo system frame a respective first and second one of the multifunction frame corner units;

providing at least one first vehicle connection device;

connecting each of the at least one first vehicle connection devices to a multifunction frame corner unit other than the first and second one of the multifunction frame corner units;

connecting each of the at least one of the vehicle connection devices to at least one anchoring portion of the vehicle to secure the universal vehicle cargo system to the vehicle.

\*　\*　\*　\*　\*